US010281714B2

(12) United States Patent
Kawahara

(10) Patent No.: US 10,281,714 B2
(45) Date of Patent: May 7, 2019

(54) PROJECTOR AND PROJECTION SYSTEM THAT CORRECT OPTICAL CHARACTERISTICS, IMAGE PROCESSING APPARATUS, AND STORAGE MEDIUM

(71) Applicant: CANON KABUSHIKI KAISHA, Tokyo (JP)

(72) Inventor: Norihiro Kawahara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/638,631

(22) Filed: Jun. 30, 2017

(65) Prior Publication Data

US 2018/0003949 A1 Jan. 4, 2018

(30) Foreign Application Priority Data

Jul. 4, 2016 (JP) .................. 2016-132533

(51) Int. Cl.
| G02B 26/08 | (2006.01) |
| G03B 21/12 | (2006.01) |
| G02B 26/10 | (2006.01) |
| G03B 21/00 | (2006.01) |
| G03B 21/14 | (2006.01) |
| G03B 17/54 | (2006.01) |
| H04N 9/31 | (2006.01) |
| G02B 27/00 | (2006.01) |

(52) U.S. Cl.
CPC .......... *G02B 26/08* (2013.01); *G02B 26/101* (2013.01); *G03B 17/54* (2013.01); *G03B 21/005* (2013.01); *G03B 21/12* (2013.01); *G03B 21/147* (2013.01); *H04N 9/3185* (2013.01); *G02B 27/0068* (2013.01)

(58) Field of Classification Search
CPC .. G02B 26/08; G02B 26/101; G02B 27/0068; G03B 21/147; G03B 21/005; G03B 21/12; G03B 17/54; H04N 9/3185
USPC ....................................................... 358/471
See application file for complete search history.

(56) References Cited

U.S. PATENT DOCUMENTS

| 2012/0182416 | A1* | 7/2012 | Kawaguchi | .......... H04N 9/3185 348/128 |
| 2013/0113892 | A1* | 5/2013 | Nakamaru | ............. G03B 35/18 348/47 |
| 2013/0215298 | A1* | 8/2013 | Kawabe | .................. G06T 5/006 348/241 |
| 2014/0340529 | A1* | 11/2014 | Shibata | ................ H04N 9/3185 348/189 |
| 2017/0374331 | A1* | 12/2017 | Liu | ...................... H04N 9/3185 |

FOREIGN PATENT DOCUMENTS

JP 2005-345904 A 12/2005

* cited by examiner

*Primary Examiner* — Allen H Nguyen
(74) *Attorney, Agent, or Firm* — Cowan, Liebowitz & Latman, P.C.

(57) ABSTRACT

A projector that is capable of correcting optical characteristics without degrading gradation of a projected image. The projector includes a projection optical system for projecting a projected image on a projection plane. When performing projection based on RAW data obtained through image pickup, the RAW data is corrected based on correction parameters and developed, whereby image data is generated. A projected image corresponding to the image data is projected on the projection plane.

13 Claims, 39 Drawing Sheets

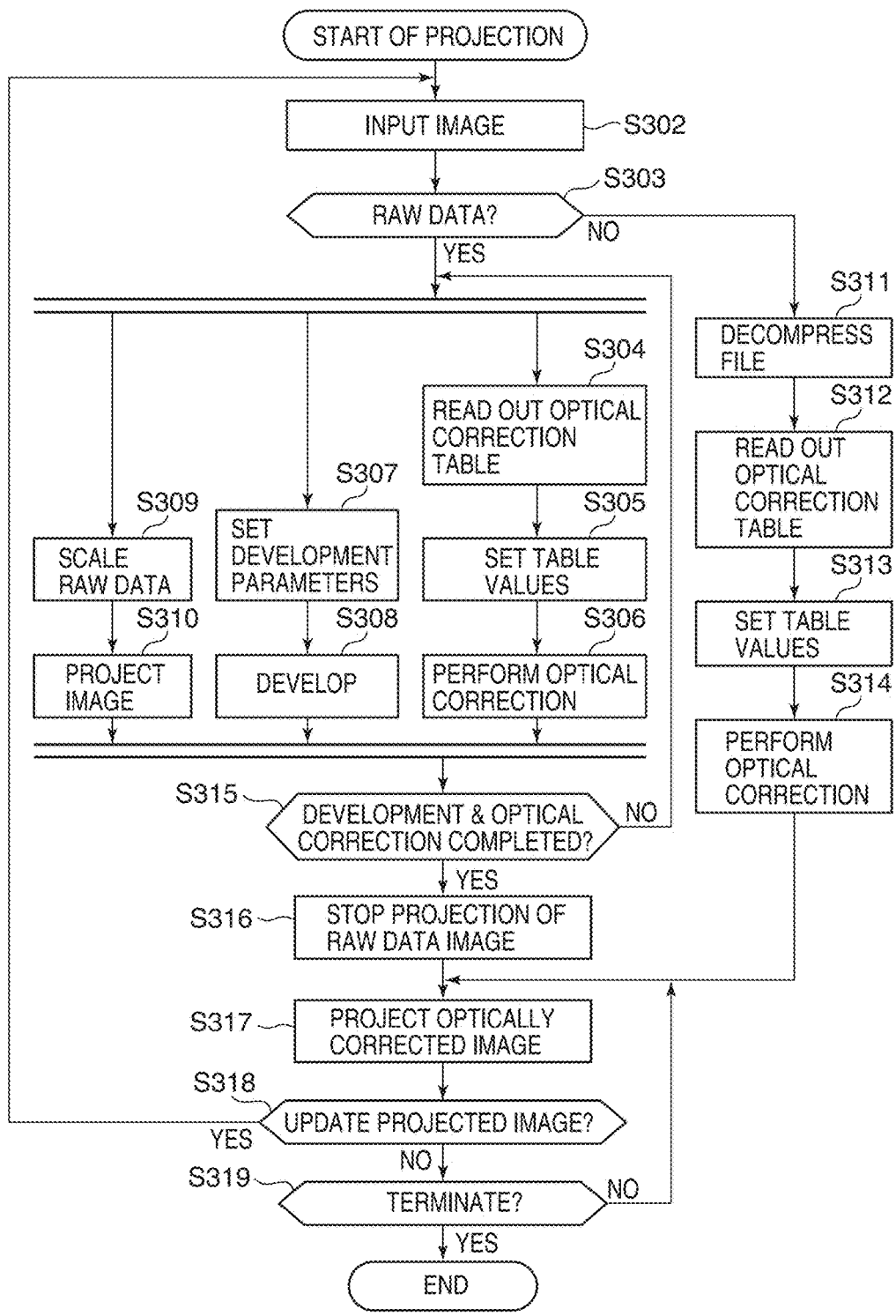

| ITEM | VALUE |
|---|---|
| 1211 — FORMAT | RAW — 1217 |
| 1212 — APERTURE (F No.) | 2.8 — 1218 |
| 1213 — SHUTTER SPEED | 1/30 sec — 1219 |
| 1214 — ISO SENSITIVITY | 400 — 1220 |
| 1215 — FOCAL LENGTH | 75 mm — 1221 |
| 1216 — DISTANCE RING POSITION | 4 m — 1222 |

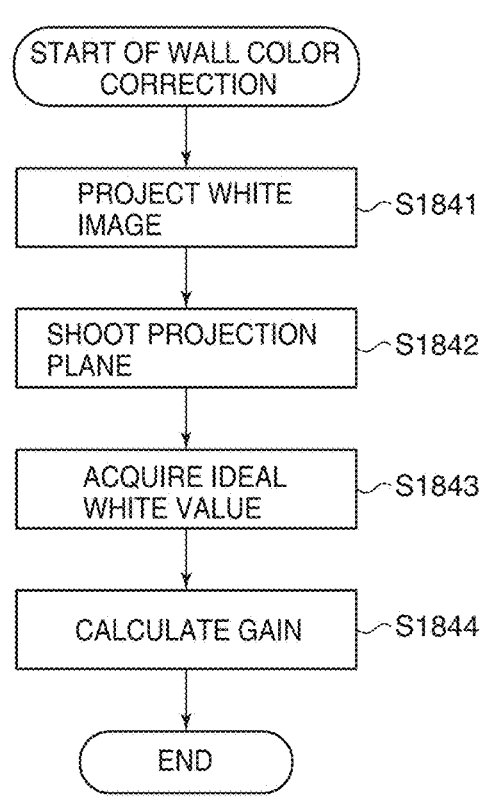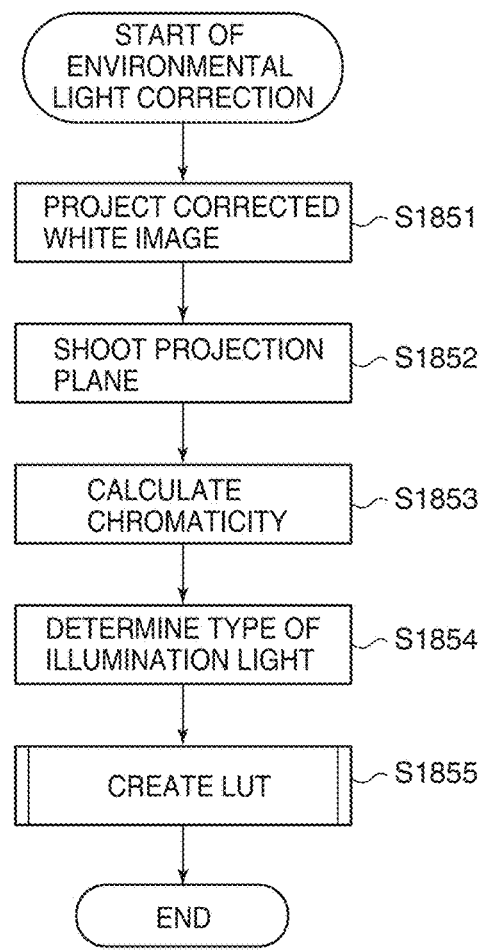
*FIG. 21A*  *FIG. 21B*

| ITEM | VALUE |
|---|---|
| FORMAT | RAW |
| APERTURE (F No.) | 2.8 |
| SHUTTER SPEED | 1/30 sec |
| ISO SENSITIVITY | 400 |
| FOCAL LENGTH | 75 mm |
| DISTANCE RING POSITION | 4 m |
| PAN ANGLE | 0° |
| TILT ANGLE | 8° |

1211 — ITEM / 1217 — FORMAT
1212 — APERTURE / 1218 — 2.8
1213 — SHUTTER SPEED / 1219 — 1/30 sec
1214 — ISO SENSITIVITY / 1220 — 400
1215 — FOCAL LENGTH / 1221 — 75 mm
1216 — DISTANCE RING POSITION / 1222 — 4 m
2811 — PAN ANGLE / 2813 — 0°
2812 — TILT ANGLE / 2814 — 8°

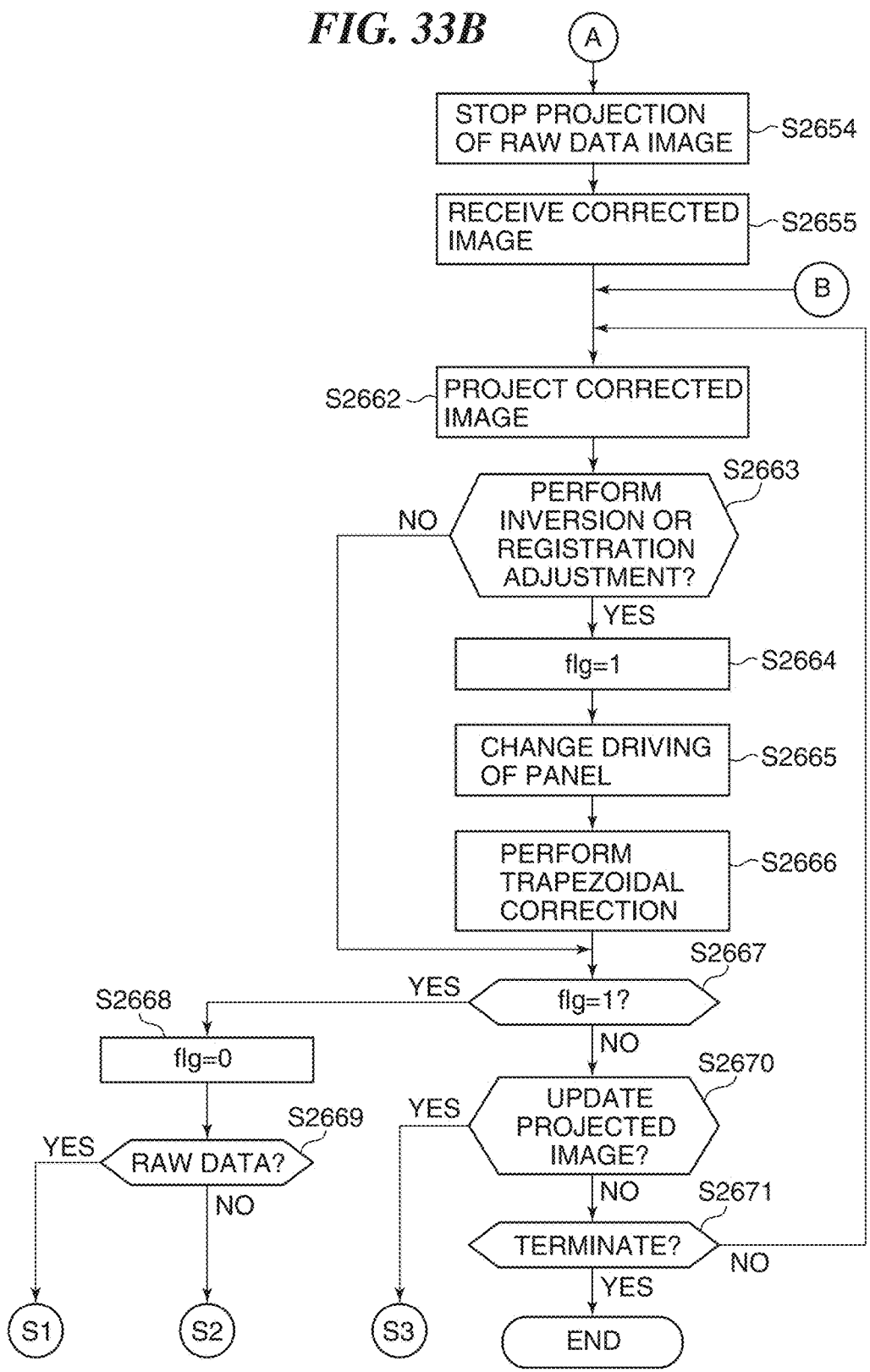

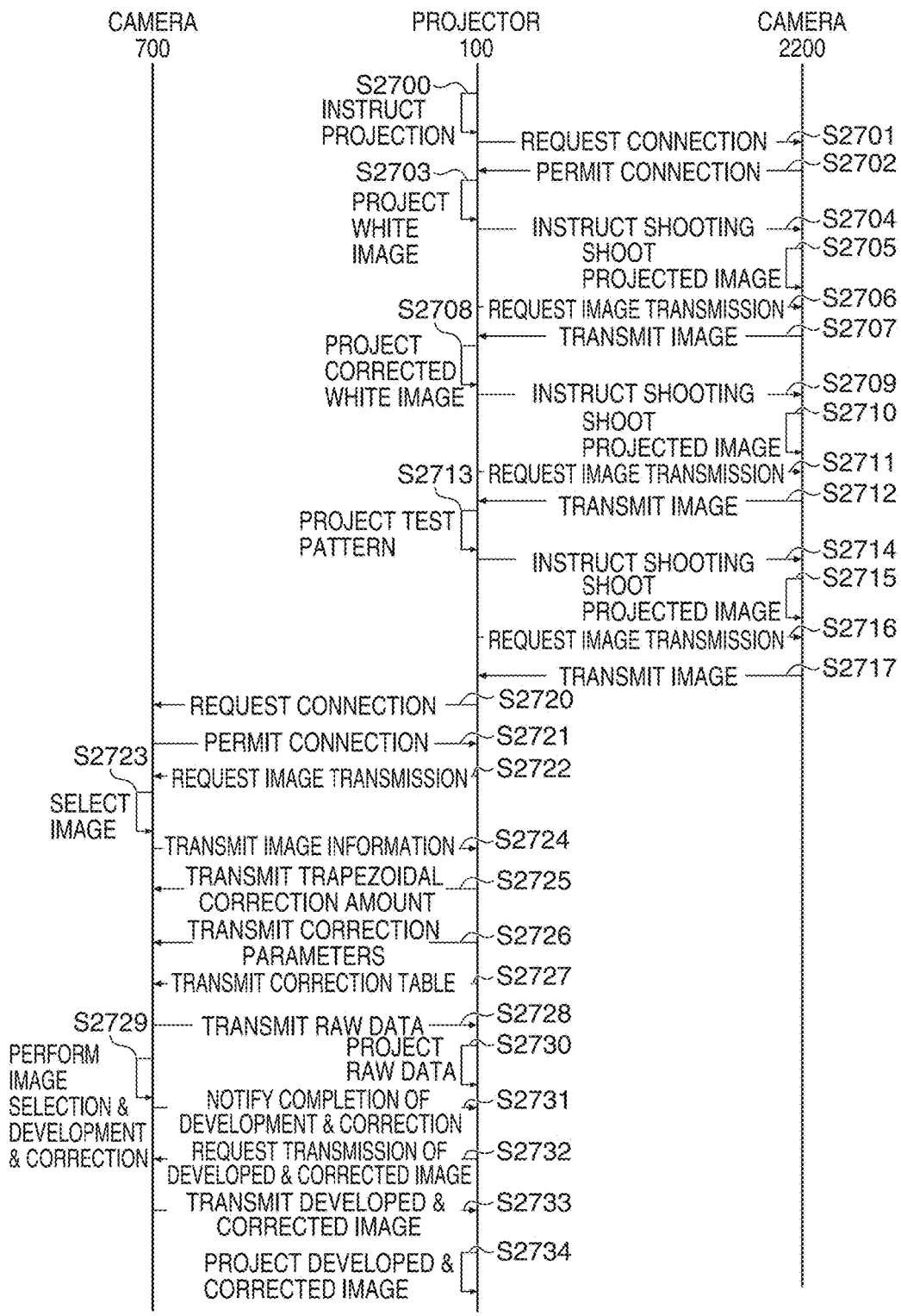

PROJECTOR AND PROJECTION SYSTEM THAT CORRECT OPTICAL CHARACTERISTICS, IMAGE PROCESSING APPARATUS, AND STORAGE MEDIUM

BACKGROUND OF THE INVENTION

Field of the Invention

The present invention relates to a projector that projects an image, a projection system, an image processing apparatus, and a storage medium, and more particularly to a projection system that projects an image corrected by correcting optical characteristics.

Description of the Related Art

In recent years, as for projection of an image (projected image) using a projection apparatus, such as a projector, there is an increasing demand for realizing a projected image having high image quality. However, in a projected image, there are some areas in which an quantity of light is reduced due to peripheral light quantity characteristics in an optical system, such as a lens. Further, a shift in image formation position may be caused on a color component basis due to an influence of an aberration caused by the lens.

To solve such a problem, for example, there has been proposed a projector configured to measure light intensity distribution in a vertical direction corresponding to a major axis direction of a light modulation element and a lateral direction (Japanese Laid-Open Patent Publication (Kokai) No. 2005-345904). In Japanese Laid-Open Patent Publication (Kokai) No. 2005-345904, correction is performed based on data obtained by the light intensity distribution measurement to thereby prevent variation in light intensity in the vertical direction and the lateral direction of the projected image.

Incidentally, assuming that image signals obtained by an image pickup device are subjected to white balance processing, color conversion processing, color space conversion processing, contour emphasis processing, etc., to form image data, and the image data is compressed, the resulting compressed image data is reduced in bit depth. In a case where an image is projected based on such image data, if light quantity reduction correction and aberration correction are further performed on the image data, the gradation of the image can be degraded by these corrections.

SUMMARY OF THE INVENTION

The present invention provides a projector and a projection system that are capable of correcting optical characteristics without degrading gradation of a projected image, an image processing apparatus, a method of controlling the projector, a method of controlling the image processing apparatus, and a storage medium.

In a first aspect of the present invention, there is provided a projector that projects a projected image on a projection plane, comprising a projection optical system configured to project the projected image on the projection plane, a developing unit configured to, when performing projection based on RAW data obtained through image pickup, perform, on the RAW data, correction processing based on correction parameters and development processing, to thereby generate image data, and a projection unit configured to project a projected image corresponding to the image data on the projection plane.

In a second aspect of the present invention, there is provided a projection system comprising a projector that projects a projected image on a projection plane, and an image processing apparatus that transmits image data used for projection performed by the projector to the projector, wherein the projector includes a projection optical system configured to project the projected image on the projection plane, a reception unit configured to receive the image data from the image processing apparatus, a first transmission unit configured to transmit correction parameters for correcting RAW data obtained through image pickup to the image processing apparatus, and a projection unit configured to project a projected image corresponding to the image data on the projection plane.

In a third aspect of the present invention, there is provided an image processing apparatus comprising a developing unit configured to perform, on RAW data obtained through image pickup, correction processing based on optical characteristics of a projection optical system included in a projector that projects a projected image on a projection plane, and development processing, to thereby generate image data, and a communication unit configured to transmit the image data generated by the developing unit to the projector.

In a fourth aspect of the present invention, there is provided a non-transitory computer-readable storage medium storing a computer-executable program for executing a method of controlling a projector including a projection optical system for projecting a projected image on a projection plane, wherein the method comprises performing, when performing projection based on RAW data obtained through image pickup, on the RAW data, correction processing based on correction parameters and development processing, to thereby generate image data, and projecting a projected image corresponding to the image data on the projection plane.

In a fifth aspect of the present invention, there is provided a non-transitory computer-readable storage medium storing a computer-executable program for executing a method of controlling an image processing apparatus, wherein the method comprises performing, on RAW data obtained through image pickup, correction processing based on optical characteristics of a projection optical system included in a projector that projects a projected image on a projection plane, and development processing, to thereby generate image data, and transmitting the generated image data to the projector.

According to the present invention, a projected image is projected based on image data which is obtained by performing correction processing on RAW data having a large bit depth and development processing on the resulting data obtained by the correction processing. Therefore, it is possible to perform correction processing, including correction of the optical characteristics, without degrading gradation.

Further features of the present invention will become apparent from the following description of exemplary embodiments (with reference to the attached drawings).

BRIEF DESCRIPTION OF THE DRAWINGS

FIG. 4 is a flowchart of an image projection process performed by the projector.

FIGS. 21A to 21C are flowcharts of a wall color correction process, an environmental light correction process, and a trapezoidal correction process, which are performed in respective corresponding steps in FIG. 20.

FIG. 33B is a continuation of FIG. 33A.

FIG. 34 is a sequence diagram useful in explaining a variation of communication performed between the projector according to the fourth embodiment, and the first and second external apparatuses (digital cameras).

DESCRIPTION OF THE EMBODIMENTS

The present invention will now be described in detail below with reference to the accompanying drawings showing embodiments thereof.

Figure 1:
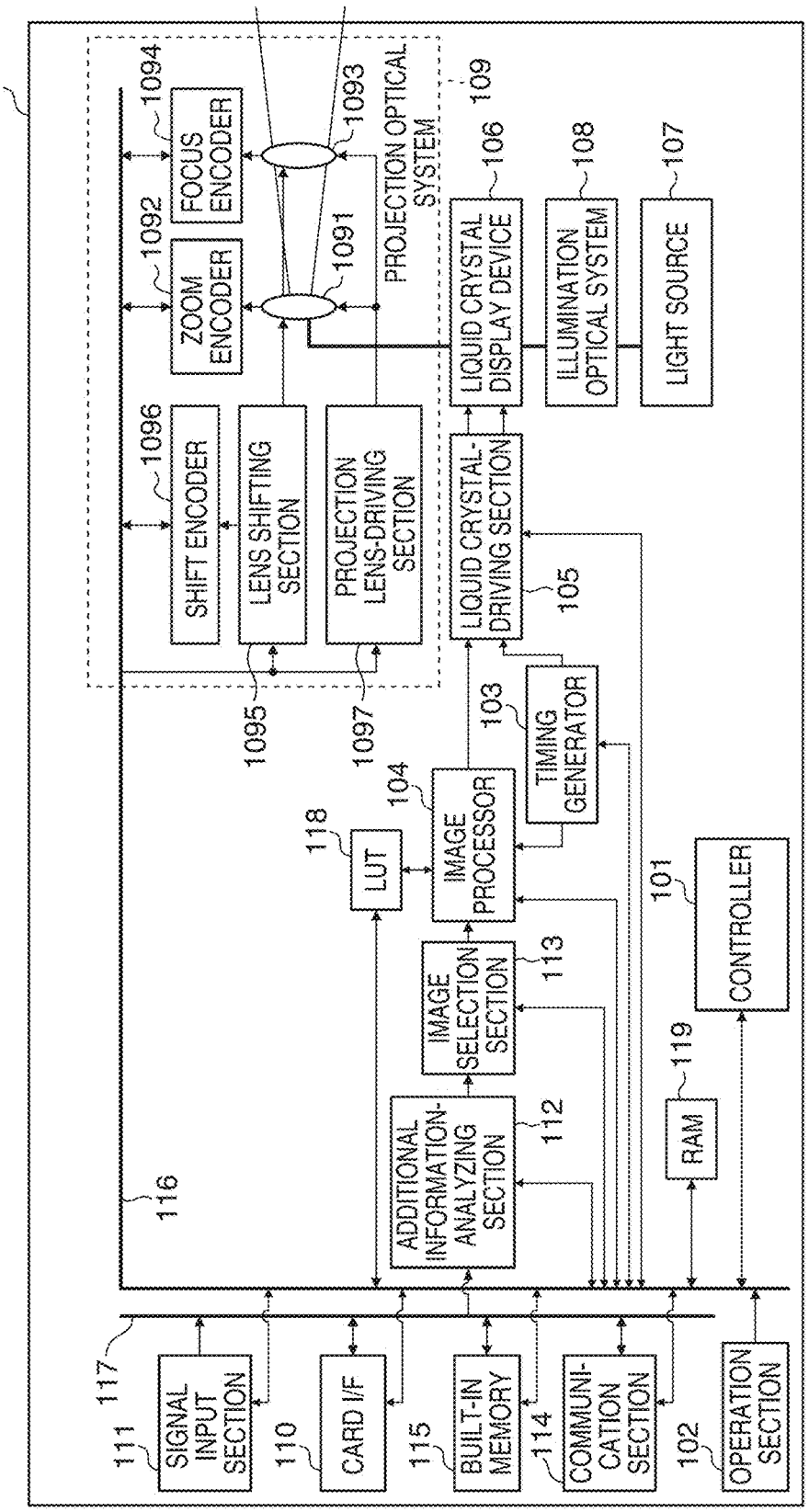
FIG. 1 is a block diagram of a projector according to a first embodiment of the present invention.

FIG. 1 is a block diagram of an example of a projector according to a first embodiment of the present invention.

The projector, denoted by reference numeral 100, includes a controller 101, and the controller 101 controls the overall operation of the projector 100. An operation section 102 receives various operations input by an operator (user). A timing generator 103 generates a synchronization signal (timing signal) used by an image processor 104 and a liquid crystal-driving section 105, described hereinafter. The image processor 104 performs decoding, development, and correction of image data. The liquid crystal-driving section 105 corrects an image (optical image) to be formed on a liquid crystal display device 106 as a light modulation element, and drives the liquid crystal display device 106 according to the above-mentioned synchronization signal.

The liquid crystal display device 106 as the light modulation element includes one or a plurality of liquid crystal panels, and is driven by the liquid crystal-driving section 105 to form an image. Light is irradiated from a light source 107 onto the liquid crystal display device 106 via an illumination optical system 108. With this irradiation of light, the optical image formed on the liquid crystal display device 106 is projected on a screen (not shown) by a projection optical system 109, as a projected image. Note that the illumination optical system 108 converts light from the light source 107 to parallel light, and outputs the converted light to the liquid crystal display device 106.

The projection optical system 109 includes a zoom lens 1091 and a focus lens 1093. Hereinafter, the zoom lens 1091 and the focus lens 1093 are sometimes collectively referred to as the projection lens. The zoom lens 1091 zooms a projected image. A zoom encoder 1092 detects a position of the zoom lens 1091. The focus lens 1093 performs focusing of a projected image. A focus encoder 1094 detects a position of the focus lens 1093.

A lens shifting section 1095 moves a lens holding mechanism (not shown) that holds the zoom lens 1091 and the focus lens d1093, and thereby shifts these lenses. Then, a shift encoder 1096 detects an amount and direction of shift of the lenses, which is performed by the lens shifting section 1095. A projection lens-driving section 1097 drives the zoom lens 1091 and the focus lens 1093, to perform zooming and focusing.

A card-type recording medium, such as an SD card or a compact flash (registered trademark), is inserted in a card interface (IF) 110. The controller 101 writes various information data files, such as video data, image data, a video file, and an image file, into the recording medium, and reads out the same therefrom. A signal input section 111 receives image data from an external apparatus, such as a personal computer (PC) or a DVD player. The signal input section 111 has an HDMI (registered trademark) terminal and a Display Port (registered trademark), for example.

When the HDMI terminal and the Display Port terminal are used, control signals are also transmitted from the external apparatus at the same time, and control of an image and detection of connection are sometimes performed based on the control signals. Further, the controller 101 can transmit a control signal to the external apparatus.

An additional information-analyzing section 112 separates additional information, such as shooting conditions, from an image signal received from the external apparatus, and analyzes the additional information. Then, the additional information-analyzing section 112 sends a result of the analysis to the controller 101. Further, the additional information-analyzing section 112 discriminates the format of image data. An image selection section 113 selects, when a plurality of image data items are received, image data to be projected. A communication section 114 transmits and receives various information data files, such as video data, image data, and a video file, and other command signals. The communication section 114 is connected e.g. to a wired LAN or a wireless LAN.

A built-in memory 115 stores various information data files, such as video data, image data, a video file, and an image file. As the built-in memory 115, for example, a semiconductor memory or a hard disk is used. A control data bus 116 is used when communication is performed between the controller 101 and the sections of the projector 100. An image data bus 117 is used when image data is transmitted and received between the card interface 110, the signal input section 111, the additional information-analyzing section 112, the communication section 114, and the built-in memory 115. Note that optical characteristics information indicative of characteristics of the projection optical system 109 is stored in a look-up table (LUT) 118 in advance.

Figure 2A:
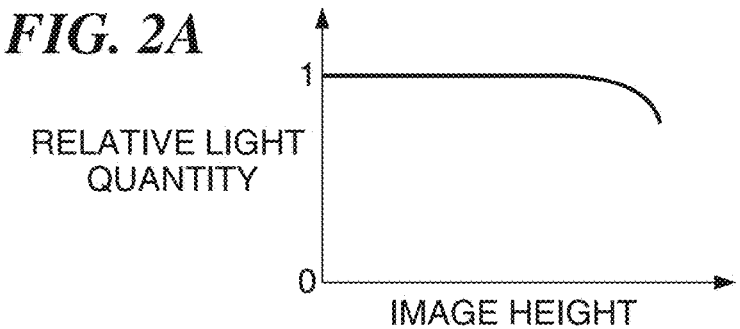
FIGS. 2A and 2B are diagrams useful in explaining optical characteristics information stored in a LUT appearing in FIG. 1.
Figure 2B:
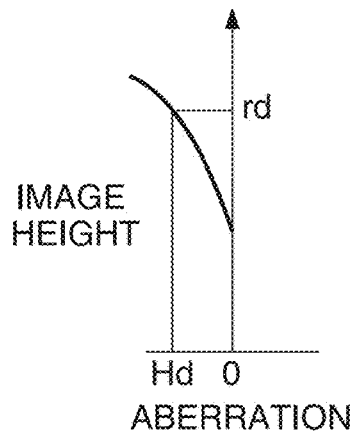

FIGS. 2A and 2B are diagrams useful in explaining the optical characteristic information stored in the LUT appearing in FIG. 1, in which FIG. 2A shows a relationship between an image height and a relative quantity of light, and FIG. 2B shows a relationship between the image height and an aberration.

In general, in an optical lens, as shown in FIG. 2A, the quantity of light (relative quantity of light) is reduced in the periphery of the optical lens. In FIG. 2A, the horizontal axis represents the image height when the center of the optical axis is set to 0, and the vertical axis represents the relative quantity of light with respect to the image height of 0, which is normalized.

Further, in the optical lens, as shown in FIG. 2B, an aberration, i.e. a shift in image formation position is caused on a color component basis. In FIG. 2B, the vertical axis represents the image height when the center of the optical axis is set to 0, and the horizontal axis represents the aberration with respect to the image height.

The zoom lens 1091 and the focus lens 1093 both have light quantity reduction characteristics shown in FIG. 2A and aberration characteristics shown in FIG. 2B. Further, the aberration characteristics shown in FIG. 2B are changed by the zoom magnification of the zoom lens 1091 and the focus position of the focus lens 1093.

The LUT 118 stores the optical characteristic information (i.e. optical correction information) for correcting the above-mentioned light quantity reduction characteristics and aberration characteristics. To correct the light quantity reduction characteristics shown in FIG. 2A, a correction gain for each image height is stored in the LUT 118 as the optical correction information in the form of a table. Note that the correction gains for all image heights may be tabulated and stored, or only correction gains for representative image heights may be stored and the gains for other image heights may be determined by interpolation.

Further, to correct the aberration characteristics shown in FIG. 2B, an aberration correction coefficient for correcting a shift in pixel position (i.e. image forming position) of each color component is stored in the LUT 118 as the optical correction information on an image height basis. Note that the aberration correction coefficients for all image heights may be tabulated and stored, or only aberration correction coefficients for representative image heights may be stored, and the aberration correction coefficients for other image heights may be determined by interpolation.

Further, the aberration includes not only a color aberration in which the amount of shift is different on a color basis, but also a distortion aberration and a spherical aberration, in which the image formation position is shifted irrespective of a color component, and hence coefficients for correcting these aberrations are also stored in the LUT 118 on an as-needed basis.

In a case where the light quantity reduction characteristics and the aberration characteristics do not depend on the image height e.g. due to the shape of the optical lens, differently from the examples shown in FIGS. 2A and 2B, characteristics with respect to a two-dimensional plane on the optical lens are stored in the LUT 118. Further, in the following description, the optical correction information stored in the LUT 118 is sometimes referred to as the optical correction table.

Figure 3A:
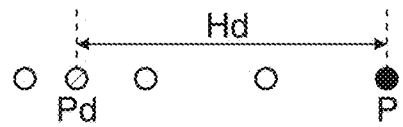
FIGS. 3A to 3C are diagrams useful in explaining correction of an aberration caused by an optical lens.
Figure 3B:
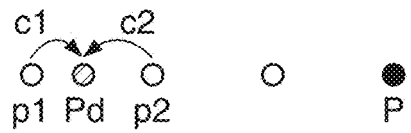
Figure 3C:
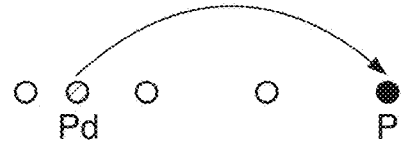

FIGS. 3A to 3C are diagrams useful in explaining correction of an aberration caused by the optical lens, in which FIG. 3A shows a position of a pixel to be corrected, FIG. 3B shows how pixel interpolation is performed, and FIG. 3C shows replacement of the pixel to be corrected by a pixel obtained by interpolation. Note that in the present example, aberration correction in the horizontal direction will be described for convenience of explanation.

A solid black circle P appearing in FIG. 3A indicates an original pixel position of a pixel to be corrected. Now, assuming that an image height, on the optical lens, of an image to be formed in association with the solid black circle P is represented by rd, the image is formed at a position of a pixel Pd shifted by a distance Hd due to the influence of the aberration shown in FIG. 2B. It is assumed, as shown in FIG. 3B, that the pixel (target pixel) Pd is at a distance $c_1$ from one neighboring pixel p1 and at a distance $c_2$ from the other neighboring pixel p2. The value of the pixel Pd can be determined by weighted interpolation of the values of the pixels p1 and p2 using the distances $c_1$ and $c_2$. Here, $c_1$ and $c_2$ are used as filter coefficients.

By replacing the pixel at the original pixel position P by the thus formed pixel Pd, as shown in FIG. 3C, it is possible to correct the aberration. Then, the filter coefficients c1 and c2 associated with the aberration in the image height shown in FIG. 3B are tabulated and stored in the LUT 118. Note that the above-described correction is performed by the image processor 104. The parameters used for the correction processing performed by the image processor 104 are stored in the RAM 119.

FIG. 4 is a flowchart of an image projection process performed by the projector 100 shown in FIG. 1.

In response to an operation for starting projection from the operation section 102, the controller 101 starts the image projection process. The controller 101 sends image data input from one of the card interface 110, the signal input section 111, the communication section 114, and the built-in memory 115 to the additional information-analyzing section 112 via the image data bus 117 (step S302). Then, the additional information-analyzing section 112 determines whether or not the received image data is RAW data obtained by analog-to-digital conversion of an output from the image pickup device for image pickup (step S303). For example, the additional information-analyzing section 112 determines whether or not the received image data is RAW data by analyzing format information included in image pickup information which is written in the header part of an image file, described hereinafter.

If the received image data is RAW data (YES to the step S303), the controller 101 causes the image processor 104 to execute the following steps S304, S307, and S309, in parallel. In the step S304, the image processor 104 reads out the optical correction table stored in the LUT 118 under the control of the controller 101. Then, the image processor s104 sets the optical correction table (table values) as the correction parameters under the control of the controller 101 (step S305). Next, the image processor 104 performs optical correction, such as light quantity reduction correction and aberration correction, on the RAW data, based on the correction parameters (step S306). In the light quantity reduction correction, a light quantity change ratio indicative of a ratio of the quantity of light output from the light source, which is changed by the projection optical system, is reduced.

In the step S307, the image processor 104 sets parameters (development parameters) for developing the RAW data. Note that development refers to image quality adjustment processing concerning white balance, a hue, sharpness, a color space, and so forth. Further, the development parameters are e.g. parameters obtained based on the image pickup information added to the RAW data. The development parameters may be set by a user using the operation section 102. Then, the image processor 104 develops the RAW data using the development parameters to thereby obtain developed data (step S308).

Here, optical correction performed in the step S306 and development performed in the step S308 will be described in detail.

Figure 5:
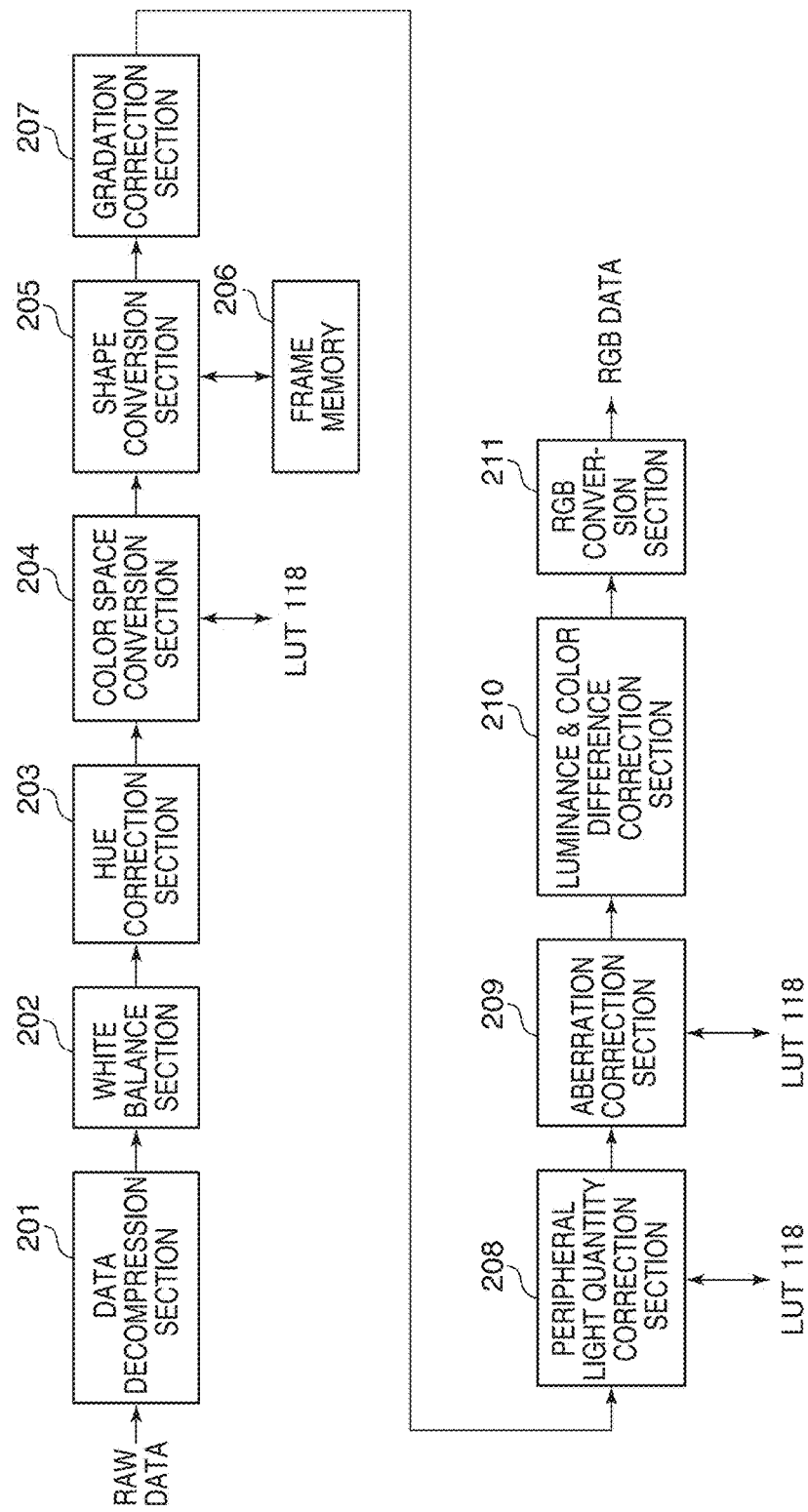
FIG. 5 is a block diagram of an image processor appearing in FIG. 1.

FIG. 5 is a block diagram of the image processor 104 appearing in FIG. 1.

A data decompression section 201 decompresses, in a case where input image data (RAW data in the present example) is in a compressed state, the input image data. A white balance (WB) section 202 multiplies RGB components of the input image data by a WB gain obtained from the controller 101 to thereby correct the white color. A hue correction section 203 performs matrix operation on each of the RGB components using a correction coefficient obtained from the controller 101 to thereby perform hue correction.

A color space conversion section 204 performs color space conversion, such as sRGB color space conversion or Adobe (registered trademark) RGB color space conversion, by referring to the optical correction table stored in the LUT 118. A shape conversion section 205 performs scaling e.g. for enlarging or reducing an image, horizontal inversion and vertical inversion, and correction of trapezoidal distortion caused by a tilt of the projector 100 with respect to a projection plane. A frame memory 206 stores one frame of image data for processing performed by the shape conversion section 205.

A gradation correction section 207 performs gamma correction based on a gradation correction parameter obtained from the controller 101. Note that the gradation correction section 207 may perform gamma correction for correcting reflectivity (or transmittance) characteristics of the liquid crystal display device 106. A peripheral light quantity correction section 208 corrects reduction of the peripheral light quantity by referring to the optical correction table stored in the LUT 118. Note that the peripheral light quantity correction section 208 may correct color unevenness on the liquid crystal display device 106 on an area-by-area basis. An aberration correction section 209 corrects an aberration associated with each image height by referring to the optical correction table (i.e. filter coefficients in the present example) stored in the LUT 118.

A luminance & color difference correction section 210 converts the RGB signals to YUV signals, and performs edge emphasis of a luminance signal and eliminates false color from a color difference signal based on correction parameters obtained from the controller 101. An RGB conversion section 211 converts the YUV signals to RGB signals (RGB data) again, and outputs the RGB signals. Note that the above-mentioned parameters generated by the controller 101 may be stored in the RAM 119, and the image processor 104 may obtain the parameters from the RAM.

Referring again to FIG. 4, in the step S309, the image processor 104 performs only scaling of the RAW data using the shape conversion section 205 to thereby adjust the number of pixels to the number of pixels to be displayed on the liquid crystal display device 106. Then, the image processor 104 drives the liquid crystal-driving section 105 to project an image based on the RAW data as a projected image under the control of the controller 101 without performing other image processing (step S310).

Here, a reason for executing the steps S309 and S310 will be described.

At least several seconds or several ten seconds at maximum are required to perform optical correction processing and development processing on the RAW data. If a projected image is not projected during these processing operations, a viewer may misunderstand that the projector is faulty. To prevent this situation, scaling is performed in parallel with optical correction processing and development processing, and a so-called "makeshift" image starts to be projected within a short time period.

Although in the above-described example, an image subjected to scaling is projected during optical correction processing and development processing, for example, a pattern image, such as "image processing is in progress", may be stored in the RAM 119 in advance, and the pattern image may be projected. Further, only part of areas corresponding to the number of pixels to be displayed on the liquid display device 106 may be projected without performing scaling. Further, it is only required to make the user aware that the projector 100 is not faulty, and hence an image having a single color on the whole screen, such as the whole black screen or the whole white screen, may be projected.

Then, the controller 101 determines whether or not the optical correction processing and the development processing on the RAW data are completed (step S315). If the optical correction processing and the development processing are not completed (NO to the step S315), the controller 101 returns to the steps S304 and S307. In this case, the controller 101 continues projection of the "makeshift" image.

On the other hand, if the optical correction processing and the development processing are completed (YES to the step S315), the controller 101 stops projection of the RAW data, which has been performed by the image processor 104 (step S316). Then, the controller 101 projects an image on which the optical correction processing and the development processing have been performed by the image processor 104 (step S317).

Then, the controller 101 determines whether or not an instruction for updating the projected image has been input from the operation section 102 (step S318). If the instruction for updating the projected image has been input (YES to the step S318), the controller 101 returns to the step S302, and inputs the next image. If the instruction for updating the projected image has not been input (NO to the step S318), the controller 101 determines whether or not an instruction for terminating projection has been input from the operation section 102 (step S319). If the instruction for terminating projection has not been input (NO to the step S319), the controller 101 returns to the step S317, and continues projection of the image. On the other hand, if the instruction for terminating projection has been input (YES to the step S319), the controller 101 terminates the image projection process.

If the image data is not RAW data (NO to the step S303), in a case where the image data is in a compressed state, the controller 101 decompresses the image data by the data decompression section 201 (step S311). Note that when the image data is not in a compressed state, the step S311 is omitted.

If the image data is not RAW data, development processing has already been performed, and hence the controller 101 performs the same processing as the steps S304 to S306 in steps S312 to S314, respectively, to thereby perform optical correction by the image processor 104.

Note that there is a case where when the image data is not RAW data, the image data is input from an interface, such as an HDMI or a Display Port, which is connected to the signal input section 111. In this case, the process sometimes proceeds to the step S317 without executing the steps S312 to S314, i.e. without performing optical correction.

Further, there is a case where only light quantity reduction correction on the peripheral portion by the peripheral light quantity correction section 208 and aberration correction by the aberration correction section 209 are performed without performing other correction. However, processing other than processing performed by the peripheral light quantity correction section 208 and the aberration correction section 209 may be performed on an as-needed basis. For example, scaling processing, horizontal inversion and vertical inversion processing, and trapezoidal correction processing by the shape conversion section 105, gamma correction by the gradation correction section 207, and further, color unevenness correction by the peripheral light quantity correction section 208 may be performed.

As described above, the RAW data is developed while correcting the optical characteristics, and hence considering that the bit depth is large because the RAW data is not compressed, it is possible to correct the optical characteristics without degrading gradation.

Incidentally, although in the above-described example, development and optical correction on the RAW data are performed in the projector 100, development and optical correction may be performed in the external apparatus 100.

Figure 6A:
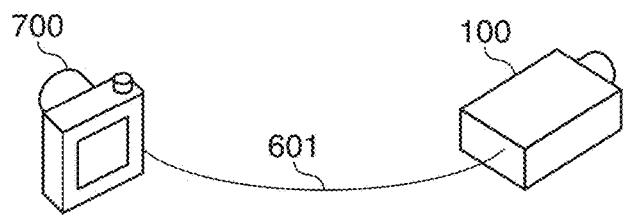
FIGS. 6A to 6C are diagrams useful in explaining three examples of a projection system in which a different external apparatus is connected to the projector, respectively.
Figure 6B:
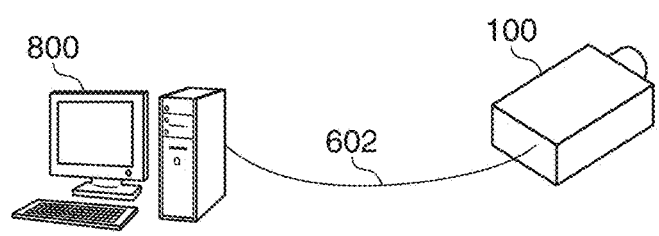
Figure 6C:
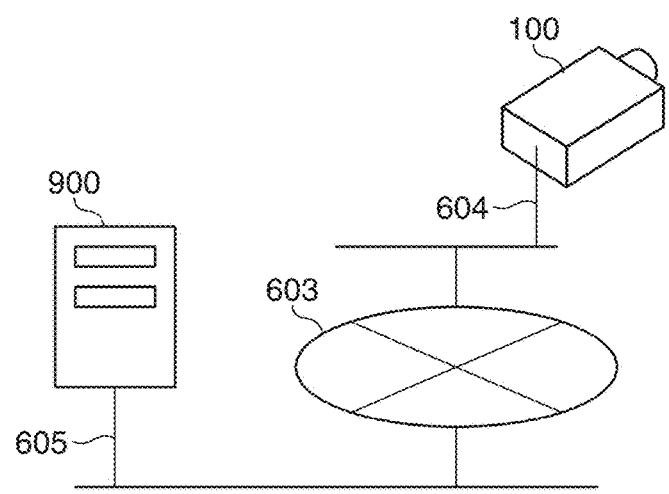

FIGS. 6A to 6C are diagrams useful in explaining three examples of a projection system in which a different external apparatus is connected to the projector, respectively, in which FIG. 6A shows a case where the external apparatus is an image pickup apparatus 700, FIG. 6B shows a case where the external apparatus is a PC 800, and FIG. 6C shows a case where the external apparatus is a server 900.

In FIG. 6A, the projector 100 is connected to the image pickup apparatus 700 which is the external apparatus by a cable 601. In FIG. 6B, the projector 100 is connected to the personal computer (PC) 800 which is the external apparatus by a cable 602. Note that in place of the cables 601 and 602, an HDMI cable or a Display Port cable connected to the signal input section 111 may be used, and further, a wired LAN connected to the communication section 114 may be used. Further, a wireless LAN may be used without using the cables 601 and 602. Further, in FIG. 6B, a signal source, such as a DVD player, may be used in place of the PC 800 as the external apparatus.

In FIG. 6C, the projector 100 is connected to the server 900 via a network (e.g. the Internet) 603. In the illustrated example, the projector 100 and the Internet 603 are connected via a wired LAN cable 604. Further, the server 900 and the Internet 603 are connected via a wired LAN cable 605. Note that the projector 100 and the server 900 may be connected to the Internet 603 via wireless LANs or the like without using the cables 604 and the 605.

In the illustrated examples, the optical characteristics of the optical lens are transmitted from the projector 100 to the external apparatus, such as the image pickup apparatus 700, the PC 800, or the server 900. Then, the external apparatus performs development and optical correction on image data using the received optical characteristics. After that, the developed image data on which optical correction has been performed is transmitted from the external apparatus to the projector 100, and the projector 100 projects an image based on the received image data.

Here, the projection system shown in FIG. 6A will be described. Note that the projector 100 has the same configuration as that shown in FIG. 1.

Figure 7:
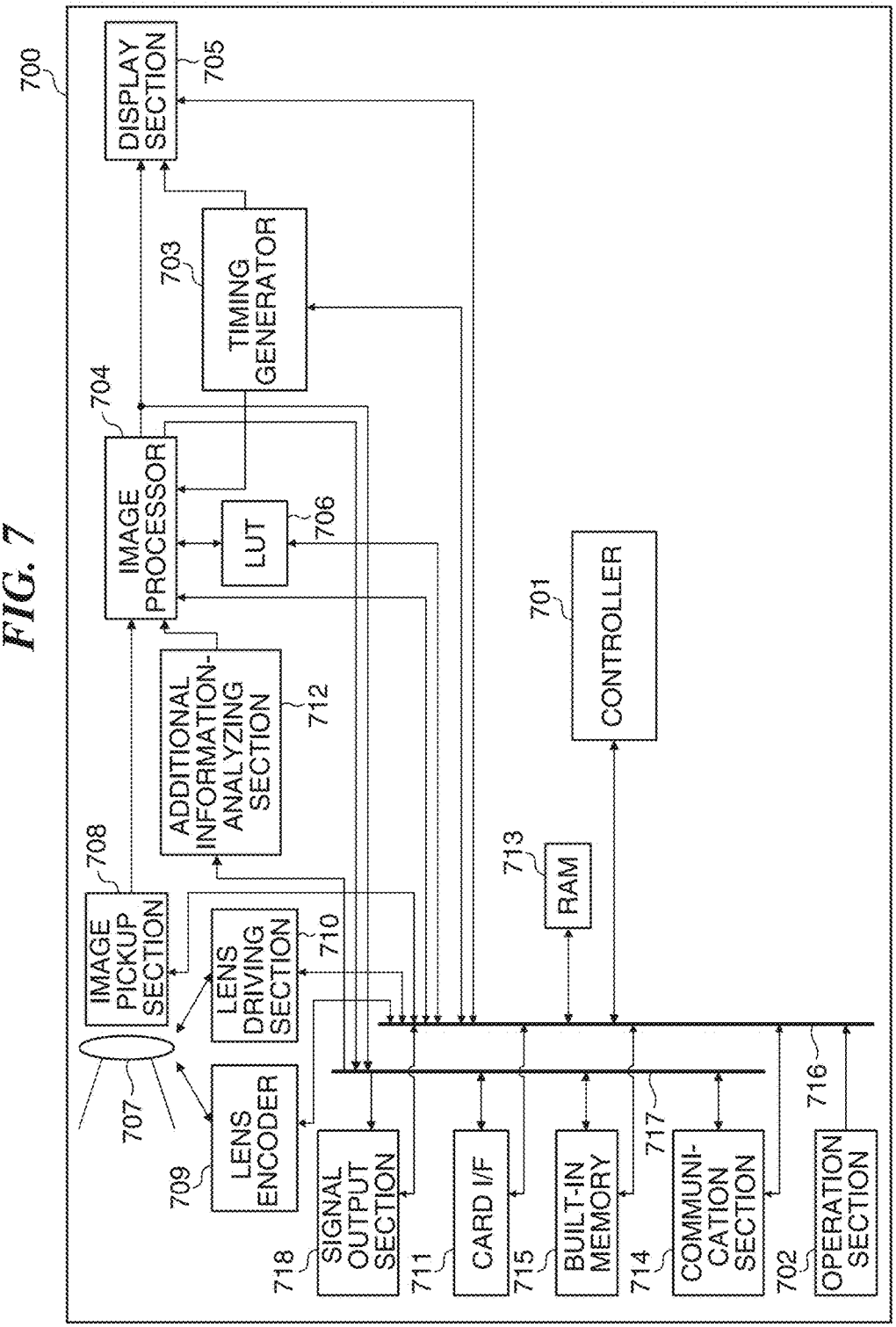
FIG. 7 is a block diagram of an image pickup apparatus (digital camera) as the external apparatus appearing in FIG. 6A.

FIG. 7 is a block diagram of the image pickup apparatus 700 appearing in FIG. 6A.

The image pickup apparatus 700 is e.g. a digital camera (hereinafter simply referred to as the camera), and includes a controller 701. The controller 701 controls the overall operation of the camera 700. An operation section 702 receives an operation performed by an operator. A timing generator 703 generates a synchronization signal (timing signal) to be delivered to an image processor 704 and a display section 705. The image processor 704 performs encoding and correction processing on image data.

The display section 705 drives a liquid crystal display device (not shown) according to the synchronization signal delivered from the timing generator 703, and displays a shot or reproduced image on the liquid crystal display device. A LUT 706 stores the optical characteristics of the projection optical system 109. A shooting lens 707 includes a zoom lens, a focus lens, and so forth. An image pickup section 708 is provided with an image pickup device, such as a CCD or CMOS sensor, and an analog-to-digital converter, and an optical image is formed on the image pickup device via the shooting lens 707. The image pickup device outputs electric signals (analog signals) corresponding to the optical image. The analog-to-digital converter converts the analog signals to digital signals, and outputs the digital signals (image data).

A lens encoder 709 detects a position of the shooting lens 707 (i.e. the zoom lens and the focus lens). A lens driving section 710 drives the shooting lens 707 to perform zooming and focusing.

A card-type recording medium is inserted in a card interface (IF) 711. The card interface 711 is used when various information data files, such as video data, image data, a video file, and an image file, are written into and read from the recording medium. As the recording medium, for example, an SD card or a compact flash is used.

An additional information-analyzing section 712 separates additional information, such as shooting conditions, from image data read from the card interface 711, analyzes the additional information, and sends a result of the analysis to the controller 701. A RAM 713 stores parameters used for correction processing performed by the image processor 704. A communication section 714 transmits and receives various information data files, such as video data, image data, and a video file, and other command signals, to and from the Internet. The communication section 714 is connected to the Internet e.g. via a wired LAN or a wireless LAN. Various information data files are stored in a built-in memory 715. As the built-in memory 715, a semiconductor memory or a hard disk, for example, is used.

A control data bus 716 is used when communication is performed between the controller 701 and the sections of the camera 700. An image data bus 717 is used when image data is transmitted and received between the card interface 711, the additional information-analyzing section 712, the communication section 714, the built-in memory 715, and a signal output section 718.

The signal output section 718 outputs image data to the projector 100. The signal output section 718 includes an HDMI terminal and a Display Port terminal, for example. When the HDMI terminal and the Display Port terminal are used, control signals are transmitted from the camera 700 at the same time, and control of an image and detection of connection are sometimes performed based on the control signals. Further, a control signal can be transmitted from the projector 100 to the camera 700.

Figure 8:
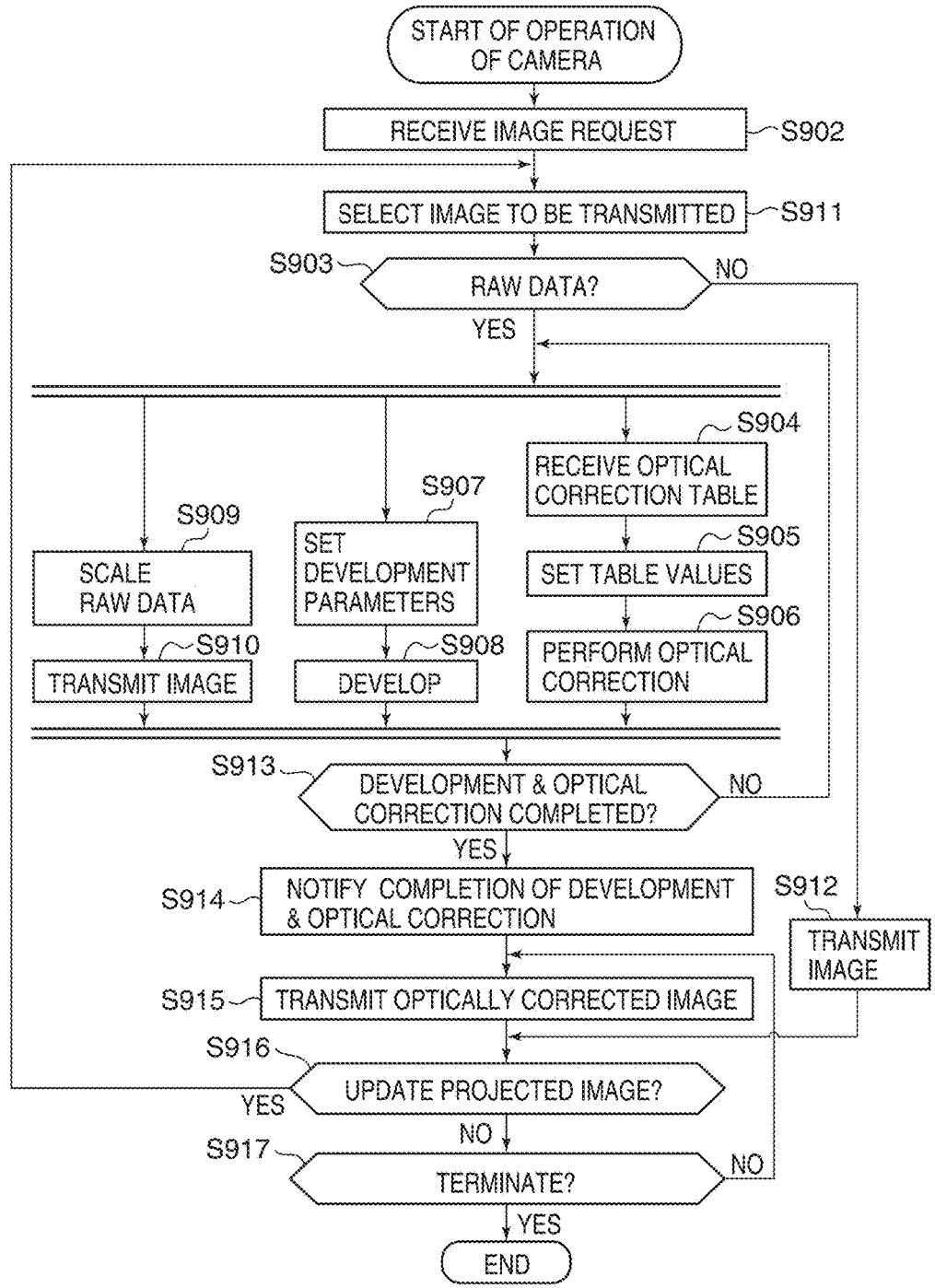
FIG. 8 is a flowchart of a projected image transmission and creation process performed by the digital camera shown in FIG. 7.

FIG. 8 is a flowchart of a projected image transmission and creation process performed by the camera 700 shown in FIG. 7.

In response to a predetermined operation from the operation section 702, the controller 701 starts the operation of the camera 700. Then, the controller 701 receives an image request from the projector 100 (step S902). This image request is received by the communication section 714 e.g. via a LAN. The image request may be received by the signal output section 718 via an HDMI cable or a Display Port cable.

Then, the image processor 704 selects one of image data stored in the recording medium and image data obtained by the image pickup section 708, according to the operation of the operation section 702 under the control of the controller 701 (step S911). At this time, the controller 701 holds selection information indicative of a selected image. Further, the controller 701 transmits the selection information to the projector 100.

The controller 701 determines whether or not the selected image data is RAW data, using the additional information-analyzing section 712 (step S903). Note that the step S903 is the same as the step S303 in FIG. 4.

If the image data is RAW data (YES to the step S903), the controller 701 causes the image processor 704 to execute the following steps S904, S907, and S909, in parallel. In the step S904, the image processor 704 receives the optical correction table stored in the LUT 118 of the projector 100 under the control of the controller 701. After that, the image processor 704 executes steps S905 and S906 under the control of the controller 701. Note that the steps S905 and S906 are the same as the steps S305 and S306 in FIG. 4, respectively.

In the step S907, the image processor 704 sets parameters for developing the RAW data (development parameters) under the control of the controller 701. Then, the image processor 904 develops the RAW data using the development parameters to thereby obtain developed data (step S908). Note that the steps S907 and S908 are the same as the steps S307 and S308 in FIG. 4, respectively.

In the step S909, the image processor 704 performs scaling on the RAW data under the control of the controller 701. Then, the controller 701 transmits the image data on which scaling has been performed to the projector 100 (step S910).

Figure 9:
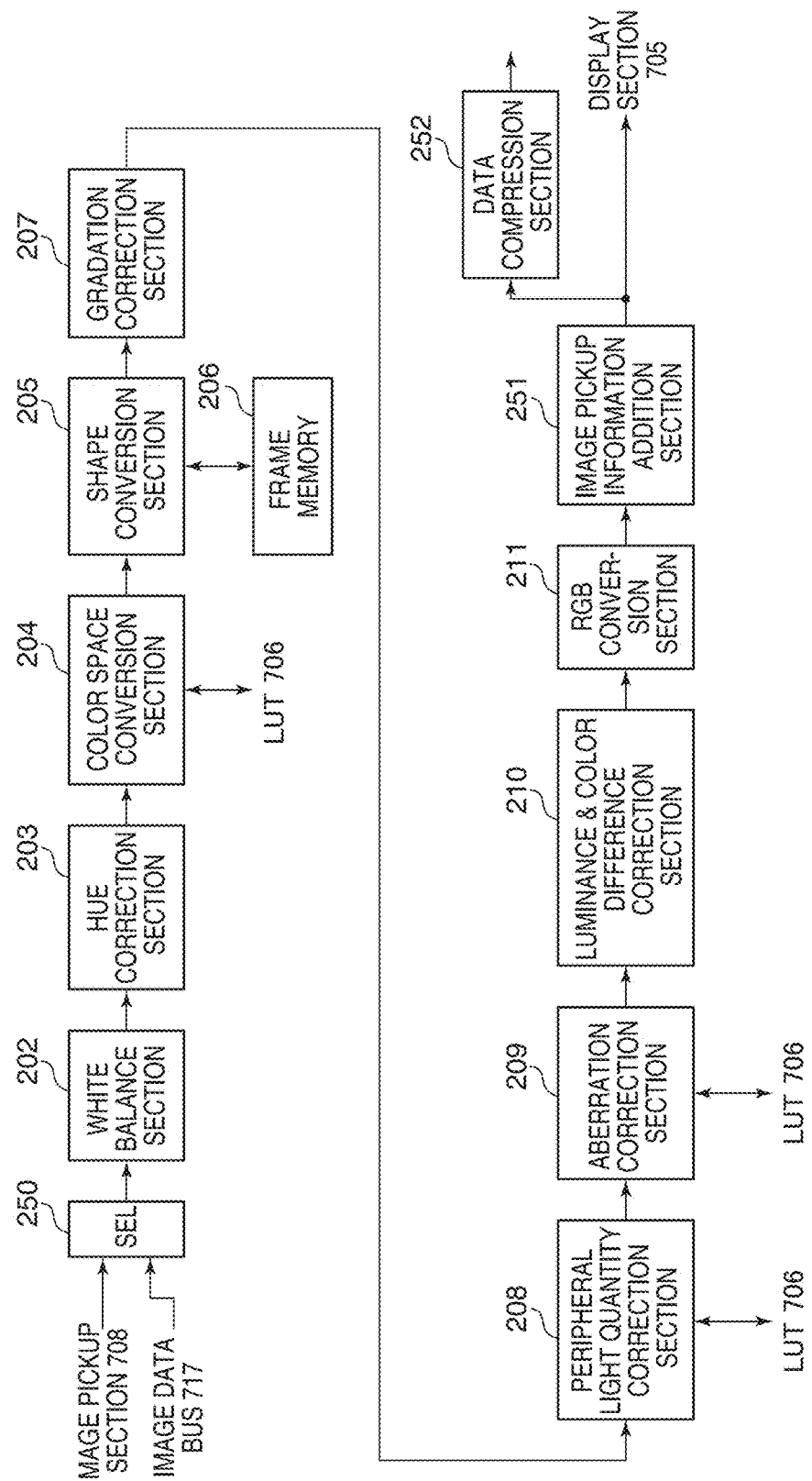
FIG. 9 is a block diagram of an image processor appearing in FIG. 7.

FIG. 9 is a block diagram of the image processor appearing in FIG. 7. In FIG. 9, the same component elements as those of the image processor shown in FIG. 5 are denoted by the same reference numerals, and description thereof is omitted.

The image processor 704 includes a selector (SEL) 250. The SEL 250 selects one of image data obtained by the image pickup section 708 and image data input via the image data bus 717, and sends the selected image data to the white balance section 202. An image pickup information addition section 251 adds, in a case where the image data obtained by the image pickup section 708 is selected, image pickup information to an output from the RGB conversion section 211. The image pickup information includes e.g. an aperture, a shutter speed, an ISO sensitivity, and zoom & focus information.

A data compression section 252 compresses the image data as an output from the image pickup information addition section 251, using a predetermined format. As the predetermined format, for example, jpeg or mpeg is used. Note that when a YCrCb signal is compressed by the data compression section 252, the RGB conversion section 211 is not operated.

Referring again to FIG. 8, the controller 701 determines whether or not the optical correction processing and the development processing on the RAW data are completed (step S913). If the optical correction processing and the development processing are not completed (NO to the step S913), the controller 701 returns to the steps S904 and S907. At this time, the controller 701 continues transmission of the "makeshift" image obtained in the step S909.

On the other hand, if the optical correction processing and the development processing are completed (YES to the step S913), the controller 701 notifies the projector 100 of completion of the optical correction processing and the development processing (step S914). Then, the controller 701 transmits the image data on which the optical correction processing and the development processing have been performed by the image processor 704 to the projector 100 (step S915).

Then, the controller 701 determines whether or not an instruction for updating the projected image has been input from the operation section 702 (step S916). If the instruction for updating the projected image has been input (YES to the step S916), the controller 701 returns to the step S911, and instructs the image processor 704 to select the next image. If the instruction for updating the projected image has not been input (NO to the step S916), the controller 701 determines whether or not an instruction for terminating the operation has been input from the operation section 702 (step S917). If the instruction for terminating the operation has not been input (NO to the step S917), the controller 701 returns to the step S915, and continues transmission of the image data. On the other hand, if the instruction for terminating the operation has been input (YES to the step S917), the controller 701 terminates the operation of the camera.

If the image data is not RAW data (NO to the step S903), the controller 701 transmits the image data to the projector 100 without performing processing by the image processor 704 (step S912). After that, the controller 701 proceeds to the step S916.

In the step S912, since the selected image data is not RAW data, it is judged that development processing has been completed, and the image data is directly transmitted to the projector 100. Further, if the selected image data is in a compressed state, the image data in the compressed state is transmitted to the projector 100.

Figure 10:
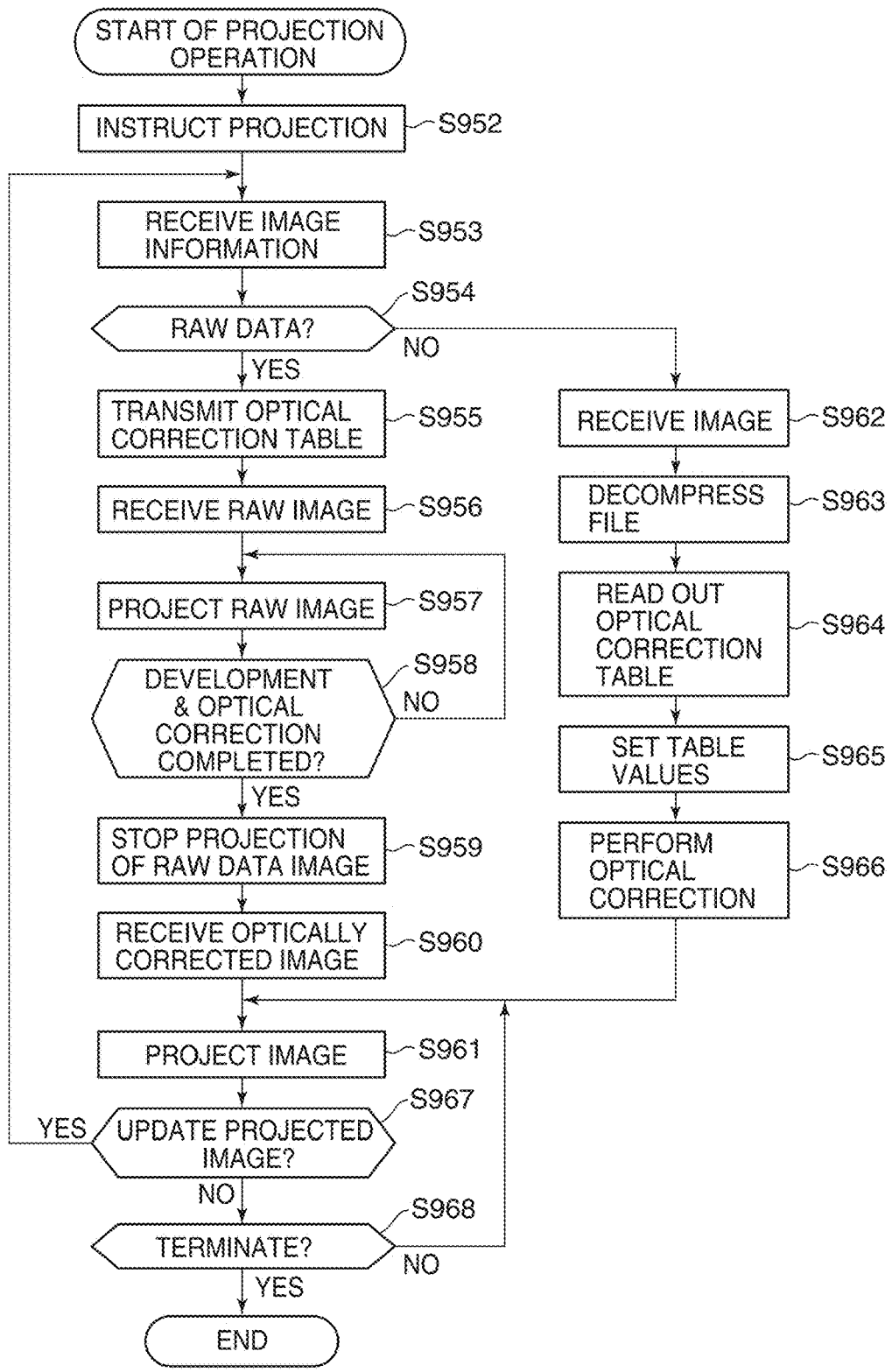
FIG. 10 is a flowchart of an image projection process performed by the projector appearing in FIG. 6A.

FIG. 10 is a flowchart of an image projection process performed by the projector appearing in FIG. 6A.

In response to an operation for starting projection from the operation section 102, the controller 101 starts the projection operation. Then, the controller 101 transmits a projection instruction to the camera 700 (step S952). After that, the controller 101 receives the above-mentioned selection information (also referred to as the image information) from the camera 700 via the signal input section 111 or the communication section 114 (step S953).

Then, the controller 101 determines whether or not the image data transmitted from the camera 700 is RAW data by referring to the image information (step S954). If the image data transmitted from the camera 700 is RAW data (YES to the step S954), the controller 101 reads out the optical correction table stored in the LUT 118, and transmits the optical correction table to the camera 700 (step S955).

Then, the controller 101 receives the RAW data on which only scaling has been performed from the camera 700 (step S956). Then, the controller 101 projects an image corresponding to the RAW data as described above (step S957). This projected image is a "makeshift" image projected while the optical correction processing and the development processing are being performed in the camera 700. That is, the image corresponding to the RAW data is projected from the projection optical system 109 without performing processing by the image processor 104.

Next, the controller 101 determines whether or not the optical correction processing and the development processing are completed in the camera 700 (step S958). In this step, the controller 101 determines whether or not a notification indicative of completion of optical correction processing and development processing has been received from the camera 700.

If the optical correction processing and the development processing are not completed (NO to the step S958), the controller 101 returns to the step S957 to continue projection of the makeshift image. On the other hand, if the optical correction processing and the development processing are completed (YES to the step S958), the controller 101 stops projection of the image corresponding to the RAW data (step S959).

Then, the controller 101 receives image data on which the optical correction processing and the development processing have been performed from the camera 700 (step S960). Then, the controller 101 projects an image corresponding to the received image data from the projection optical system 109 (step S961). In this case, the optical correction processing and the development processing are completed in the camera 700, and hence the image processor 104 is not required to perform any further processing. However, the image processor 104 may perform processing on an as-needed basis.

If the image data transmitted from the camera 700 is not RAW data (NO to the step S954), i.e. if the development processing has been completed at the time of image pickup, the controller 101 receives the image data from the camera 700 via the signal input section 111 or the communication section 114 (step S962). After that, the controller 101 executes steps S963 to S966. The steps S963 to S966 are the same as the steps S311 to S314 in FIG. 4, respectively, and hence description thereof is omitted. Then, the controller 101 proceeds to the step S961, and projects the image.

Note that in a case where image data which is not RAW data is input from the camera 700 via an interface, such as an HDMI or a Display Port, which is connected to the signal input section 111, the optical correction in the steps S964 to S966 is sometimes not performed. In this case, the process proceeds from the step S963 directly to the step S961.

After execution of the step S961, the controller 101 executes steps S967 and S968. Note that the steps S967 and S968 are the same as the steps S318 and S319 in FIG. 4, respectively, and hence description thereof is omitted.

Figure 11:
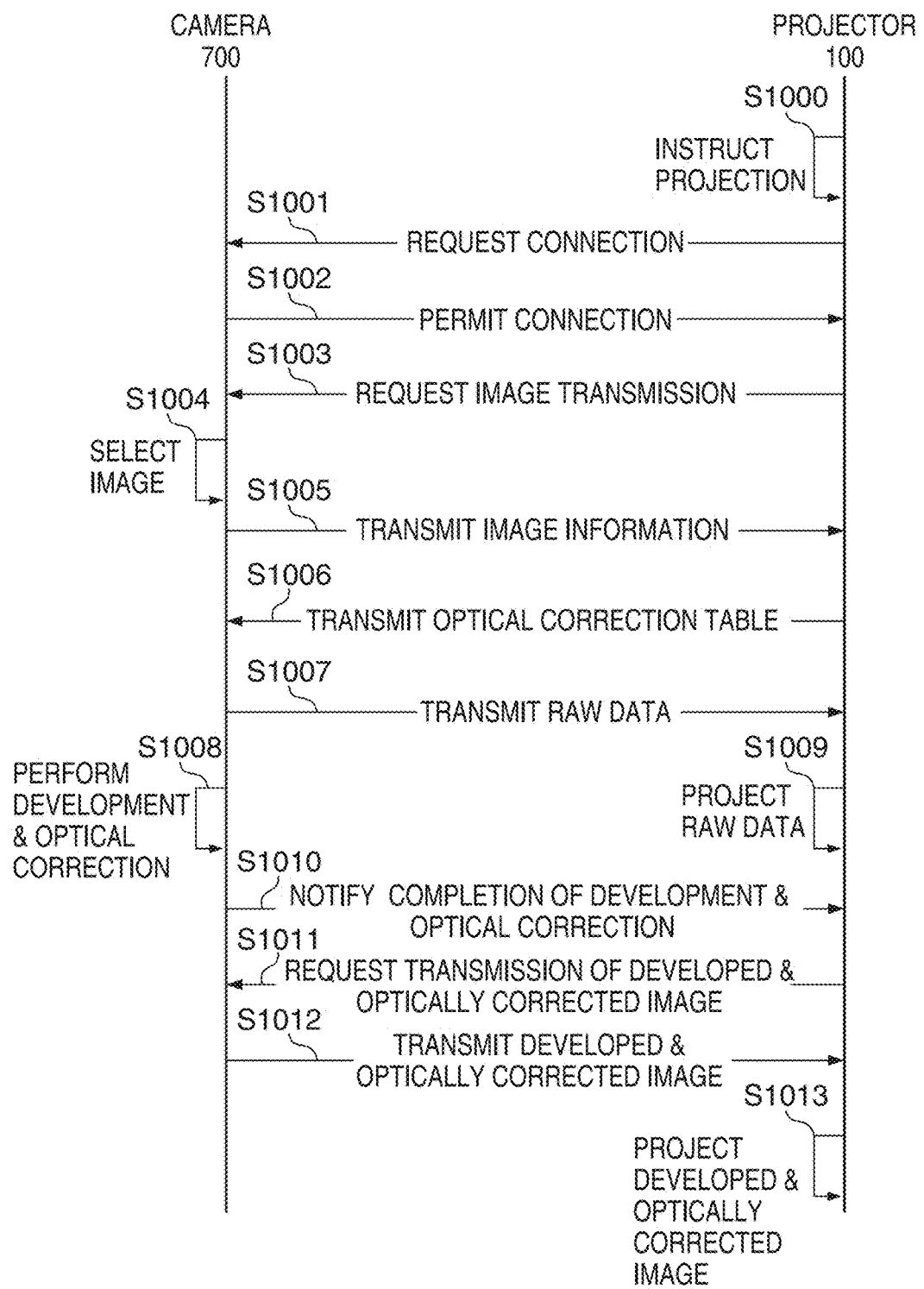
FIG. 11 is a sequence diagram useful in explaining communication performed between the projector and the external apparatus (digital camera), shown in FIG. 6A.

FIG. 11 is a sequence diagram useful in explaining communication performed between the projector 100 and the camera 700 shown in FIG. 6A.

In a step S1000, an operator operates the operation section 102 of the projector 100 to instruct the start of projection. In response to this instruction, in a step S1001, the projector 100 transmits a connection request to the camera 700. In a step S1002, the camera 700 having received the connection request permits the projector 100 to connect thereto, and establishes logical connection therewith.

Then, in a step S1003, the projector 100 requests the camera 700 to transmit an image to be projected. Then, in a step S1004, the operator operates the operation section 702 to select the image to be projected.

In a step S1005, image information of the selected image is transmitted from the camera 700 to the projector 100. That is, information indicative of whether the selected image is RAW data or developed image data is transmitted. In a step S1006, if the image data is RAW data, the optical correction table stored in the LUT 118 is transmitted from the projector 100 to the camera 700. Then, in a step S1007, the RAW data is transmitted from the camera 700 to the projector 100 as "makeshift" image data.

Then, in a step S1008, the camera 700 performs the development processing on the RAW data, and the optical correction processing on the same using the optical correction table received from the projector 100. On the other hand, in a step S1009, the projector 100 projects an image corresponding to the RAW data received in the step S1007.

In a step S1010, a notification indicative of termination of the development processing and the optical correction processing is transmitted from the camera 700 to the projector 100. In response to the notification indicative of termination of the development processing and the optical correction processing, in a step S1011, the projector requests the camera 700 to transmit image data on which the development processing and the optical correction processing have been completed.

In a step S1012, the image data on which the development processing and the optical correction processing have been completed is transmitted from the camera 700 to the projector 100. In a step S1013, the projector 100 projects an image corresponding to the image data on which the development processing and the optical correction processing have been completed.

As described above, in the above-described example, data concerning the optical characteristics is transmitted from the projector 100 to the external apparatus, and RAW data is developed in the external apparatus while correcting the optical characteristics of the lens. Then, image data on which the development processing and the optical correction processing have been performed is transmitted from the external apparatus to the projector 100, and is projected by the projector 100. Thus, even when the development processing and the optical correction processing on RAW data are performed in the external apparatus, it is possible to correct the optical characteristics without degrading gradation.

Note that although in the present example, after an operation for instructing the start of projection is performed on the projector 100, an image to be projected is selected in the external apparatus, this is not limitative. For example, an instruction for the start of projection may be generated by the external apparatus, and the instruction may be transmitted from the external apparatus to the projector 100. Further, an image to be projected may be selected in the projector 100, and a result of the selection may be transmitted to the external apparatus.

Although the above description is given of the projection system including the projector 100 and the camera 700, shown in FIG. 6A, the above-described process is similarly performed also for the system using the PC 800 appearing in FIG. 6B. Further, the above-described process is similarly performed also for the system using the server 900 appearing in FIG. 6C. In these cases, the RAW data is stored in a storage device, such as a hard disk, provided in the PC 800 or the server 900.

Next, a description will be given of a projector according to a second embodiment of the present invention. The projector according to the second embodiment has the same hardware configuration as that of the projector shown in FIG. 1.

In the second embodiment, processing for correcting RAW data is controlled according to the state of the projection optical system 109 and the state of the liquid crystal-driving section 105. Further, in the second embodiment, a plurality of RAW data items are obtained by image pickup of an object which is performed by changing the shooting conditions, and one of the plurality of RAW data items is selected according to an image height of the projection lens. Then, correction processing is controlled while changing RAW data to be selected, according to the state of the projection optical system 109 and the state of the liquid crystal-driving section 105.

Figure 12A:
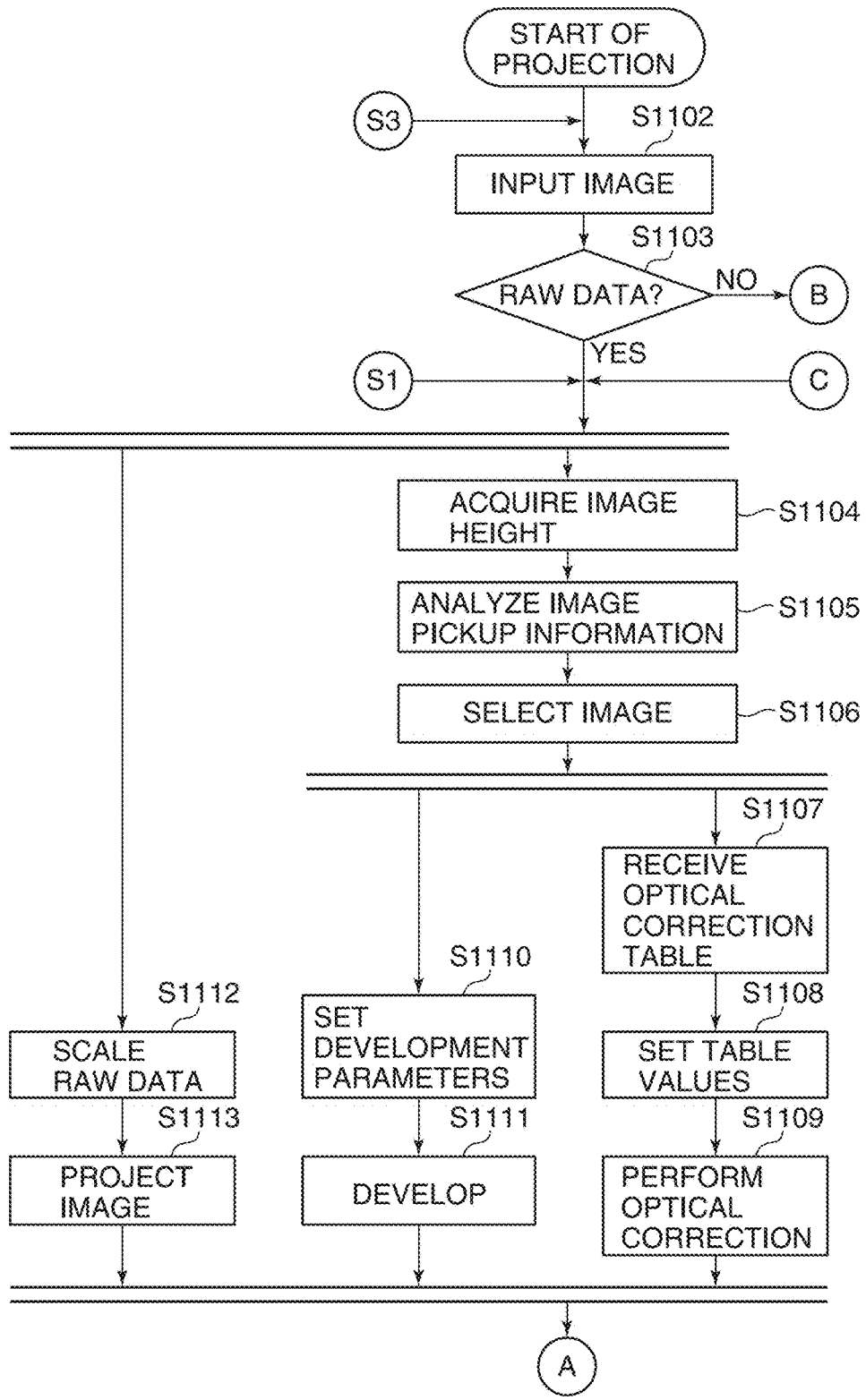
FIG. 12A is a flowchart of an image projection process performed by a projector according to a second embodiment of the present invention.
Figure 12B:
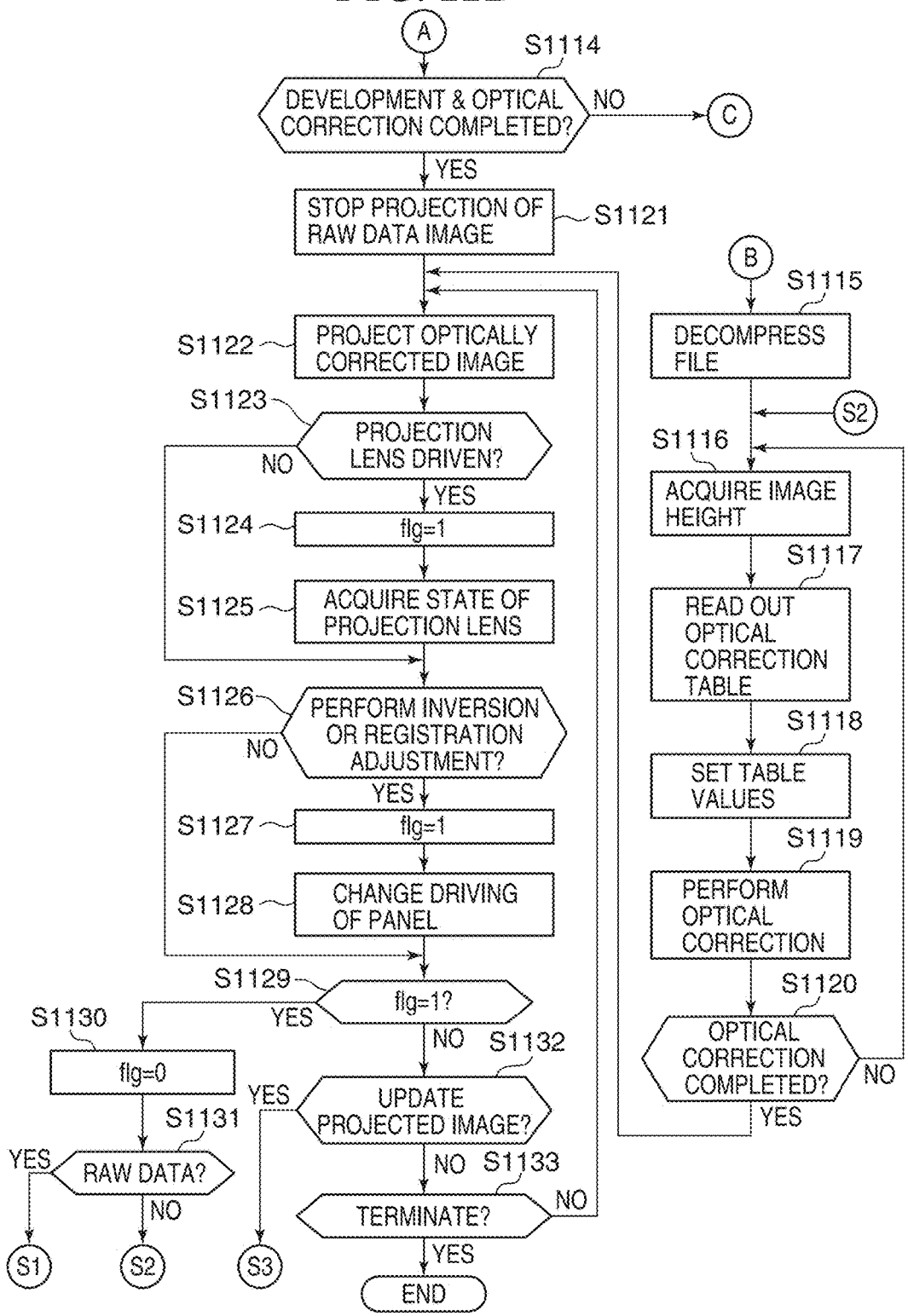
FIG. 12B is a continuation of FIG. 12A.

FIGS. 12A and 12B are a flowchart of an image projection process performed by the projector according to the second embodiment.

In response to an operation for starting projection from the operation section 102, the controller 101 starts the projection operation. The controller 101 sends image data input from one of the card interface 110, the signal input section 111, the communication section 114, and the built-in memory 115, to the additional information-analyzing section 112 via the image data bus 117 (step S1102). Then, the additional information-analyzing section 112 determines whether or not the received image data is RAW data obtained by analog-to-digital conversion of an output from the image pickup device for image pickup (step S1103). For example, the additional information-analyzing section 112 determines whether or not the received image data is RAW data by analyzing the format information included in the image pickup information which is written in the header part of image data (image file).

Figures 13A, 13B:
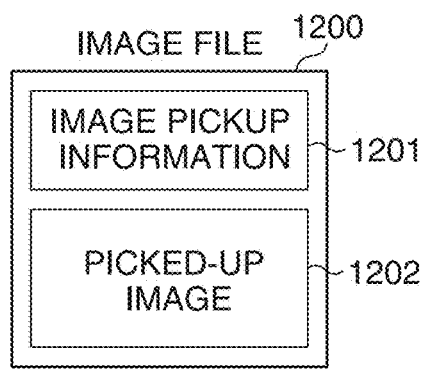
FIGS. 13A to 13C are diagrams useful in explaining the configuration of an image file.
Figure 13C:
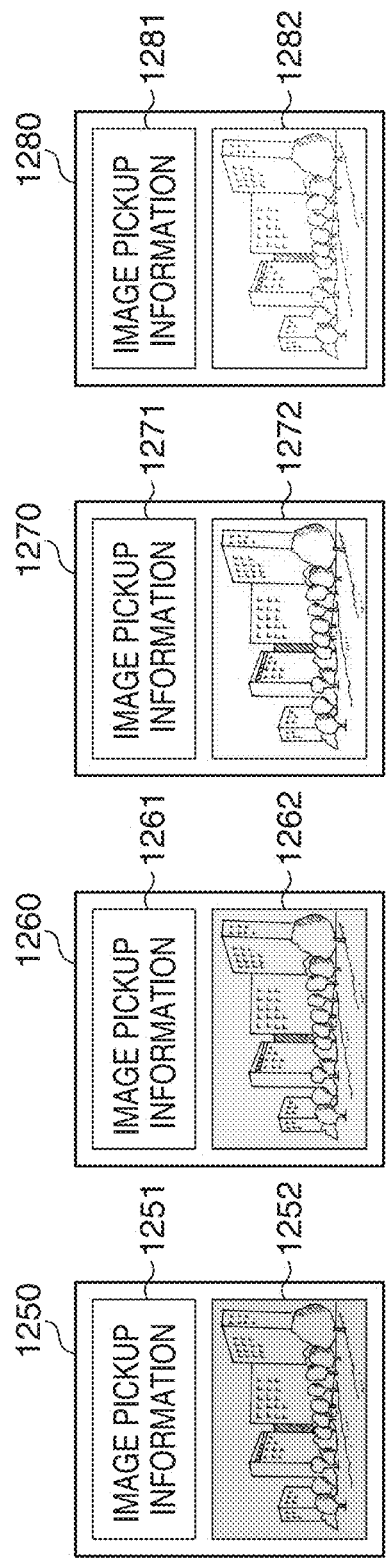

FIGS. 13A to 13C are diagrams useful in explaining the format of an image file, in which FIG. 13A shows the format of the image file, FIG. 13B shows an example of image pickup information, and FIG. 13C shows a plurality of image files obtained by image pickup of the same photographic scene by changing the shooting conditions.

As shown in FIG. 13A, the image file, denoted by reference numeral 1200, includes image pickup information 1201 as the header part and a picked-up image 1202 obtained by shooting. As shown in FIG. 13B, the image pickup information 1201 includes items 1211 to 1216, as shooting conditions, and values 1217 to 1222, used for shooting, which are associated with the items 1211 to 1216, respectively.

When determining in the step S1103 whether or not the image file is RAW data, the additional information-analyzing section 112 analyzes the value 1217 of the format information in the item 1211. In the format information 1211, "RAW" is recorded as the value 1217, and hence the additional information-analyzing section 112 determines that the image file is RAW data. Note that the items 1211 to 1216 are each shown by way of example, and the values 1217 to 1222 are also each shown by way of example.

Referring again to FIGS. 12A and 12B, if the image data is RAW data (YES to the step S1103), the controller 101 executes the following steps S1104 and S1112, in parallel. In the step S1104, the controller 101 acquires an image height of pixel data, as described hereinafter.

Figure 14A:
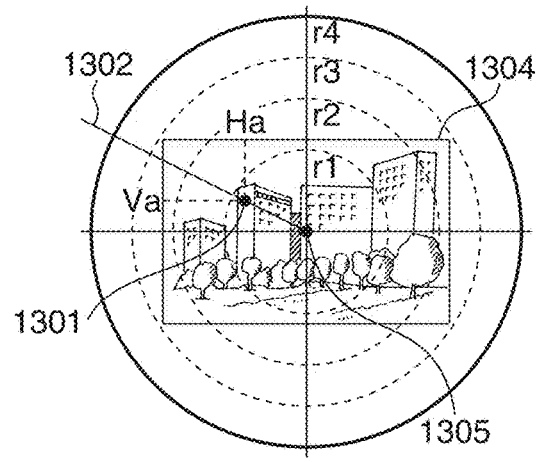
FIGS. 14A to 14C are diagrams useful in explaining acquisition of an image height, which is performed in a corresponding step in FIG. 12A.
Figure 14B:
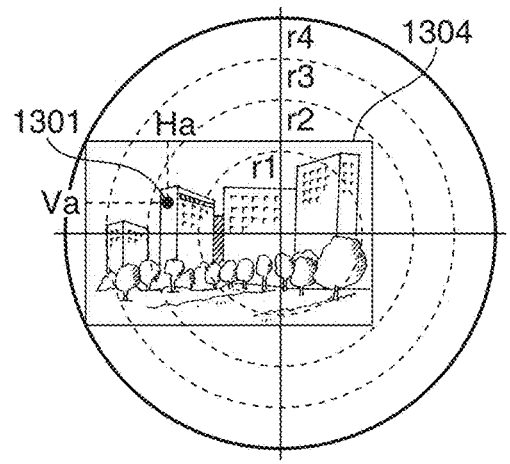
Figure 14C:
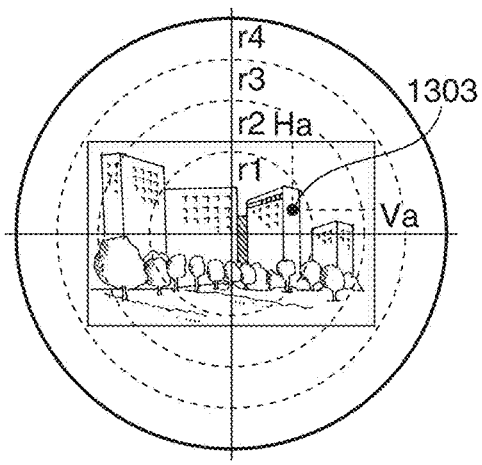

FIGS. 14A to 14C are diagrams useful in explaining acquisition of an image height, which is performed in the step S1104 in FIG. 12A. FIG. 14A shows an area corresponding to an image height, and FIG. 14B shows an area corresponding to the image height when the projection optical system is shifted. FIG. 14C shows an area corresponding to the image height when the image is horizontally rotated.

Referring to FIG. 14A, a circle indicated by a solid line represents an area of the maximum image height r4 on the zoom lens 1091 and the focus lens 1093. Circles indicated by dot lines represent areas of the image heights r1, r2, and r3, respectively. The controller 101 detects, based on the synchronization signal obtained from the timing generator 103, a position in the whole screen which corresponds to an area of image data being currently processed. For example, the controller 101 detects that pixel data 1301 being processed is located at a distance Ha in the horizontal direction from a left end of an effective area 1304 of the image, shown in FIG. 14A, and at a distance Va in the vertical direction from an upper end of the effective area 1304 of the image.

Further, the controller 101 obtains detection values indicative of the position of the lens, from the zoom encoder 1092, the focus encoder 1094, and the shift encoder 1096, respectively. Further, the controller 101 acquires an image height of the pixel data 1301 being currently processed. In the illustrated example in FIG. 14A, referring to the values of the distances Ha and Va, obtained from the timing generator 103, and the detection values indicative of the position of the lens, acquired from the encoders, respectively, it is known that the image height of the pixel data 1301 is slightly smaller than the image height r1.

Next, the additional information-analyzing section 112 analyzes the image pickup information 1201 written in the header part of the image file 1200 under the control of the controller 101 (step S1105). In this step, the additional information-analyzing section 112 analyzes the items 1212 to 1216 other than the format information 1211 analyzed in the step S1103.

Here, referring to FIGS. 13B and 13C, now, let it be assumed that in shooting, the same scene is shot by changing the aperture (F No.) 1212, whereby four image files 1250, 1260, 1270, and 1280 are obtained, as shown in FIG. 13C. In the illustrated example, the diaphragm is opened wider, i.e. the F number is lowered, in the order of the image files 1250, 1260, 1270, and 1280. As a result, picked-up images 1252, 1262, 1272, and 1282 gradually become brighter in the mentioned order.

As described above, the four image files 1250, 1260, 1270, and 1280 are obtained by shooting the same scene by changing the F number. Therefore, the additional information-analyzing section 112 acquires the value 1218 of the F number 1212 included in the image pickup information 1251, 1261, 1271, and 1281 as a result of the analysis.

Next, the controller 101 selects an image to be used for projection from the image files 1250, 1260, 1270, and 1280, based on the F number obtained in the step S1105, the image height acquired in the step S1104, and the light quantity reduction characteristics stored in the LUT 118 (step S1106).

In the illustrated example in FIG. 14A, in an area having an image height of not larger than r1, the image height is small and the quantity of light is not reduced, and hence the controller 101 selects the image 1252 which is the darkest of the four. In an area having an image height of larger than r1 and not larger than r2, the quantity of light is somewhat reduced, and hence the controller 101 selects the image 1262 which is the second darkest next to the image 1252.

Similarly, in an area having an image height of larger than r2 and not larger than r3, the controller 101 selects the image 1272. Further, in an area having an image height of larger than r3 and not larger than r4, the controller 101 selects the image 1282.

Thus, by selecting one image from the four images according to each image height and combining the selected images of the respective areas associated with the image heights, one projected image is obtained. Although in the above-described example, the description is given of the case where four image files are obtained by changing the shooting conditions, the number of image files is not limited to four. Further, in a case where only one image file is obtained, the step S1106 is omitted.

Figure 15A:
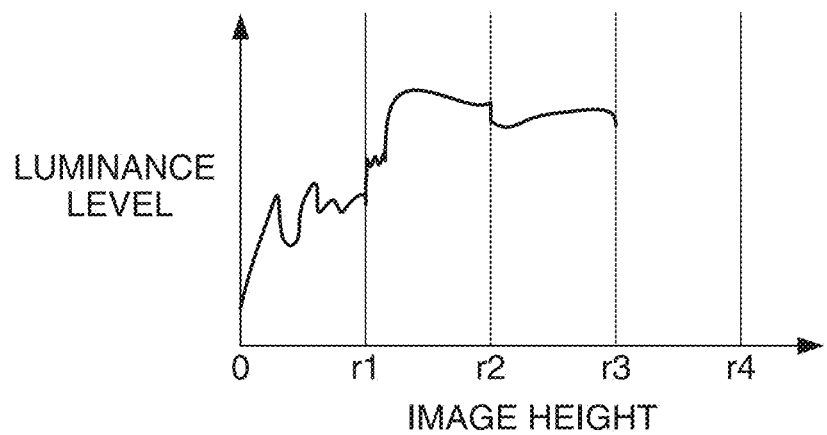
FIGS. 15A and 15B are diagrams useful in explaining a relationship between an image height and a luminance level.
Figure 15B:
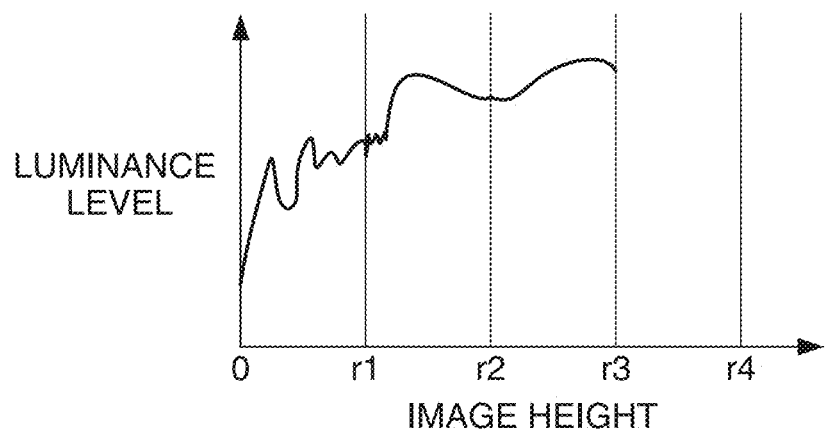

After an image is selected for each image height in the step S1106, the controller 101 causes the image processor 104 to execute steps S1107 and S1110, in parallel. Note that the steps S1107 to S1111 are the same as the steps S304 to S308 in FIG. 4, respectively. However, in a case where one projected image is obtained by selecting one from a plurality of images for each image height and combining the selected images, a stepped difference in luminance level may be caused between each adjacent areas. In this case, the stepped difference is corrected in the following manner:

FIGS. 15A and 15B are diagrams useful in explaining a relationship between the image height and the luminance level. FIG. 15A shows a state before correcting a stepped difference, and FIG. 15B shows a state after correcting the stepped difference.

FIG. 15A shows a relationship between the image height of the pixel data 1301 on a straight line 1302 passing through the center of an optical axis 1305 appearing in FIG. 14A and the luminance level of the effective area 1304 of the image. In FIG. 15A, the selected image is changed between the image heights r1 and r2, which sometimes generates a stepped difference in luminance level. Therefore, the generated stepped difference is acquired by the gradation correction section 207 and the peripheral light quantity correction section 208. The controller 101 determines, based on the stepped difference, a gain and an offset for use in setting development parameters used in the step S1110, described hereinafter, and table values in a step S1108. Then, the gradation correction section 207 and the peripheral light quantity correction section 208 correct the stepped difference according to the determined gain and offset. With this, for example, the stepped difference appearing in FIG. 15A is eliminated, and the state shown in FIG. 15A is changed to the state shown in FIG. 15B.

Referring again to FIGS. 12A and 12B, in a step S1112, the image processor 104 causes the shape conversion section 205 to perform scaling of the RAW data. Then, the image processor 104 drives the liquid crystal-driving section 105 under the control of the controller 101 without performing other processing, to project the image data based on the RAW data as a projected image (step S1113).

Then, the controller 101 determines whether or not the optical correction processing and development processing on the RAW data are completed (step S1114). If the optical correction processing and the development processing on the RAW data are not completed (NO to the step S1114), the controller 101 returns to the steps S1104 and S1112. In this case, the controller 101 continues projection of the "makeshift" image.

On the other hand, if the optical correction processing and the development processing on the RAW data are completed (YES to the step S1114), the controller 101 stops projection using the RAW data, which has been performed by the image processor 104 (step S1121). Then, the controller 101 projects an image on which the optical correction processing and the development processing have been performed by the image processor 104 (step S1122).

If the image data is not RAW data (NO to the step S1103), the controller 101 causes, in a case where the image data is in a compressed state, the data decompression section 201 to decompress the compressed image data (step S1115). Then, the controller 101 acquires the image height of the image data being currently processed, in the similar manner to the step S1104 (step S1116).

Then, the image processor 104 reads out the optical correction table associated with the image height acquired in the step S1116 from the LUT 118 under the control of the controller 101 (step S1117). After that, the image processor 104 executes steps S1118 and S1119. Note that the steps S1118 and S1119 are the same as the steps S313 and S314 in FIG. 4, respectively.

Next, the controller 101 determines whether or not the optical correction processing is completed for all areas of the image (step S1120). If the optical correction processing is not completed for all areas of the image (NO to the step S1120), the controller 101 returns to the step S1116. On the other hand, if the optical correction processing is completed for all areas of the image (YES to the step S1120), the controller 101 proceeds to the step S1122.

Note that there is a case where when the image data is not RAW data, the image data is input from an interface, such as the HDMI or the Display Port, which is connected to the signal input section 111. In this case, the process sometimes proceeds to the step S1122 without executing the steps S1116 to S1120, i.e. without performing optical correction.

Then, the controller 101 determines whether or not the projection optical system 109 has been driven by referring to outputs from the zoom encoder 1092, the focus encoder 1094, and the shift encoder 1096 (step S1123).

Here, a description will be given of the driving of the projection optical system 109 with reference again to FIGS. 14A to 14C.

Now, let it be assumed that the projection state shown in FIG. 14A is changed to the projection state shown in FIG. 14B by optically shifting the projection optical system 109 to the right. At this time, the image height of the pixel data 1301 becomes slightly smaller than r2. This means that the image height of the pixel data of the effective area 1304 of the image is changed. Therefore, in a case where the projection optical system 109 is optically shifted, it is necessary to perform the optical correction processing again according to the optical characteristics. Further, in a case where the zoom operation or the focus operation is performed as well, it is necessary to perform the optical correction processing again, since the optical characteristics are changed.

If the projection optical system 109 has not been driven (NO to the step S1123), the controller 101 proceeds to a step S1126, described hereinafter. If the projection optical system 109 has been driven (YES to the step S1123), the controller 101 turns on a flag flg stored in the built-in memory or the RAM 119 to set flg=1 (step S1124).

Then, the controller 101 acquires the state of the projection optical system 109 by referring to outputs from the zoom encoder 1092, the focus encoder 1094, and the shift encoder 1096 (step S1125). With this, the controller 101 can grasp the zoom magnification, the focus position, and the optical shift amount of the projection optical system 109, and thereby detect a change in the zoom magnification, a change in the focus position, and a change in the optical shift amount. Then, the controller 101 determines whether or not there is given an instruction for changing a positional relationship between the liquid crystal display device 106 and the image, such as inversion of the image or registration adjustment (step S1126). That is, the controller 101 determines whether or not the driving state of the liquid crystal display device 106 has been changed.

Here, a description will be given of a case where the image is horizontally inverted, with reference to FIGS. 14A to 14C again.

Now, assuming that the setting of horizontal inversion (inversion setting) is changed from the projection state shown in FIG. 14A, this results in the projection state shown in FIG. 14C. That is, the point 1301 in FIG. 14A is moved to a point 1303 in FIG. 14C by horizontal inversion of the image. This means that the image height of a specific pixel is changed by horizontal inversion.

Next, registration adjustment will be described. In a case where three liquid crystal display devices 106 are used for respective RGB components, fixed positions of the respective liquid crystal display devices 106 are sometimes misregistered. Therefore, an amount of delay of image data is adjusted by the liquid crystal-driving section 105 on a pixel-by-pixel basis for each of the RGB components to thereby correct the misregistration of the fixed positions. For this reason, when the registration adjustment is performed, the image height of each pixel is changed, and hence it is necessary to perform the optical correction processing again.

If the driving state of the liquid crystal display device 106 is not changed (NO to the step S1126), the controller 101 proceeds to a step S1129, described hereinafter. On the other hand, if the driving state of the liquid crystal display device 106 is changed (YES to the step S1126), the controller 101 turns on the flag flg stored in the built-in memory or the RAM 119 to set flg=1 (step S1127).

Then, the controller 101 controls the liquid crystal-driving section 105 to change the driving of the liquid crystal display device 106 based on the change in the driving state of the liquid crystal display device 106, which is detected in the step S1126 (step S1128: change driving of panel). Then, the controller 101 determines whether or not the flag flg=1 holds (step S1129).

If the flag flg=1 holds (YES to the step S1129), i.e. if at least one of the driving state of the projection optical system 109 and the driving state of the liquid crystal display device 106 has been changed, the controller 101 clears the flag flg to set flg=0 (step S1130). Then, the controller 101 determines whether or not an image corresponding to the RAW data is being currently projected (step S1131).

If an image corresponding to the RAW data is being projected (YES to the step S1131), the controller 101 returns to the steps S1104 and S1112. As described above, if at least one of the driving sate of the projection optical system 109 and the driving state of the liquid crystal display device 106 is changed, the relationship between the projected image and the optical characteristics is changed. Therefore, the controller 101 executes the steps S1107 to S1109 to thereby perform the optical correction processing again. In parallel with this processing, the controller 101 also executes the steps S1110 to S1113. However, if the image data on which only scaling has been performed in the step S1112 is stored in the frame memory 206, the step S1112 may be omitted.

On the other hand, if an image corresponding to the RAW data is not being projected (NO to the step S1131), the controller 101 returns to the step S1116. Also in this case, similar to the case where the image corresponding to the RAW data is being projected, if at least one of the driving state of the projection optical system 109 and the driving state of the liquid crystal display device 106 is changed, the relationship between the projected image and the optical characteristics is changed. Therefore, the controller 101 performs the optical correction processing again in the steps S1116 to S1120.

If the flag flg=0 holds (NO to the step S1129), the controller 101 judges that neither the driving state of the projection optical system 109 nor the driving state of the liquid crystal display device 106 has been changed. That is, the controller 101 judges that the relationship between the projected image and the optical characteristics has not been changed. Then, the controller 101 determines whether or not an instruction for updating the projected image has been input from the operation section 102 (step S1132). If the instruction for updating the projected image has been input (YES to the step S1132), the controller 101 returns to the step S1102, and inputs the next image.

If the instruction for updating the projected image has not been input (NO to the step S1132), the controller 101 determines whether or not an instruction for terminating projection has been input from the operation section 102 (step S1133). If the instruction for terminating projection has not been input (NO to the step S1133), the controller 101 returns to the step S1122, and continues projection of the image. On the other hand, if the instruction for terminating projection has been input (YES to the step S1133), the controller 101 terminates the image projection process.

As described above, in the second embodiment, if at least one of the driving state of the projection optical system and the driving state of the liquid crystal display device is changed to change the relationship between the projected image, and the lens position and the image height, the correction data associated with the image height is read out again. With this, the optical correction processing on the RAW data is performed again. This makes it possible to always perform proper optical correction.

Further, in a case where a plurality of RAW data items are obtained by shooting the same scene by changing the shooting conditions, one of the plurality of RAW data items is selected according to the image height of the projection optical system, and the optical correction processing is performed thereon. This makes it possible to perform proper optical correction for all areas of the projected image.

Incidentally, although in the above-described example, the development processing and the optical correction processing on RAW data are performed in the projector 100, the development processing and the optical correction processing may be performed in an external apparatus. In this case, as described with reference to FIGS. 6A to 6C, a projection system in which the external apparatus is connected to the projector 100 is used.

Here, a description will be given of a case where the above-described process is performed in the projection system shown in FIG. 6A. Note that the projector 100 has the same configuration as that of the projector shown in FIG. 1, and the external apparatus (camera) has the same configuration as that of the camera shown in FIG. 7.

Figure 16:
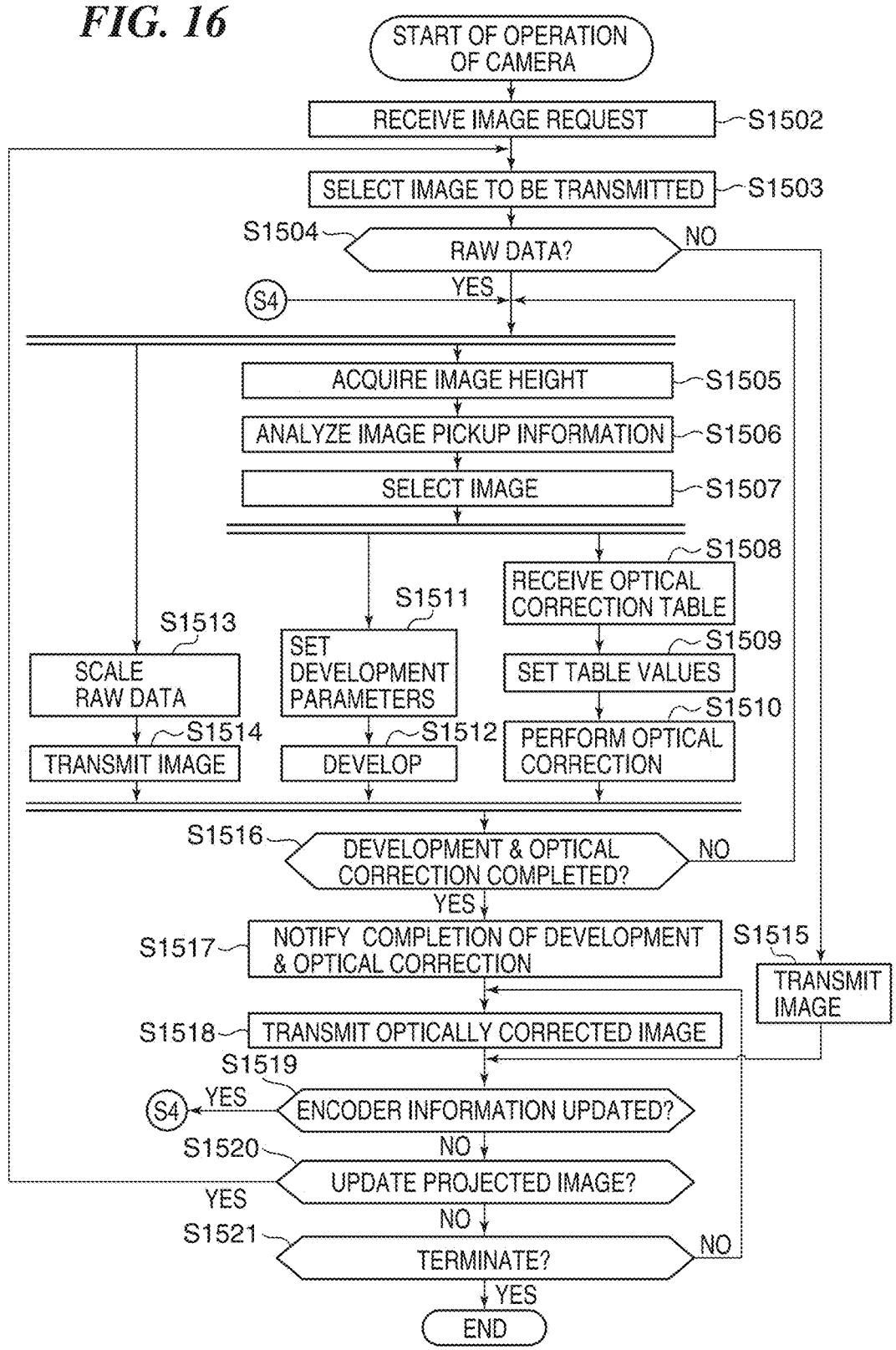
FIG. 16 is a flowchart of a projected image transmission and creation process performed by the external apparatus (digital camera) connected to the projector according to the second embodiment.

FIG. 16 is a flowchart of a projected image transmission and creation process performed by the camera connected to the projector according to the second embodiment. In FIG. 16, steps S1502 to S1504 are the same as the steps S902, S911, and S903 in FIG. 8, respectively.

If the received image data is RAW data (YES to the step S1504), the controller 701 causes the image processor 704 to execute the following steps S1505 and S1513, in parallel. In the step S1505, the controller 701 calculates the image height of the image data being currently processed based on values of the distances Ha and Va (see FIGS. 14A to 14C) obtained from the timing generator 703, and the outputs from the respective encoders, which are received from the projector 100. Then, the controller 701 executes steps S1506 and S1507. The steps S1506 and S1507 are the same as the steps S1105 and S1106 in FIG. 12A, respectively.

Note that in the step S1503, image data to be transmitted to the projector 100 is selected from image data items which are different in angle of view, whereas in the step S1507, one image data is selected from a plurality of image data items obtained by changing the shooting conditions, such as an aperture.

Steps S1508 to S1514 are the same as the steps S904 to S910 in FIG. 8, respectively, and hence description thereof is omitted. Further, steps S1515 to S1518 are the same as the steps S912 to S915 in FIG. 8, respectively, and hence description thereof is omitted.

In a step S1519, the controller 701 determines whether or not outputs (output data) from the respective encoders have been updated in the projector 100, and the output data has been received. Note that when the driving state of the projection optical system 109 or that of the liquid crystal display device 106 is changed in the projector 100, the camera 700 receives the output data from the encoders.

If the output data from the encoders has been received (YES to the step S1519), the controller 701 returns to the steps S1505 and S1513, and performs the optical correction processing on the data of each pixel again. On the other hand, if the output data from the encoders has not been received (NO to the step S1519), the controller 701 proceeds to a step S1520. Note that the steps S1520 and S1521 are the same as the steps S916 and S917 in FIG. 8, respectively, and hence description thereof is omitted.

Figure 17A:
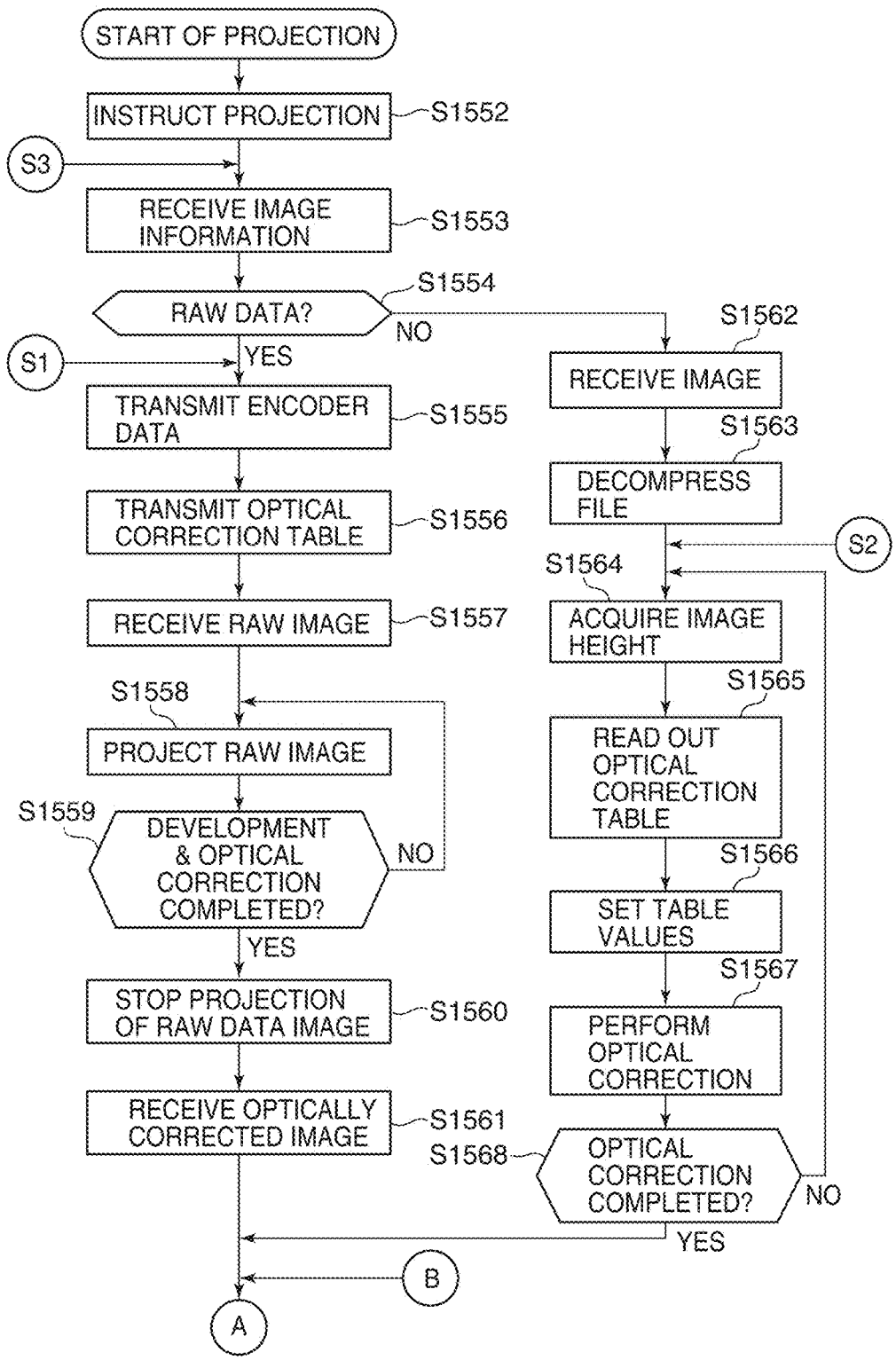
FIG. 17A is a flowchart of a variation of the image projection process performed by the projector according to the second embodiment.
Figure 17B:
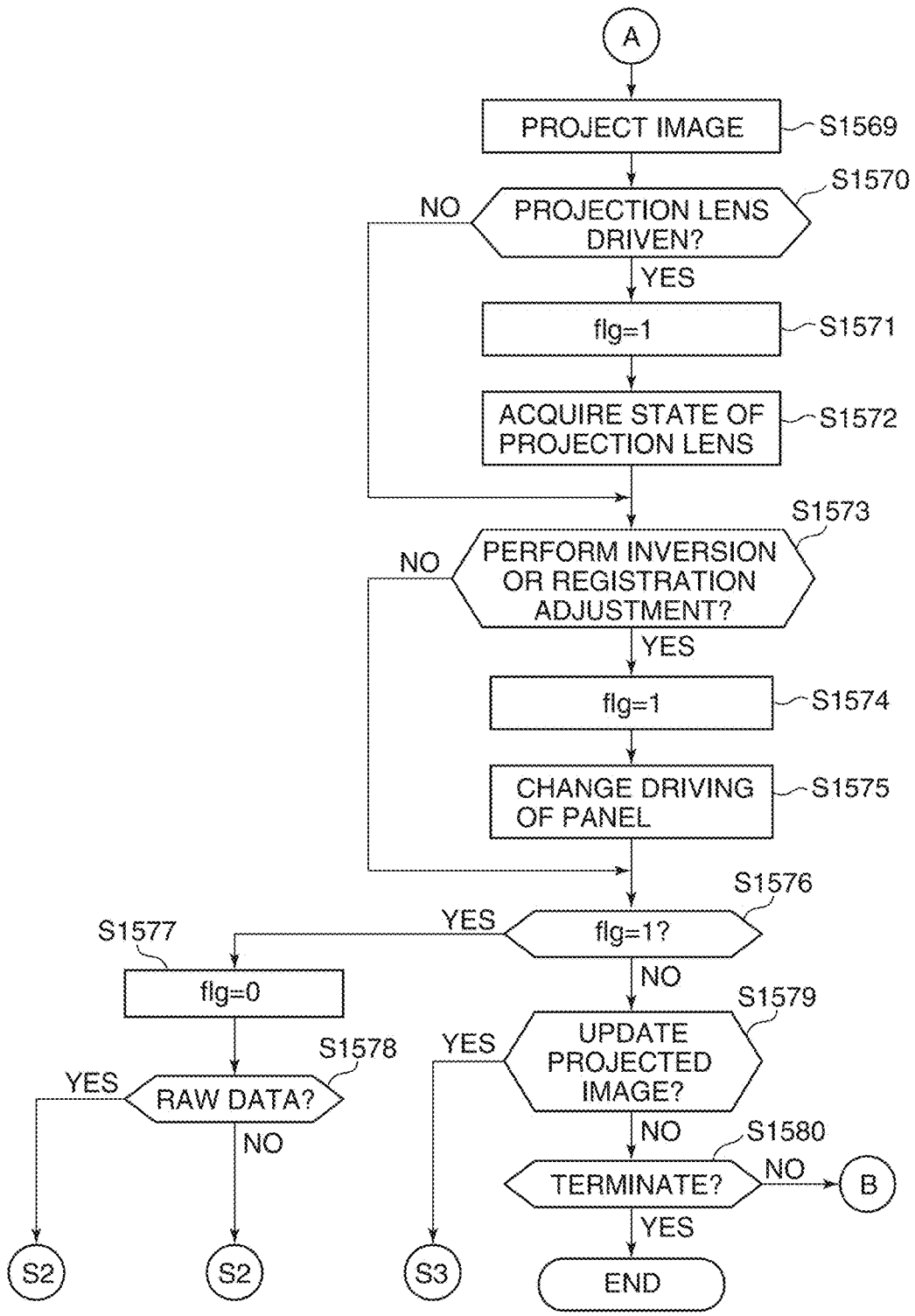
FIG. 17B is a continuation of FIG. 12A.

FIGS. 17A and 17B are a flowchart of a variation of the image projection process performed by the projector according to the second embodiment. Note that in FIGS. 17A and 17B, steps S1552 to S1554 are the same as the steps S952 to S954 in FIG. 10, respectively.

If the image data transmitted from the camera 700 is RAW data (YES to the step S1554), the controller 101 transmits the output data from the encoders to the camera 700 (step S1555). Then, the controller 101 transmits the optical correction table associated with the image height being currently processed to the camera 700 (step S1556). After that, the controller 101 executes steps S1557 to S1561. Note that the steps S1557 to S1561 are the same as the steps S956 to S960 in FIG. 10, respectively, and hence description thereof is omitted.

On the other hand, if the image data transmitted from the camera 700 is not RAW data (NO to the step S1554), the controller 101 executes steps S1562 and S1563. Note that the steps S1562 and S1563 are the same as the steps S962 and S963 in FIG. 10, respectively, and hence description thereof is omitted. Further, steps S1564 to S1568 are the same as the steps S1116 to S1120 in FIG. 12B, and hence description thereof is omitted.

In a case where image data which is not RAW data is input from the camera 700 via the interface, such as the HDMI or the Display Port, which is connected to the signal input section 111, the optical correction processing in the steps S1564 to S1568 is sometimes not performed. In this case, the process proceeds from the step S1563 directly to a step S1569, wherein the controller 101 projects an image corresponding to the image data on which the optical correction processing has been performed irrespective of whether or not the image data is RAW data (step S1569).

Steps S1570 to S1580 are the same as the steps S1123 to S1133 in FIG. 12B, respectively, and hence description thereof is omitted.

Figure 18:
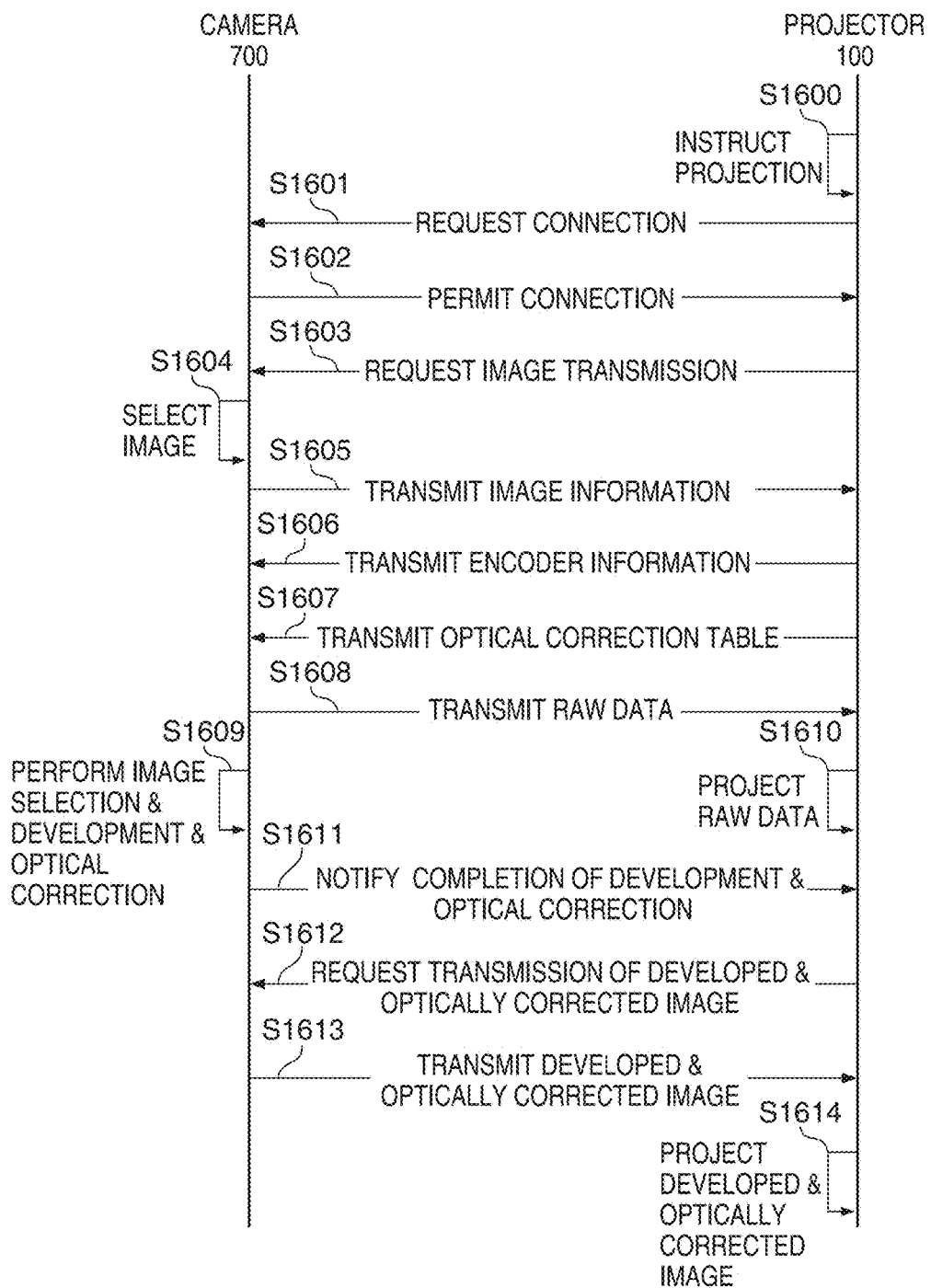
FIG. 18 is a sequence diagram useful in explaining communication performed between the projector according to the second embodiment and the external apparatus (digital camera).

FIG. 18 is a sequence diagram useful in explaining communication performed between the projector according to the second embodiment and the camera.

In FIG. 18, compared with the sequence diagram shown in FIG. 11, processing in a step S1606 is added, and image selection processing is added in a step S1609 corresponding to the step S1008 in FIG. 11. Note that steps S1600 to S1605, S1607, S1608, and S1610 to S1614 are the same as the steps S1000 to S1005, S1006, S1007, and S1009 to S1013 in FIG. 11, respectively.

In the step S1606, to calculate the image height of image data being currently processed in the camera 700, output data from the shift encoder 1096 is transmitted from the projector 100 to the camera 700. At this time, to grasp a relationship between the image data being currently processed and the optical characteristics, the output data from the zoom encoder 1092 and the output data from the focus encoder 1094 are transmitted from the projector 100 to the camera 700.

In the step S1609, image selection described in the step S1507 in FIG. 16 is performed in the camera 700. Then, the development processing and the optical correction processing are performed on the selected RAW data using the optical correction table received from the projector 100, in the camera 700.

As described above, in the present example, if the relationship between the projected image, and the lens position and the image height is changed by driving the projection optical system or the liquid crystal display device, the correction data associated with the image height is transmitted from the projector to the camera again. Then, in the camera, the optical correction processing is performed on the RAW data again. Even when the development processing and the optical correction processing are performed on the RAW data in the external apparatus as described above, it is possible to always perform proper optical correction processing.

Next, a description will be given of a projector according to a third embodiment of the present invention.

Figure 19:
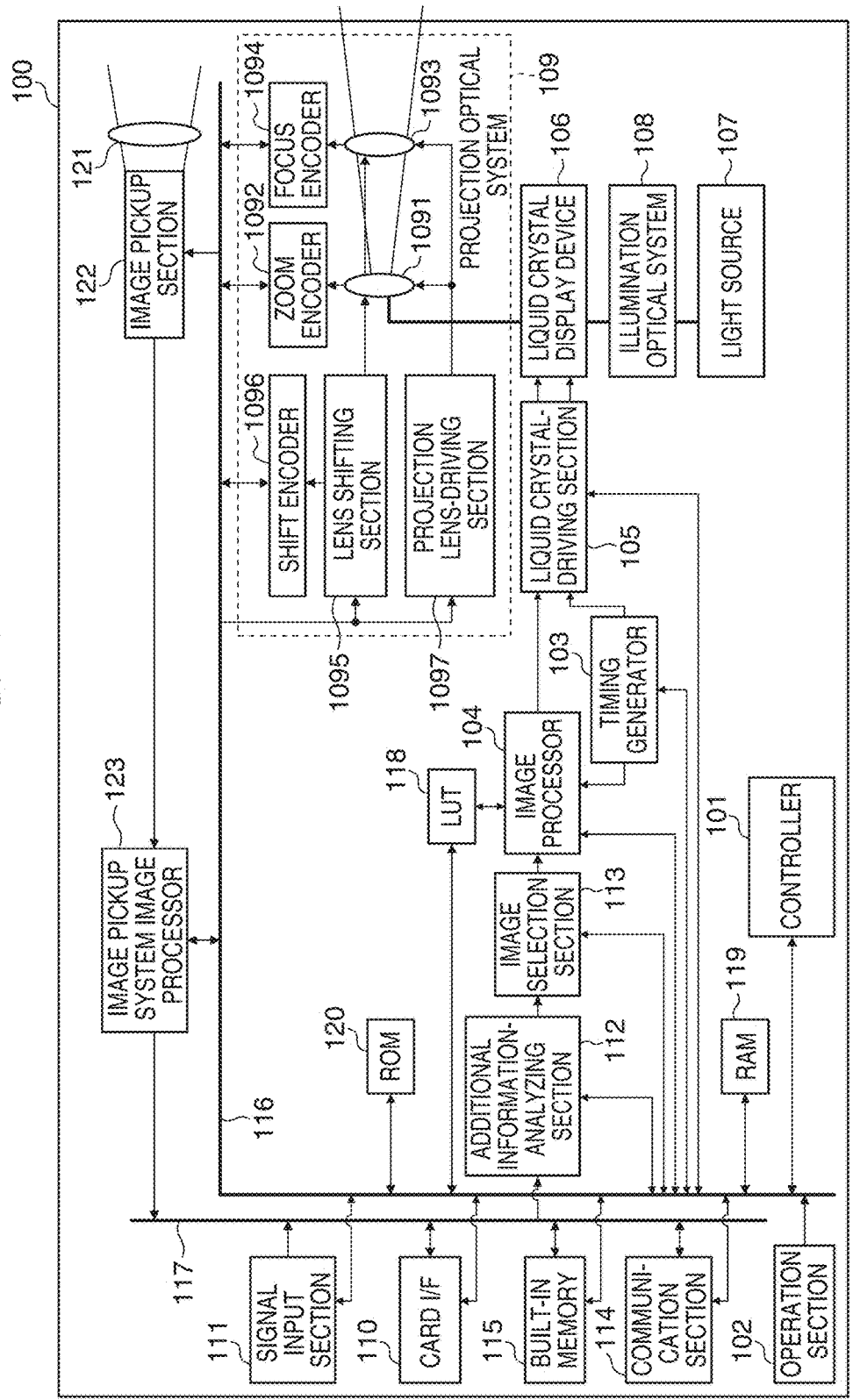
FIG. 19 is a block diagram of a projector according to a third embodiment of the present invention.

FIG. 19 is a block diagram of the projector according to the third embodiment. Note that in FIG. 19, the same component elements as those of the projector shown in FIG. 1 are denoted by the same reference numerals, and description thereof is omitted.

The illustrated projector 100 includes not only the component elements of the projector shown in FIG. 1, but also a photographing lens 121, an image pickup section 122, and an image pickup system image processor 123 for shooting a projection plane.

The image pickup section 122 is provided with an image pickup device. An image of the projection plane shot through the photographing lens 121 is formed on the image pickup device. The image pickup device outputs an image pickup signal (hereinafter referred to as the projection plane signal) corresponding to the image of the projection plane by photoelectric conversion. Then, the projection plane signal is sent to the image pickup system image processor 123.

The image pickup system image processor 123 may have the same configuration as that of the image processor 104 described with reference to FIG. 5, but is only required to be capable of processing the projection plane signals of at least one frame or part of one frame, and outputting the processed signals as projection plane image data.

Figure 20:
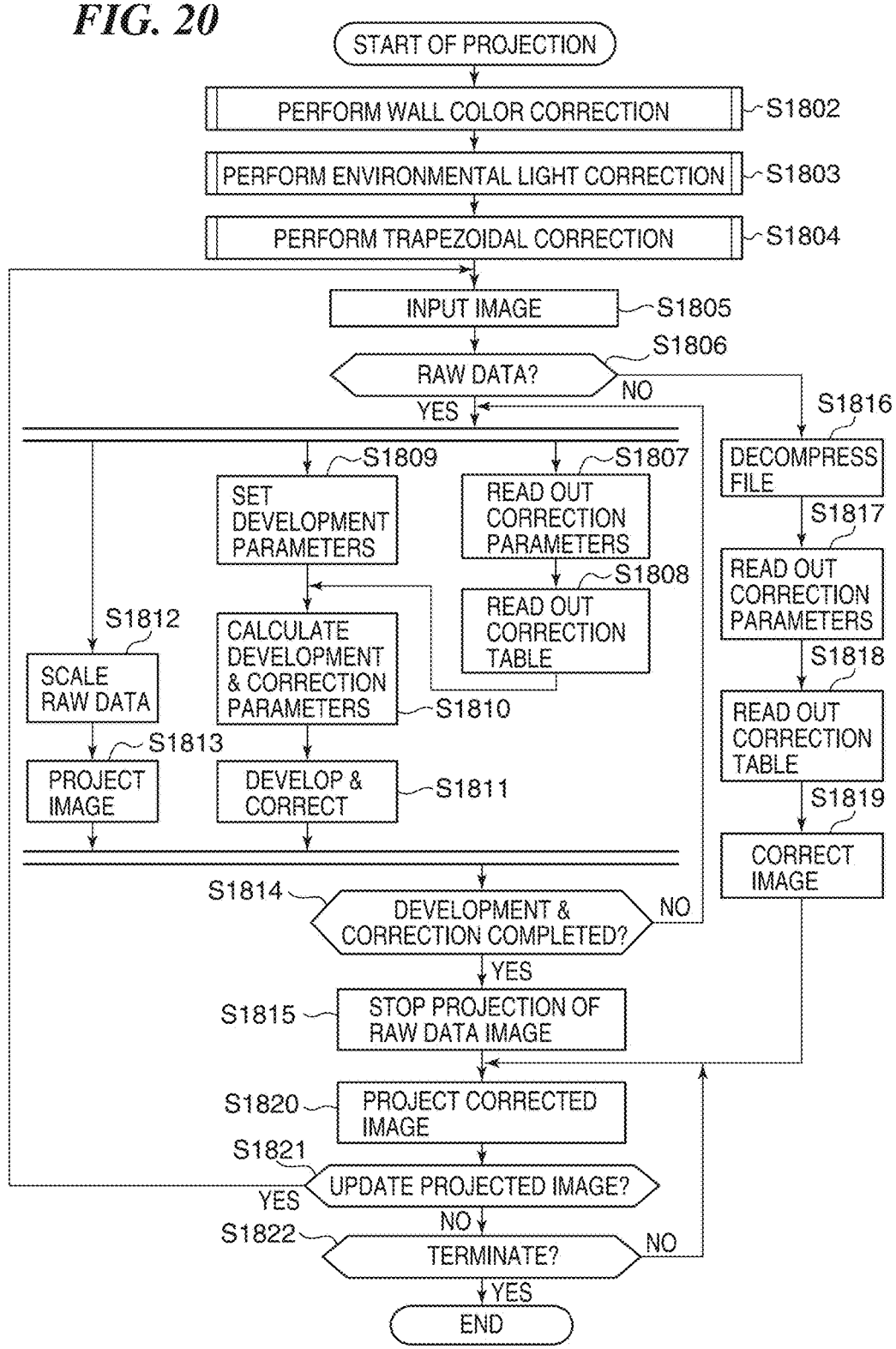
FIG. 20 is a flowchart of an image projection process performed by the projector shown in FIG. 19.

FIG. 20 is a flowchart of an image projection process performed by the projector shown in FIG. 19.

In response to an instruction for starting projection from the operation section 102, the controller 101 starts the projection operation. The image pickup section 122 picks up an image of the projection plane, and outputs a projection plane signal under the control of the controller 101. Then, the image pickup system image processor 123 performs a wall color correction process, described hereinafter, according to the projection plane signal under the control of the controller 101 (step S1802).

Then, the image pickup system image processor 123 performs an environmental light correction process (step S1803), described hereinafter, and further, performs a trapezoidal correction process (step S1804), described hereinafter, under the control of the controller 101.

Figure 21C:
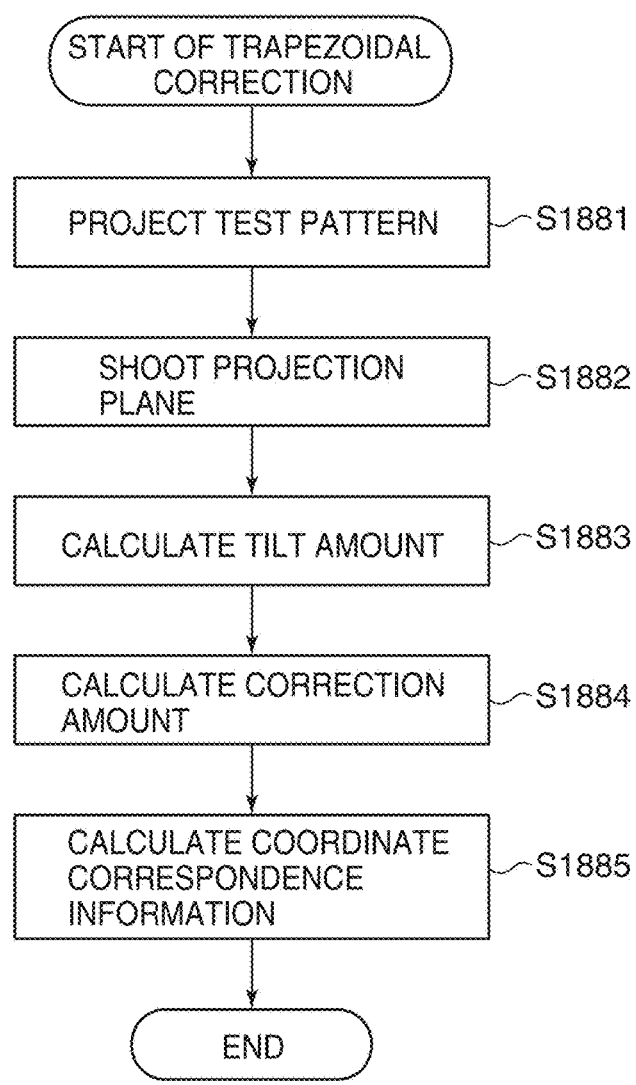

FIGS. 21A to 21C are flowcharts of the wall color correction process, the environmental light correction process, and the trapezoidal correction process, which are performed in the steps S1802, S1803, and S1804 in FIG. 20, respectively.

First, referring to FIG. 21A, when the wall color correction process is started, the controller 101 projects an image which is white in the whole area on the projection plane (step S1841). Note that the white image is stored e.g. in the RAM 119 in advance, and the stored white image is read out from the RAM 119 and projected. Further, the image processor 104 may be provided with a pattern generation section, and the white image may be generated by the pattern generation section.

Then, the image pickup section 122 picks up the white image projected on the projection plane under the control of the controller 101 (step S1842). Then, the controller 101 reads out an ideal white value stored in a ROM 120 in advance with respect to each of the RGB components (step S1843).

Next, the image pickup system image processor 123 compares an image having an ideal white value (i.e. a reference image) with the white image obtained through image pickup performed by the image pickup section 122, under the control of the controller 101. Then, the image pickup system image processor 123 calculates a gain for making the projection plane ideal white based on a result of the comparison (step S1844). The controller 101 stores the calculated gain (also referred to as the wall color correction parameter) in the RAM 119, followed by terminating the wall color correction process. Note that calculation of the gain may be performed by the controller 101.

Referring to FIG. 21B, when the environmental light correction process is started, the controller 101 projects a white image (corrected white image) on which the wall color correction has been performed, on the projection plane (step S1851). That is, in this step, the white image multiplied by the gain calculated in the step S1844 is projected.

Then, the image pickup section 122 picks up the corrected white image, which is projected on the projection plane 122, under the control of the controller 101 (step S1852). Then, the controller 101 calculates chromaticities r and g of the environmental light surrounding the projection plane (peripheral environmental light) based on color data Re, Ge, and Be, which are obtained from the corrected white image obtained through image pickup, by using the following equations (1) and (2) (step S1853):

$$r = Re/(Re+Ge+Be) \quad (1)$$

$$g = Ge/(Re+Ge+Be) \quad (2)$$

Then, the controller 101 determines the type of an illumination light, i.e. the environmental light, in the following manner (step S1854).

Figure 22A:
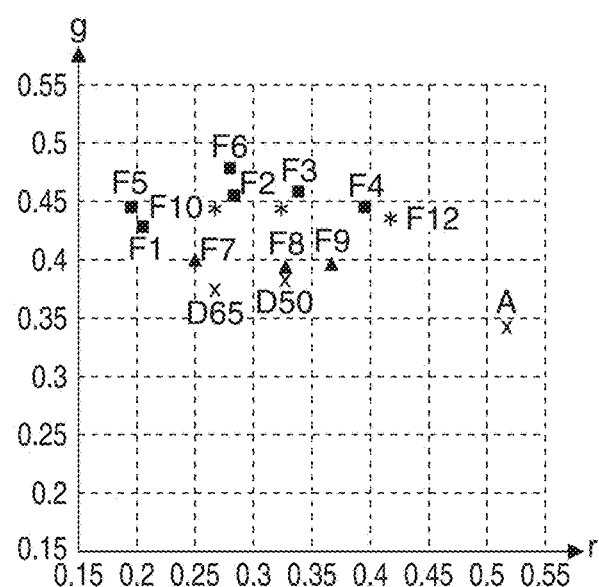
FIGS. 22A and 22B are diagrams useful in explaining chromaticity distribution and an RGB color space.
Figure 22B:
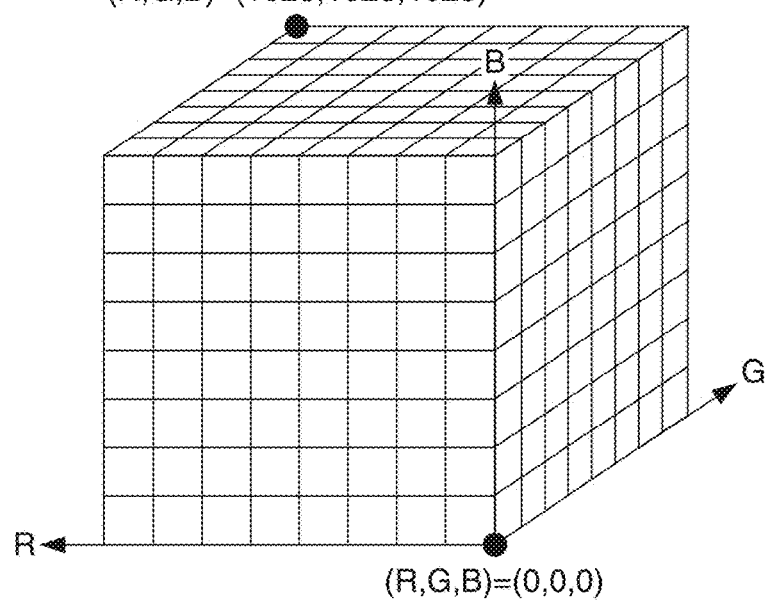

FIGS. 22A and 22B are diagrams useful in explaining chromaticity distribution and an RGB color space, in which FIG. 22A shows an r-g chromaticity distribution, and FIG. 22B shows a set of color coordinate data of lattice points in the RGB color space and RGB values which are lattice point data corresponding to the RGB coordinates of the lattice points.

The r-g chromaticity distribution, shown in FIG. 22A, is stored in the ROM 120. In the step S1854, the controller 101 reads out the r-g chromaticity distribution from the ROM 120. Further, the ROM 120 stores information indicative of a center value in the r-g chromaticity distribution and a main component with respect to each of 15 types of standard light sources of F1 to F12 (fluorescent light), A (white light source), D50 (5000K), and D65 (daylight).

The controller 101 plots the chromaticities calculated in the S1853 on the r-g chromaticity distribution shown in FIG. 22A, and determines that a standard light source having a center value closest to the calculated chromaticities, as the illumination light.

As described above, after determining the type of the illumination light, the controller 101 performs an LUT creation process for creating a look-up table (LUT) for correcting the environmental light based on a result of the type determination, as described hereinafter (step S1855). Then, the controller 101 terminates the environmental light correction process.

Figure 23:
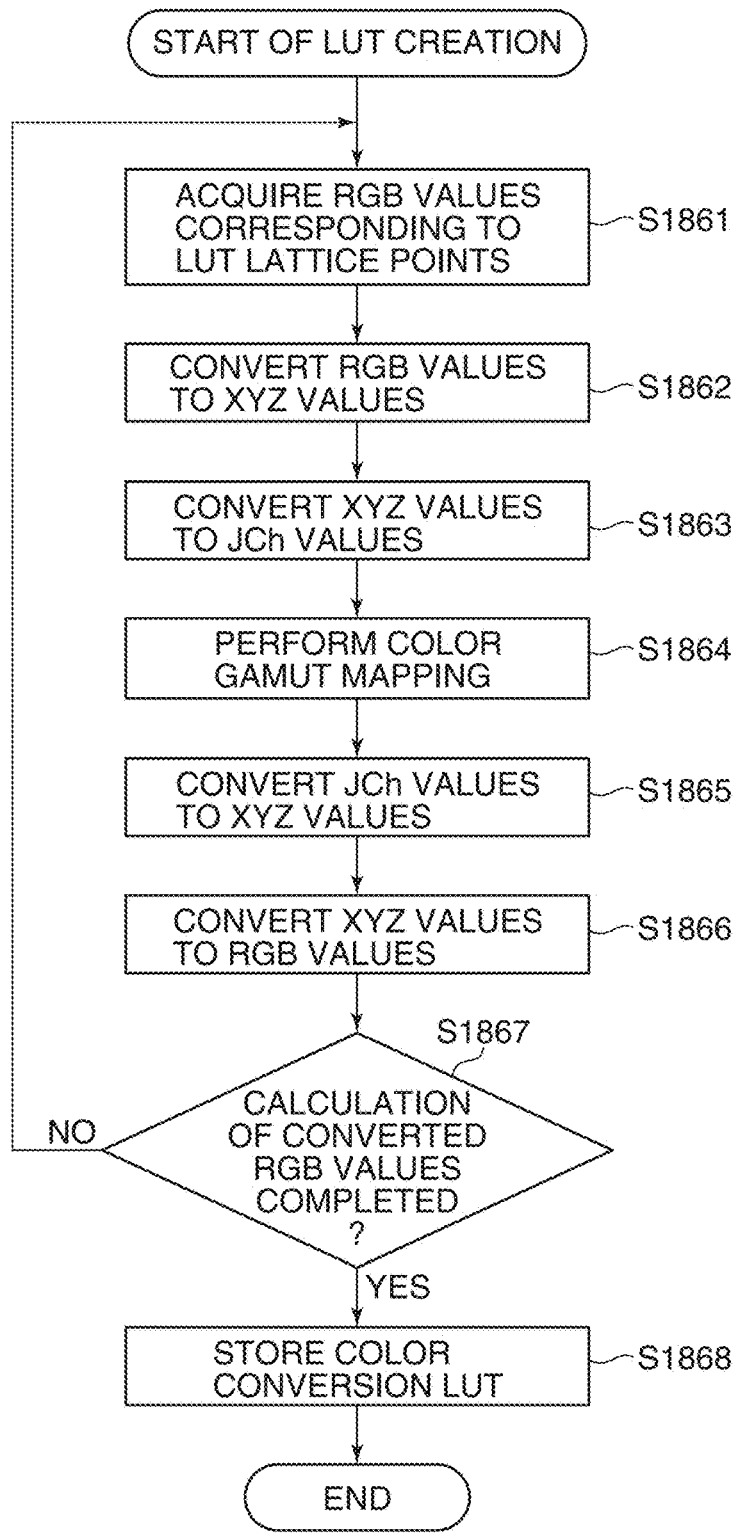
FIG. 23 is a flowchart of an LUT creation process performed in a corresponding step in FIG. 21B.

FIG. 23 is a flowchart of the LUT creation process performed in the step S1855 in FIG. 21B. The LUT creation process in FIG. 23 is performed by the color space conversion section 204 under the control of the controller 101.

The ROM 120 stores, as destination-side profiles, 16 types of profiles generated by measuring a color of the projection plane under each of illuminations corresponding to the above-mentioned F1 to F12, A, D50, and D65, and no illumination, in advance. When the LUT creation process is started, the color space conversion section 204 acquires one set of RGB values corresponding to a three-dimensional LUT lattice point, appearing in FIG. 22B (step S1861).

Then, the color space conversion section 204 converts the acquired RGB values to XYZ values based on a source-side device model (step S1862). As the source-side device model, various models of sRGB, Adobe (registered trademark) RGB, and so forth, can be applied.

Next, the color space conversion section 204 converts the XYZ values to JCh values based e.g. on a model CIECAM02, published by International Commission on Illumination (CIE) (step S1863). The color space conversion section 204 performs color gamut mapping, based on source-side and destination-side color gamuts, for mapping colors outside the destination color gamut to a surface of the destination color gamut at the smallest distance without converting colors within the destination-side color gamut (step S1864). Note that the source-side color gamut and the destination-side color gamut are calculated in advance before the color gamut mapping.

Then, the color space conversion section 204 converts the JCh values to XYZ values based on the CIECAM02 (step S1865). Then, the color space conversion section 204 converts the XYZ values to RGB values (converted RGB values) based on the destination-side device model (step S1866). Note that the destination-side profile used in the step S1866 is selected from the above-mentioned 16 types of profiles.

Next, the controller 101 determines whether or not the converted RGB values have been obtained with respect to all of the LUT lattice points (step S1867). If the converted RGB values have been obtained with respect to all of the LUT lattice points (YES to the step S1867), the controller 101 stores a LUT (color conversion LUT) for environmental light correction in the LUT 118 (step S1868). Then, the controller 101 terminates the LUT creation process. On the other hand, if the converted RGB values have not been obtained with respect to all of the LUT lattice points (NO to the step S1867), the controller 101 returns to the step S1861.

Note that in the illustrated example in FIG. 22B, the color conversion LUT (LUT for environmental light correction) has the 10-bit RGB data, and has the lattice points at positions determined by equally dividing each of the RGB axes into eight. FIG. 22B shows an example, and the number of bits of the signal and the number of lattice points are not limited to these. In the image projection process in FIG. 20, the steps S1861 to S1866 are executed with respect to the lattice points from (R, G, B)=(0, 0, 0) to (R, G, B)=(1023, 1023, 1023). The converted RGB values of other than the lattice points are generated by interpolation processing.

Referring to FIG. 21C, when the trapezoidal correction process is started, the controller 101 projects a test pattern for trapezoidal correction on the projection plane (screen) (step S1881).

Figure 24A:
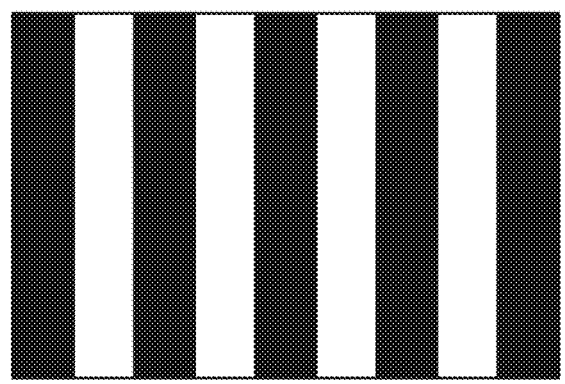
FIGS. 24A and 24B are diagrams useful in explaining a test pattern used in the trapezoidal correction process.
Figure 24B:
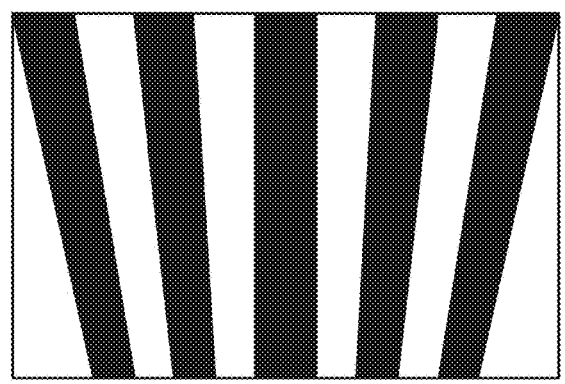

FIGS. 24A and 24B are diagrams useful in explaining the test pattern used in the trapezoidal correction process, in which FIG. 24A shows an example of the test pattern, and FIG. 24B shows an example of an image obtained by shooting the test pattern.

In the present example, the illustrated test pattern is stored e.g. in the RAM 119, and this test pattern is projected on the projection plane. Note that a pattern generation section (not shown) may be disposed upstream of the shape conversion section 205 appearing in FIG. 5 to generate a test pattern.

Then, the controller 101 causes the image pickup section 122 to shoot the projection plane on which the test pattern is projected (step S1882). Here, assuming that the projector 100 is disposed to be tilted with respect to the projection plane, an image obtained by shooting the projection plane (test pattern picked-up image) has trapezoidal distortion, as shown in FIG. 24B.

The shapes of the test pattern (test pattern image) and the test pattern picked-up image are compared under the control of the controller 101. Then, the controller 101 calculates an amount of tilt based on a result of the comparison (step S1883). The above-mentioned shape comparison is performed by the image pickup system image processor 123. Further, the shape comparison may be performed by the image processor 104.

Then, the controller 101 calculates correction amounts for the trapezoidal correction required to make the test pattern picked-up image similar in shape to the test pattern image, based on the calculated amount of tilt (step S1884).

Figure 25A:
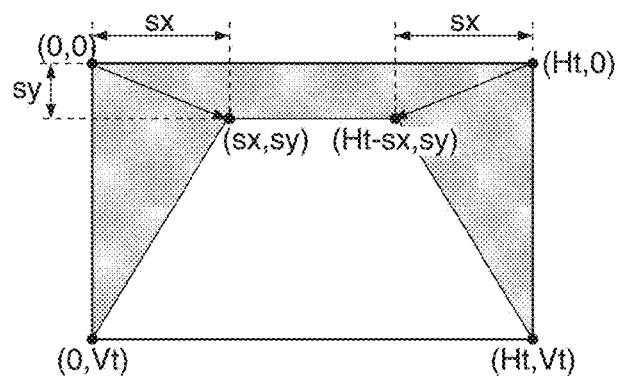
FIGS. 25A and 25B are diagrams useful in explaining calculation of correction amounts, which is performed in a step in FIG. 21C.
Figure 25B:
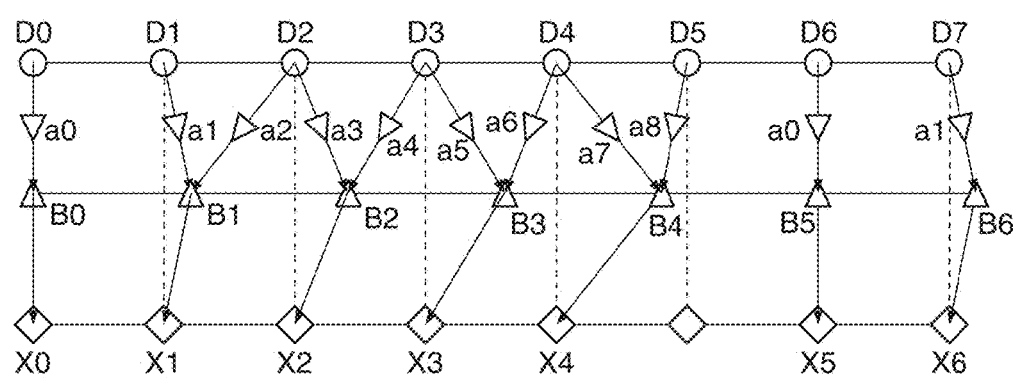

FIGS. 25A and 25B are diagrams useful in explaining calculation of the correction amounts, which is performed in the step S1884 in FIG. 21C. FIG. 25A illustrates how reduction processing is performed, and FIG. 25B shows how interpolation processing is performed.

Now, let it be assumed that an image obtained by shooting the projection plane (test pattern picked-up image) is distorted into a shape in which a lower side of the image is reduced, as shown in FIG. 24B. In this case, as shown in FIG. 25A, the controller 101 reduces an upper side of the image by trapezoidal correction. Although in the present example, the description is given of a case where the projector 100 is tilted with respect to the projection plane only in the vertical direction, even when the projector 100 is tilted with respect to the projection plane in the horizontal direction, an image obtained in this case is similarly processed.

In the test pattern, the number of pixels in the horizontal direction is represented by Ht+1, and that in the vertical direction is represented by Vt+1 (see FIG. 25A). Coordinates (0, 0) and (Ht, 0) on the image are mapped to coordinates (sx, xy) and (Ht−sx, sy), respectively, based on the above-mentioned amount of tilt. These values sx and xy form the correction amounts.

Referring again to FIG. 21C, the controller 101 determines coordinate correspondence information (trapezoidal correction parameters) indicative of the coordinates after mapping for trapezoidal correction, for all pixels stored in the frame memory 206, based on the above-mentioned correction amount (step S1885). Since mapping of the image involves reduction or enlargement thereof (FIG. 25A shows an example of reduction of the image), the controller 101 calculates interpolation filter coefficients in the step S1885. After that, the controller 101 terminates the trapezoidal correction process.

Here, referring to FIG. 25B, in the illustrated example, five data items are generated by thinning six input data items. Note that the number of input data items and the number of data items to be generated by thinning are changed according to an amount of trapezoidal distortion and a position of the image.

An interpolation circuit provided in the shape conversion section 205 calculates interpolation coefficients a0, a1, . . . , and a8, based on the data intervals of D0, D1, . . . , and D5, as an input data string, and the data intervals of B0, B1, . . . , and B4 after interpolation processing, shown in FIG. 25B. Then, the controller 101 stores the calculated interpolation coefficients in the RAM 119. The controller 101 determines pixel data corresponding to times indicated by B0, B1, B2, B3, and B4 by interpolation processing, and stores the pixel data in the frame memory 206.

The data obtained by interpolation is output from the frame memory 206 at times X0, X1, . . . , in the same timing as the times of the input data items D, D1, . . . , and D5, as shown in FIG. 25B. Therefore, when writing the data into the frame memory 208, the data is thinned by stopping writing between the data items X4 and X5 using a memory control circuit (not shown). By performing the above-described thinning of data, signal processing for changing the number of pixels on the above-mentioned scanning line for each predetermined number of scanning lines or shifting the time axis for each predetermined number of pixels is performed.

Referring again to FIG. 20, when the trapezoidal correction process is terminated, the controller 101 sends the input image data to the additional information-analyzing section 112 via the image data bus 117 (step S1805). Then, the additional information-analyzing section 112 determines whether or not the image data is RAW data under the control of the controller 101 (step S1806).

If the image data is RAW data (YES to the step S1806), the controller 101 causes the image processor 104 to execute steps S1807, S1809, and S1812, in parallel. Note that the steps S1809, S1812, and S1813 are the same as the steps S307, S309, and S310 in FIG. 4, respectively.

In the step S1807, the controller 101 reads out the wall color correction parameter and the trapezoidal correction parameters from the RAM 119 (step S1807). Further, the controller 101 reads out the environmental light correction table from the LUT 118 (step S1808).

The controller 101 calculates parameters for development and correction according to the development parameters, the wall color correction parameter, the trapezoidal correction parameters, and the environmental light correction table (step S1810). For example, the controller 101 calculates parameters used by the white balance section 202 based on the gain for wall color correction and the white balance data included in the development parameters. Further, the controller 101 generates an LUT used by the color space conversion section 204 based on the environmental light correction table and the color space conversion table. In addition, the controller 101 calculates sharpness correction data used in each area of the image based on the trapezoidal correction parameters and sharpness data included in the development parameters, while taking interpolation processing involved in the trapezoidal correction into consideration.

Note that sharpness correction may be performed by the luminance & color difference correction section 210 independently of the trapezoidal correction, or may be performed by the shape conversion section 205 simultaneously with interpolation processing involved in the trapezoidal correction. When the sharpness correction is performed by the shape conversion section 205 simultaneously with interpolation processing involved in the trapezoidal correction, in general, the sharpness correction is performed only on green (G) components which have a large influence on the luminance signal.

Then, the controller 101 causes the image processor 104 to perform the development and correction processing on the RAW data using the parameters calculated in the step S1810 (step S1811). The controller 101 determines whether or not the development processing and the correction processing on the RAW data is completed (step S1814). If the development processing and the correction processing on the RAW data are not completed (NO to the step S1814), the controller 101 returns to the steps S1807, S1809, and S1812. In this case, as described hereinabove, projection of the "makeshift" image is continued.

If the development processing and the correction processing on the RAW data are completed (YES to the step S1814), the controller 101 stops projection of the image corresponding to the RAW data (step S1815). Then, the controller 101 projects an image corresponding to the image data on which the above-described development processing and correction processing have been performed (step S1820). After that, the controller 101 executes steps S1821 and S1822. Note that the steps S1821 and S1822 are the same as the steps S318 and S319 in FIG. 4, respectively. If an instruction for updating the projected image has been input from the operation section 102 (YES to the step S1821), the controller 101 returns to the step S1805. Further, if an instruction for terminating the operation has not been input form the operation section 102 (NO to the step S1822), the controller 101 returns to the step S1820.

If the image data is not RAW data (NO to the step S1806), the controller 101 decompresses the image data by the data decompression section 201, similarly to the step S311 in FIG. 4 (step S1816). Then, the controller 101 reads out the wall color correction parameter and the trapezoidal correction parameters from the RAM 119 (step S1817). Further, the controller 101 reads out the environmental light correction table from the LUT 118 (step S1818). Then, the controller 101 causes the image processor 104 to perform wall color correction, environmental light correction, and trapezoidal correction, using the parameters and the table (step S1819). After that, the controller 101 proceeds to the step S1820 to project an image corresponding to the corrected image data.

Note that in a case where image data which is not RAW data is input via the interface, such as the HDMI or the Display Port, which is connected to the signal input section 111, the process sometimes proceeds to the step S1820 without performing correction in the steps S1817 to S1819.

As described above, the RAW data is corrected using an image obtained by shooting the projection plane, and is subjected to the development processing. Since the RAW data is not in a compressed state, its bit depth is large. Therefore, it is possible to correct the data without degrading gradation.

Further, by performing the development processing and the correction processing by a combination of white balance processing and wall color correction, a combination of color space conversion and environmental light correction, and so forth, it is possible to reduce the number of times of calculation processing operations. This makes it possible to reduce accumulation of errors caused by rounding-up and rounding-down operations in calculation.

Further, when performing trapezoidal correction, filter coefficients for sharpness, which have different characteristics depending on the area of the image, are used for multiplication. This makes it possible to properly perform sharpness processing in all of areas of the image by taking into account the characteristics of the interpolation filer used in development.

Incidentally, in the above-described example, the projector 100 is equipped with the image pickup section 122, and the RAW data is corrected and developed in the projector 100 using an image of the projection plane, which is obtained by the image pickup section 122. However, the projection plane may be shot by a first external apparatus connected to the projector 100, and further, development and correction of the image data may be performed by a second external apparatus connected to the projector 100.

Figure 26A:
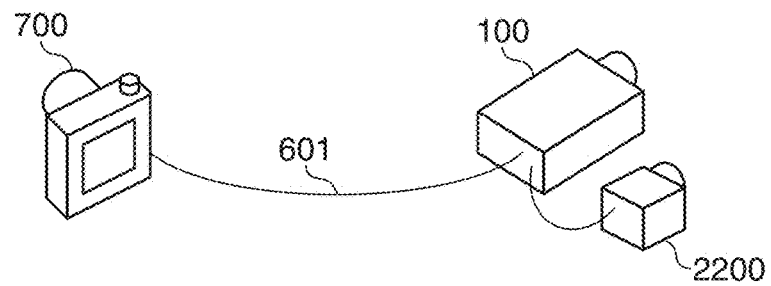
FIGS. 26A to 26C are diagrams useful in explaining three examples of a projection system in which first and second external apparatus are connected to the projector shown in FIG. 1, respectively.
Figure 26B:
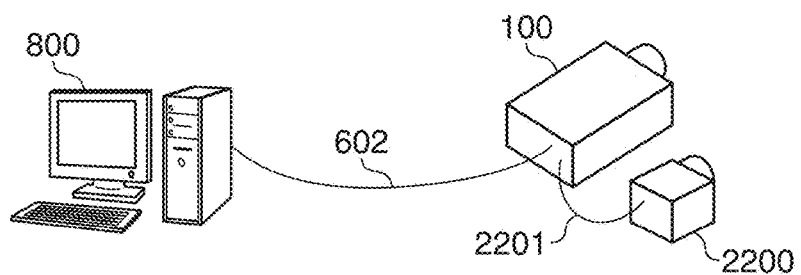
Figure 26C:
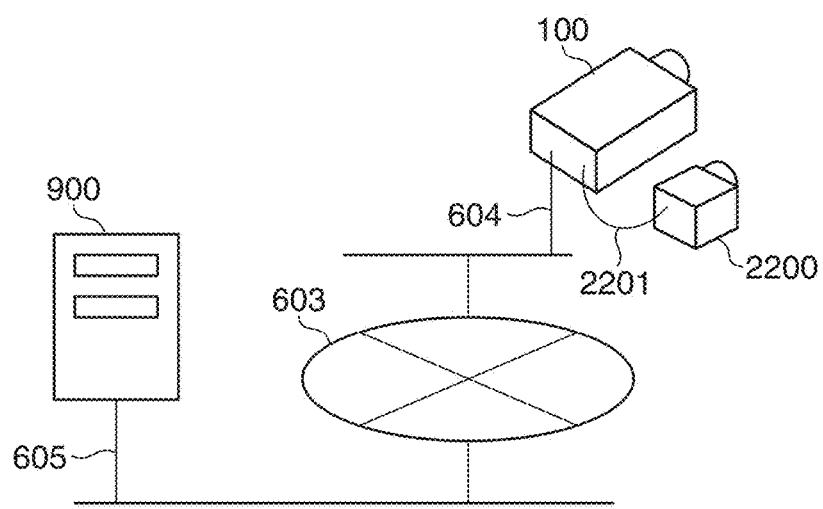

FIGS. 26A to 26C are diagrams useful in explaining three examples of a projection system in which the first and second external apparatus are connected to the projector shown in FIG. 1, respectively. FIG. 26A shows a case where both of the first and second external apparatuses are image pickup apparatuses, FIG. 26B shows a case where the first external apparatus is a PC, and the second external apparatus is an image pickup apparatus, and FIG. 26C shows a case where the first external apparatus is a server, and the second external apparatus is an image pickup apparatus. Note that in FIGS. 26A to 26C, the same components as those of the projection systems shown in FIGS. 6A to 6C are denoted by the same reference numerals, and description thereof is omitted.

In FIGS. 26A to 26C, as the second external apparatus, an image pickup apparatus (camera) 2200 that shoots the projection plane is provided. The projector 100 and the camera 2200 are connected to each other by a cable 2201.

The cable 2201 may be an HDMI cable or a Display Port cable, and further, may be a USB cable. Further, the projector 100 and the camera 2200 may be connected to each other by wireless communication, such as Bluetooth (registered trademark) without using the cable 2201. Further, the camera 2200 is only required to have at least a function for shooting the projection plane, and transmitting a picked-up image to the projector 100 as image data of one frame.

Figure 27:
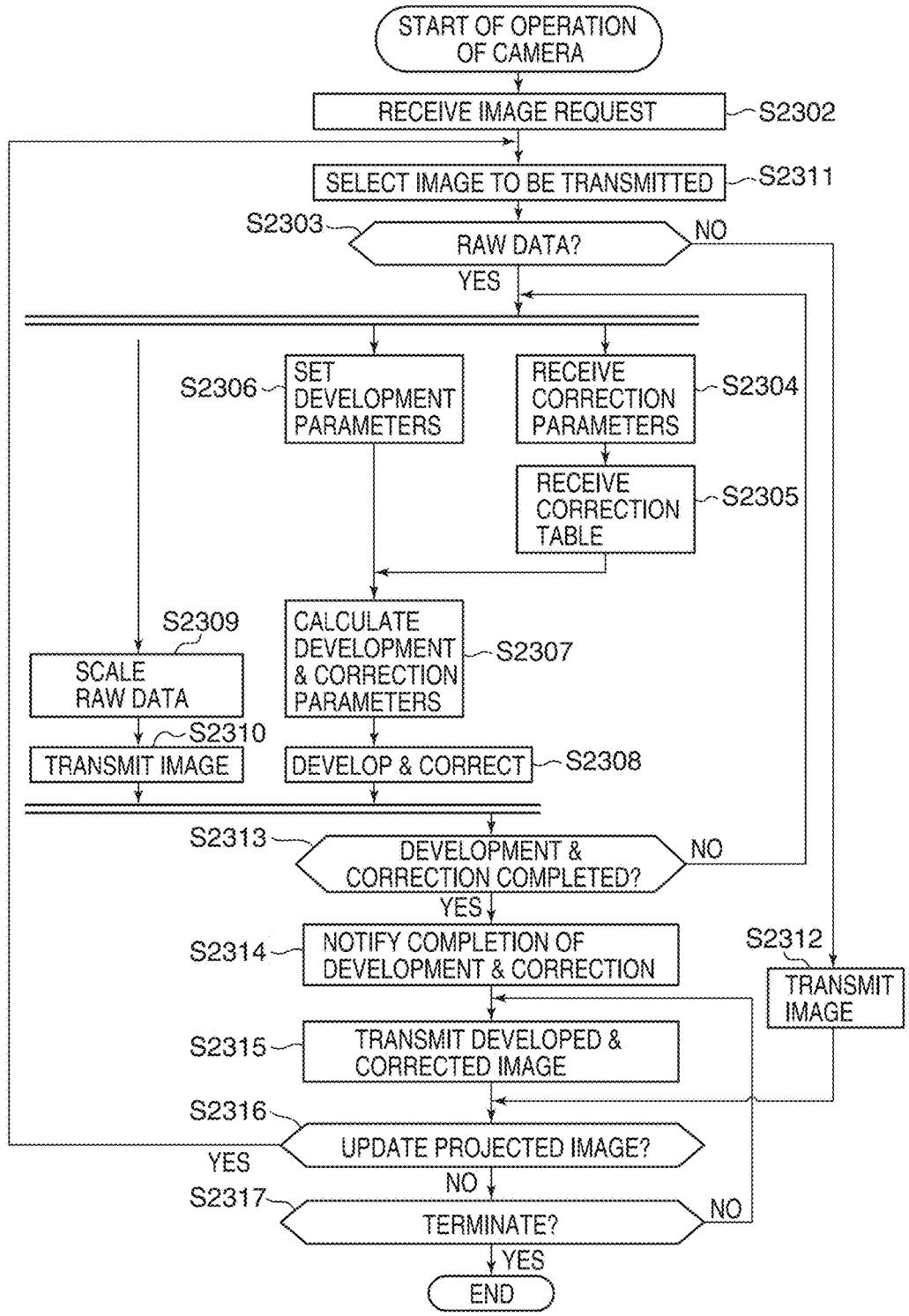
FIG. 27 is a flowchart of a projected image transmission and creation process performed by the first external apparatus (digital camera) provided in the projection system shown in FIG. 26A.

FIG. 27 is a flowchart of a projected image transmission and creation process performed by the first external apparatus (digital camera) provided in the projection system shown in FIG. 26A.

In response to a predetermined operation from the operation section 702, the controller 701 starts the operation of the camera 700. Then, the controller 701 executes steps S2302, S2311, and S2303. Note that the steps S2302, S2311, and S2303 are the same as the steps S902, S911, and S903 in FIG. 8, respectively.

If the image data is RAW data (YES to the step S2303), the controller 701 causes the image processor 704 to execute the following steps S2304, S2306, and S2309 in parallel.

In the step S2304, the controller 701 receives the wall color correction parameter and the trapezoidal correction parameters, calculated in the projector 100. Further, the controller 701 receives the environmental light correction table calculated in the projector 100 (step S2305).

In the step S2306, the controller 701 sets the development parameters in the similar manner to the step S907 in FIG. 8. Then, the controller 701 executes steps S2307 and S2308. Note that the steps S2307 and S2308 are the same as the steps S1810 and S1811 in FIG. 20, respectively.

Note that the steps S2309 and S2310 are the same as the steps S909 and S910 in FIG. 8, respectively.

Then, the controller 701 determines whether or not the development processing and the correction processing are completed (step S2313). If the development processing and the correction processing are not completed (NO to the step S2313), the controller 701 returns to the steps S2304 and S2306. In this case, as mentioned above, the controller 101 continues projection of the "makeshift" image.

If the development processing and the correction processing are completed (YES to the step S2313), the controller 701 notifies the projector 100 of completion of the development processing and the correction processing (step S2314). After that, the controller 701 transmits image data on which the development processing and the correction processing have been performed to the projector 100 (step S2315). Then, the controller 701 executes steps S2316 and S2317.

Note that the steps S2316 and S2317 are the same as the steps S916 and S917 in FIG. 8, respectively. If an instruction for updating the projected image has been input (YES to the step S2316), the controller 701 returns to the step S2311. Further, if an operation for terminating the operation has not been input from the operation section 102 (NO to the step S2317), the controller 701 returns to the step S2315.

If the image data is not RAW data (NO to the step S2303), the controller 701 transmits the image data to the projector 100, similarly to the step S912 in FIG. 8 (step S2312). Then, the controller 701 proceeds to the step S2316.

Figure 28:
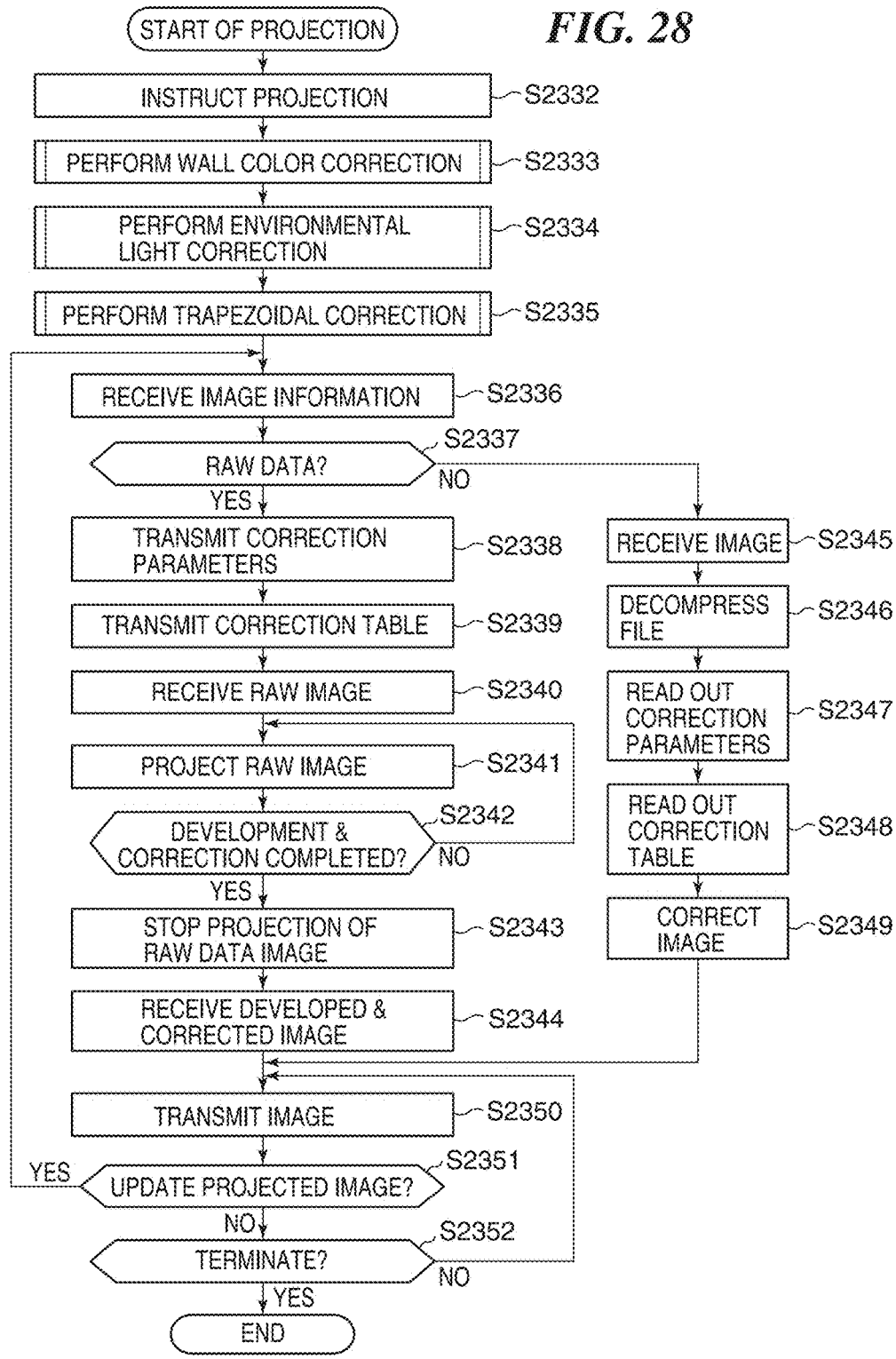
FIG. 28 is a flowchart of an image projection process performed by the projector appearing in FIG. 26A.

FIG. 28 is a flowchart of an image projection process performed by the projector appearing in FIG. 26A.

In response to an operation for starting projection, the controller 101 starts the projection operation. Then, the controller 101 executes steps S2332 to S2337. Note that the steps S2332, S2336, and S2337 are the same as the steps S952, S953, and S954 in FIG. 10, respectively. Further, steps S2333, S2334, and S2335 are the same as the steps S1802, S1803, and S1804 in FIG. 20, respectively. However, in the steps S2333, S2334, and S2335, the projection plane is shot by the camera 2200.

If the image data received from the camera 700 is RAW data (YES to the step S2337), the controller 101 reads out the wall color correction parameter and the trapezoidal correction parameters from the RAM 119, and transmits the parameters to the camera 700 (step S2338). Further, the controller 101 reads out the environmental light correction table from the LUT 118, and transmits the table to the camera 700 (step S2339). Then, the controller 101 executes steps S2340 and S2341. Note that the steps S2340 and S2341 are the same as the steps S956 and S957 in FIG. 10, respectively.

Then, the controller 101 determines whether or not the development processing and the correction processing on the RAW data are completed in the camera 700 (step S2342). In this step, the controller 101 determines whether or not a termination notification indicative of completion of the development processing and the correction processing has been received from the camera 700. If the development processing and the correction processing are not completed (NO to the step S2342), the controller 101 returns to the step S2341, and continues projection of the "makeshift" image.

On the other hand, if the development processing and the correction processing are completed (YES to the step S2342), the controller 701 executes a step S2343. Note that the step S2343 is the same as the step S959 in FIG. 10. Then, the controller 101 receives image data on which the development processing and the correction processing have been performed from the camera 700 (step S2344). After that, the controller 701 executes steps S2350 to S2352. Note that the steps S2350 to S2352 are the same as the steps S961, S967, and S968 in FIG. 10, respectively.

On the other hand, if the image data received from the camera 700 is not RAW data (NO to the step S2337), the controller 101 executes steps S2345 and S2346. Note that the steps S2345 and S2346 are the same as the steps S962 and S963 in FIG. 10, respectively.

Then, the controller 701 executes steps S2347 to S2349. Note that the steps S2347 to S2349 are the same as the steps S1817 to S1819 in FIG. 20, respectively. Then, after execution of the step S2347, the controller 101 proceeds to a step S2350.

Figure 29:
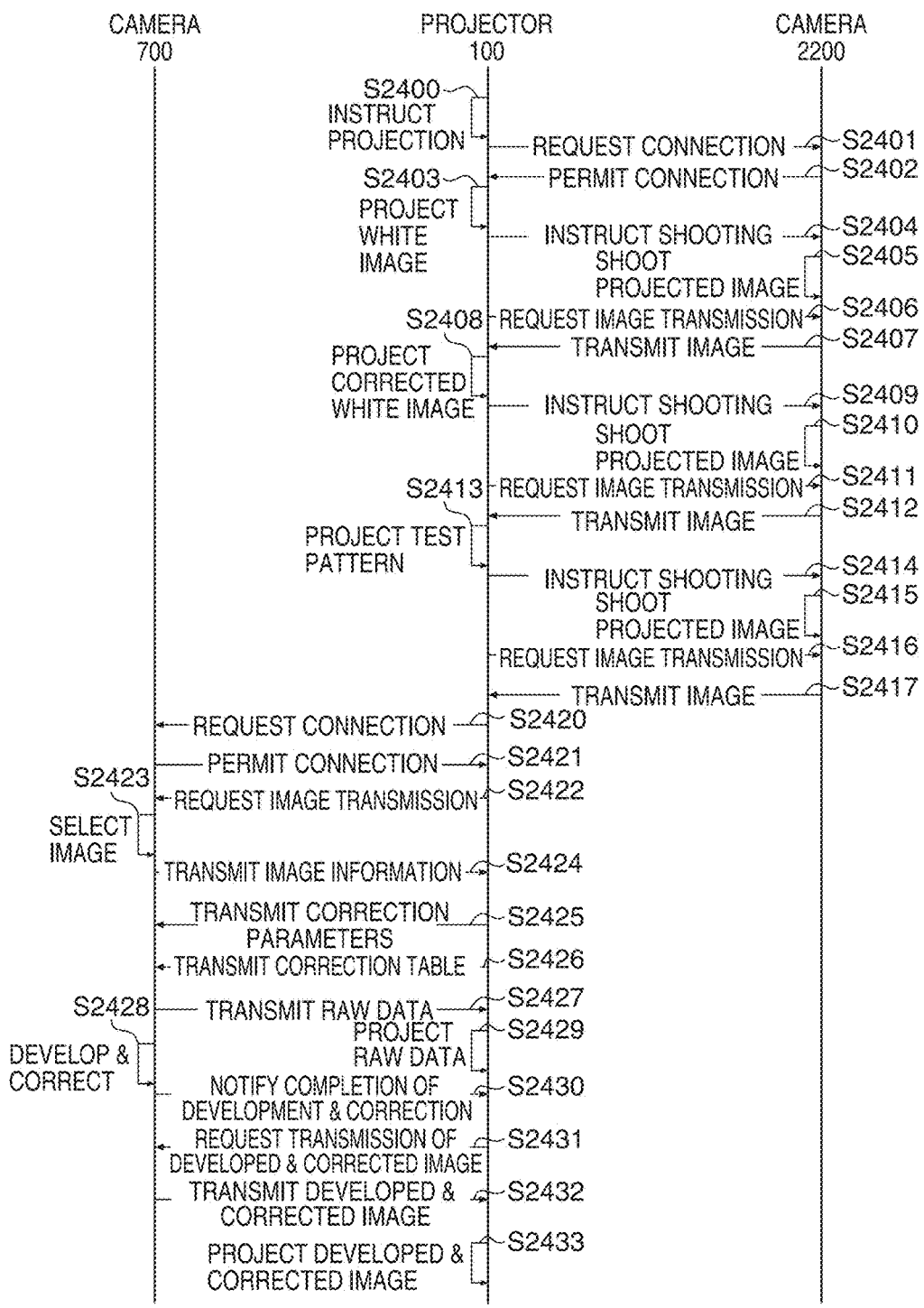
FIG. 29 is a sequence diagram useful in explaining communication performed between the projector, and the first and second external apparatuses (digital cameras), shown in FIGS. 26A to 26C.

FIG. 29 is a sequence diagram useful in explaining communication performed between the projector, and the first and second external cameras, shown in FIG. 26A.

In a step S2400, an operator operates the operation section 102 of the projector 100 to instruct the start of projection. This causes, in a step S2401, the projector 100 to transmit a connection request to the camera 2200. In response to the connection request, in a step S2402, the camera 2200 permits the projector 100 to connect thereto and establishes logical connection therewith. Then, in a step S2403, the projector 100 projects a white image on the projection plane.

Then, in a step S2404, the projector 100 transmits an instruction for shooting the projection plane to the camera 2200. Upon receipt of this instruction, in a step S2405, the camera 2200 shoots the projection plane on which the white image is projected. In a step S2406, the projector 100 requests the camera 2200 to transmit a white projected image (white image data) obtained in the step S2405.

In a step S2407, the camera 2200 transmits the white projected image to the projector 100. Then, in a step S2408, the projector 100 projects a white image on which the wall color correction has been performed. Then, in a step S2409, the projector 100 transmits an instruction for shooting the projection plane to the camera 2200. Upon receipt of this instruction, in a step S2410, the camera 2200 shoots the projection plane on which is projected the white image subjected to the wall color correction.

In a step S2411, the projector 100 requests the camera 2200 to transmit the white projected image obtained in the step S2410, on which the wall color correction has been performed. In a step S2412, the camera 2200 transmits the white projected image on which the wall color correction has been performed to the projector 100. Then, in a step S2413, the projector 100 projects a test pattern on the projection plane. Then, in a step S2414, the projector 100 transmits an instruction for shooting the projection plane to the camera 2200.

In a step S2415, the camera 2200 shoots the projection plane on which the test pattern is projected. In a step S2416, the projector 100 requests the camera 2200 to transmit test pattern-picked-up image data (test pattern projected image) obtained in the step S2415. In response to the request, in a step S2417, the camera 2200 transmits the test pattern projected image to the projector 100.

Then, in a step S2420, the projector 100 transmits a connection request to the camera 700. In response to the connection request, in a step S2421, the camera 700 permits the projector 100 to connect thereto, and establishes logical connection therewith. Then, in a step S2422, the projector 100 requests the camera 700 to transmit an image to be projected.

Then, in a step S2423, the operator operates the operation section 702 of the camera 700 to select image data to be projected. In a step S2424, the camera 700 transmits information associated with the selected image data to the projector 100. In this step, the camera 700 transmits information associated with the format indicative of whether the selected image data is RAW data or other data.

Next, in a step S2425, if the image data to be projected is RAW data, the projector 100 transmits correction parameters for image correction to the camera 700. Further, in a step S2426, the projector 100 transmits the correction table stored in the LUT 118 to the camera 700. In a step S2427, the camera 700 transmits the RAW data to the projector 100 as a "makeshift" image.

In a step S2428, the camera 700 develops the RAW data, and corrects the same using the correction parameters and the correction table. In a step S2429, the projector 100 projects an image corresponding to the RAW data received in the step S2427.

Next, in a step S2430, the camera 700 transmits a completion notification indicative of completion of the development processing and the correction processing to the projector 100. In response to the completion notification, in a step S2431, the projector 100 requests the camera 700 to transmit image data on which the development processing and the correction processing have been performed. In response to this request, in a step S2432, the camera 700 transmits the image data on which the development processing and the correction processing have been performed to the projector 100. Then, in a step S2433, the projector 100 projects an image corresponding to the image data on which the development processing and the correction processing have been performed.

As described above, the camera 700 develops and corrects the RAW data using the image data obtained by shooting the projection plane using the camera 2200 connected to the projector 100. By performing the correction processing as above, it is also possible to perform image correction without degrading gradation. Note that one of the processing for shooting the projection plane and the processing for correcting an image may be performed by the projector.

Although in the above-described example, the description is given of the projection system shown in FIG. 26A, also in the projection systems shown in FIGS. 26B and 26C, the development processing and the correction processing are performed in the similar manner. Note that in the illustrated examples in FIGS. 26B and 26C, the RAW data is stored in a storage device, such as a hard disk, which is equipped in the PC and the server, respectively.

Next, a description will be given of a projector according to a fourth embodiment of the present invention. Note that the projector according to the fourth embodiment has the same hardware configuration as that of the projector shown in FIG. 19.

In the fourth embodiment, a plurality of RAW data items obtained by photographing the same object by changing the shooting conditions are recorded. The projector 100 selects one of the plurality of RAW data items according to a state of the projection plane and corrects the selected RAW data.

Figure 30A:
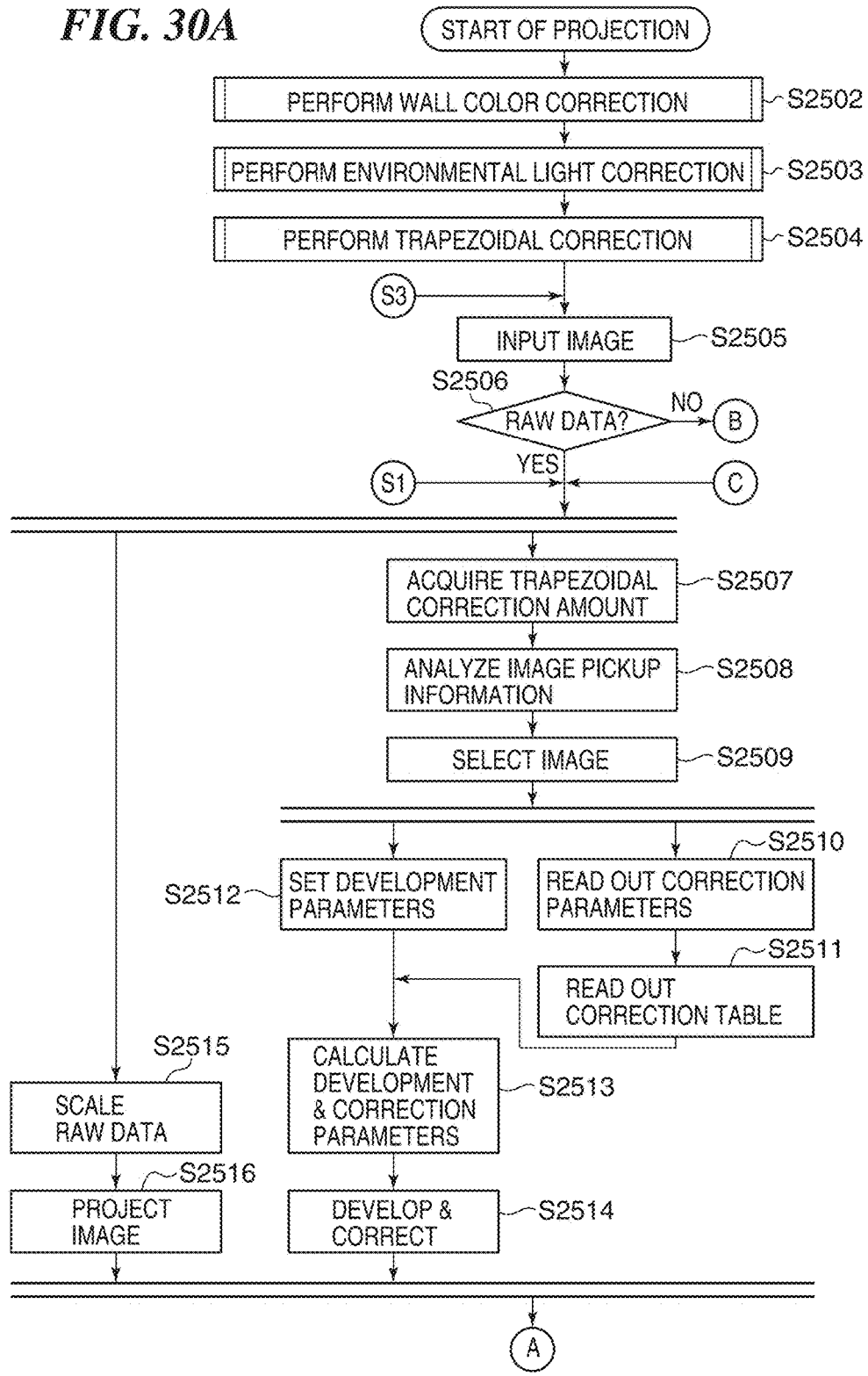
FIG. 30A is a flowchart of an image projection process performed by a projector according to a fourth embodiment of the present invention.
Figure 30B:
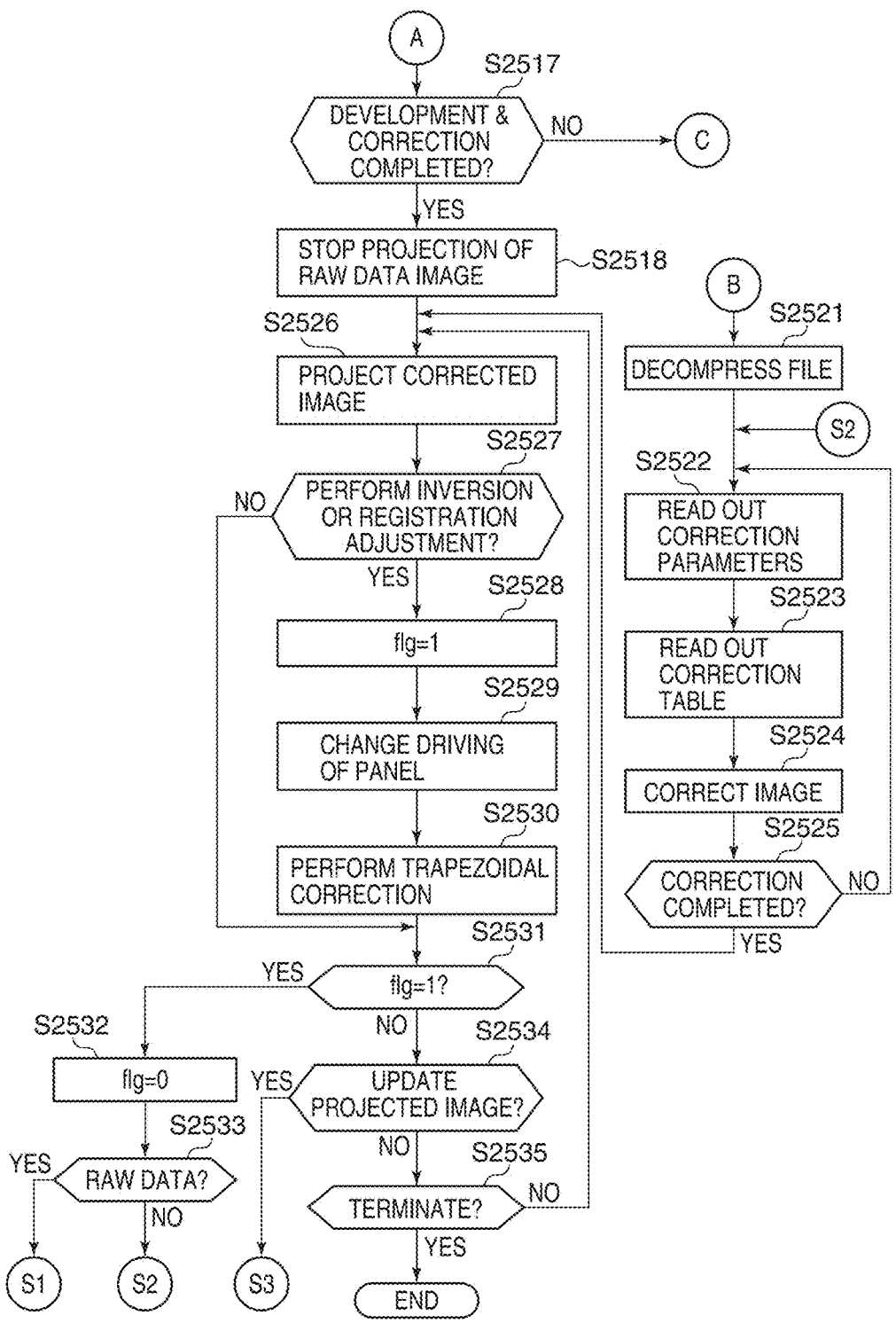
FIG. 30B is a continuation of FIG. 30A.

FIGS. 30A and 30B are a flowchart of an image projection process performed by the projector according to the fourth embodiment of the present invention.

In response to an operation for starting projection from the operation section 102, the controller 101 starts the projection operation. Then, the controller 101 executes steps S2502 to S2506. The steps S2502 to S2506 are the same as the steps S1802 to S1806 in FIG. 20, respectively.

If the input image data is RAW data (YES to the step S2506), the controller 101 acquires correction amounts for trapezoidal correction calculated in the step S2504 (step S2507). Then, the controller 101 analyzes the image pickup information associated with the image data to be projected (step S2508).

Figures 31A, 31B:
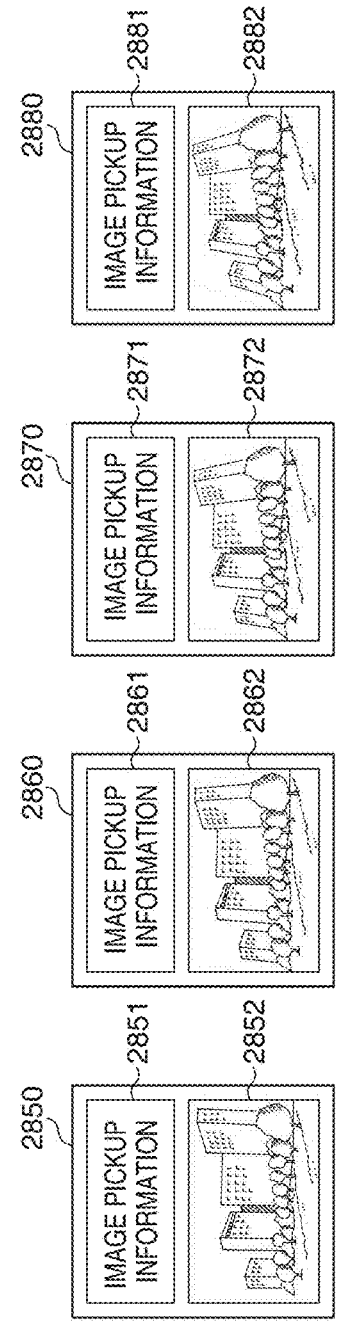
FIGS. 31A and 31B are diagrams useful in explaining another example of the image file.

FIGS. 31A and 31B are diagrams useful in explaining another example of the format of the image file, which is different from the example described with reference to FIGS. 13A to 13C in the first embodiment. FIG. 31A shows the image pickup information, and FIG. 31B shows a plurality of image files obtained by photographing the same photographic scene by changing the shooting conditions. In FIG. 31A, the same items as those in FIG. 13B are denoted by the same reference numerals.

The image pickup information shown in FIG. 31A include, not only the items 1211 to 1216, but also items 2811 and 2812, with which values 2813 and 2814 obtained through image pickup are associated.

The item 2811 represents pan angle information indicative of an angle by which the camera 700 is horizontally moved in shooting. Further, the item 2812 represents tilt angle information indicative of an angle by which the camera 700 is vertically moved in shooting. Note that when detecting a pan angle and a tilt angle, a tilt sensor or an acceleration sensor is used to detect a direction in which the camera 700 is moved and an amount of movement of the camera 700, after shooting is started.

In the present example, by performing shooting of the same scene while changing the tilt angle of the camera 700, four image files 2850, 2860, 2870, and 2880, shown in FIG. 31B, are obtained. In doing this, the camera 700 is tilted upward in the order of the image files 2850, 2860, 2870, and 2880. Note that the image files 2850, 2860, 2870, and 2880 include image pickup information items 2851, 2861, 2871, and 2881, and image data items 2852, 2862, 2872, and 2882, respectively.

The controller 101 selects image data according to the tilt of the projector 100 from the image data items 2852, 2862, 2872, and 2882 based on the correction amounts for the trapezoidal correction and the image pickup information items 2851, 2861, 2871, and 2881 (step S2509). In this step, the controller 101 selects image data which has the smallest amount of deformation required for the trapezoidal correction performed by the shape conversion section 205. Note that the degree of trapezoidal correction is reduced to suppress degradation of image quality for which image processing is responsible.

Then, the controller 101 executes steps S2510 to S2518, and S2526. The steps S2510 to S2518, and S2526 are the same as the steps S1807 to S1815, and S1820 in FIG. 20, respectively.

If the input image data is not RAW data (NO to the step S2506), the controller 101 executes steps S2521 to S2524. The steps S2521 to S2524 are the same as the steps S1816 to S1819 in FIG. 20.

Then, the controller 101 determines whether or not the correction of the image data is completed (step S2525). If the correction of the image data is not completed (NO to the step S2525), the controller 101 returns to the step S2522. On the other hand, if the correction of the image data is completed (YES to the step S2525), the controller 101 proceeds to a step S2526.

After execution of the step S2526, the controller 101 determines whether or not an instruction for changing the positional relationship between the liquid crystal display device 106 and the image, such as inversion of the image or registration adjustment, has been input (step S2527). That is, in this step, the controller 101 determines whether or not the driving state of the liquid crystal display device 106 is changed. If an instruction for inverting the image or an instruction for performing registration adjustment has been input (YES to the step S2527), the controller 101 turns on the flag flg stored in the built-in memory or the RAM 119 to set flg=1 (step S2528).

Then, the controller 101 causes the liquid crystal-driving section 105 to change the driving state of the liquid crystal display device 106 based on the image inversion instruction or the registration adjustment instruction (step S2529: change driving of panel). Then, in a case where inversion or registration adjustment of the image is performed, it is necessary to perform the trapezoidal correction again. Therefore, the trapezoidal correction is performed under the control of the controller 101 (step S2530). Note that the correction amounts for the trapezoidal correction are not changed.

Then, the controller 101 executes steps S2531 to S2535. The steps S2531 to S2535 are the same as the steps S1129 to S1133 in FIG. 12B.

As described above, in a case where there are a plurality of RAW data items which are obtained by shooting an object by changing the shooting condition, one RAW data is selected from the plurality or RAW data items according to an image obtained by shooting the projection plane, and the selected RAW data is corrected. This makes it possible to reduce deformation of the image, which causes degradation of the image, and properly perform correction.

Incidentally, when shooting the projection plane, the projection plane may be shot by using an external camera. That is, a projection plane image used when selecting one of a plurality of RAW data items may be shot by an external camera. In this case, any of the projection systems shown in FIGS. 26A to 26C is used. The following description will be given of a case where the projection system shown in FIG. 26A is used.

Figure 32:
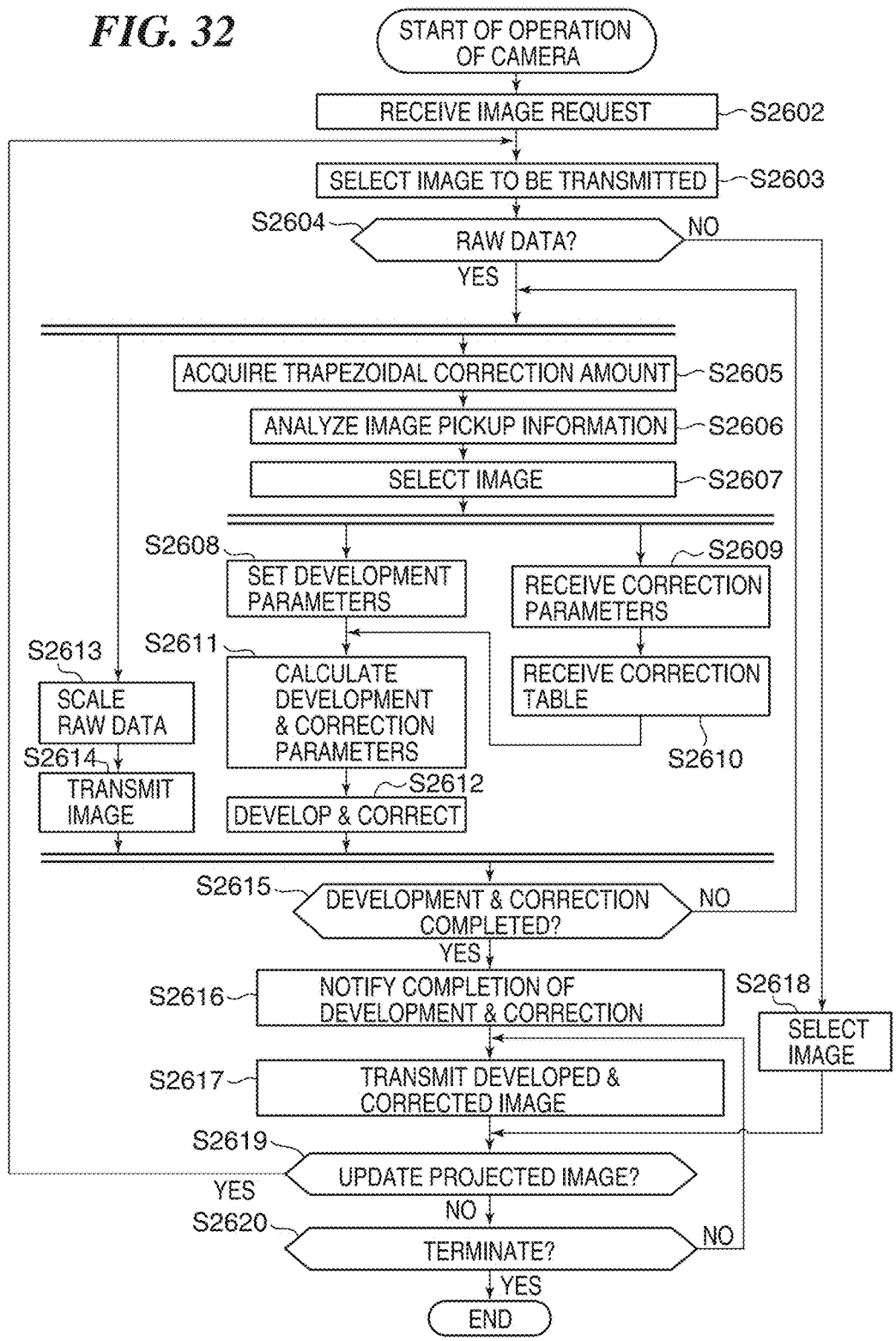
FIG. 32 is a flowchart of a projected image transmission and creation process performed by the first external apparatus (digital camera) connected to the projector according to the fourth embodiment.

FIG. 32 is a flowchart of a projected image transmission and creation process performed by the first camera connected to the projector according to the fourth embodiment.

In response to a predetermined operation from the operation section 702, the controller 701 starts the operation of the camera 700. Then, the controller 701 executes steps S2602, S2603, and S2604. Note that the steps S2602, S2603, and S2604 are the same as the steps S902, S911, and S903 in FIG. 8, respectively.

If the image data is RAW data (YES to the step S2604), the controller 701 executes steps S2605 and S2613, in parallel.

In the step S2605, the controller 701 receives the correction amounts for the trapezoidal correction from the projector 100. Then, the controller 701 executes steps S2606 and S2607. Note that the steps S2606 and S2607 are the same as the steps S2508 and S2509 in FIG. 30A, respectively. After that, the controller 701 executes steps S2608 to S2610. Note that the steps S2608 to S2610 are the same as the steps S2304 to S2306 in FIG. 27, respectively.

Further, the controller 701 executes steps S2611 to S2614. Note that the steps S2611 to S2614 are the same as the steps S2307 to S2310 in FIG. 27, respectively. Then, the controller 701 executes steps S2615 to S2620. Note that the steps S2615 to S2620 are the same as the steps S2313 to S2317 in FIG. 27, respectively.

Figure 33A:
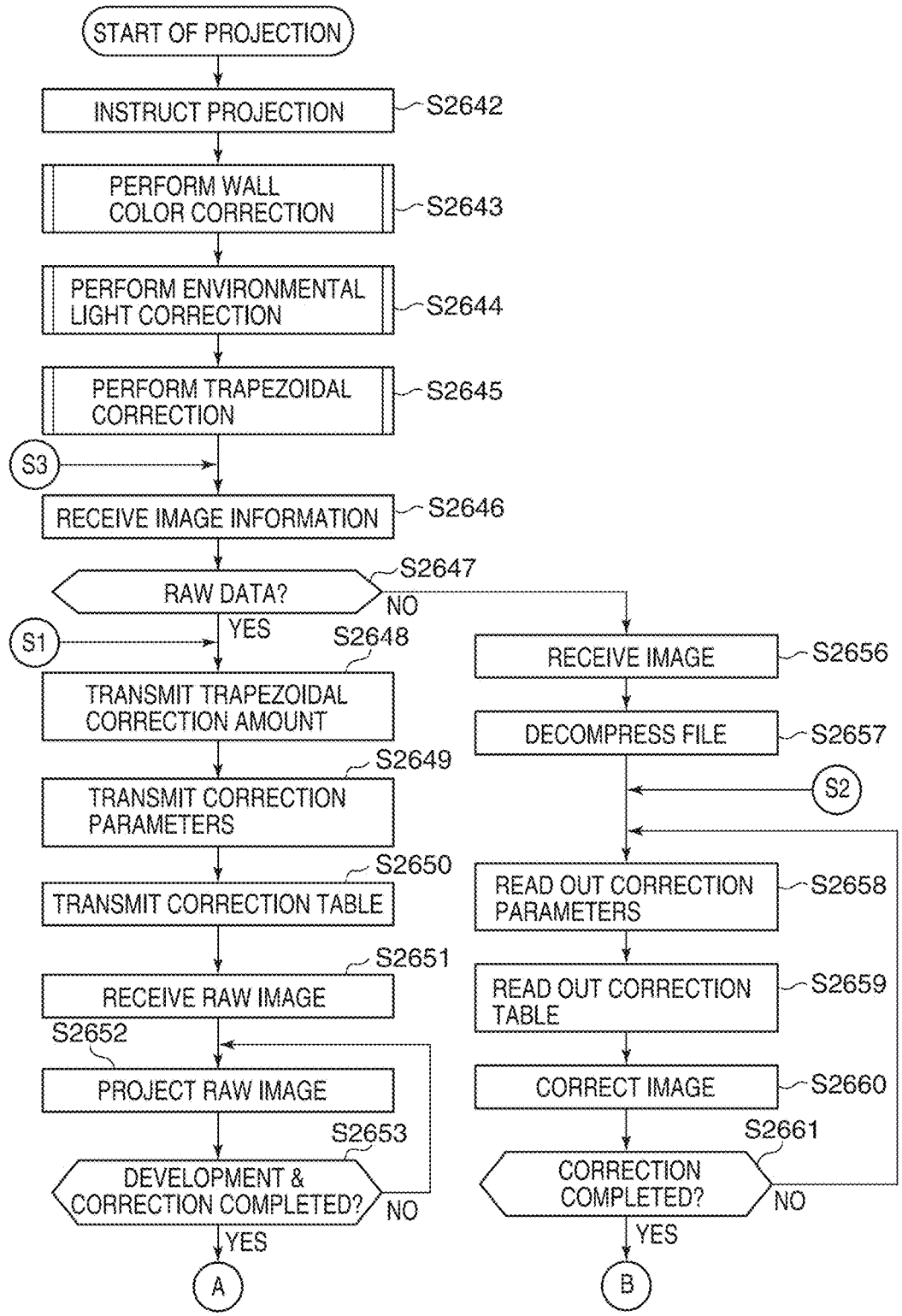
FIG. 33A is a flowchart of a variation of the image projection process performed by the projector according to the fourth embodiment.

FIGS. 33A and 33B are a flowchart of a variation of the image projection process performed by the projector according to the fourth embodiment.

In response to an operation for starting projection from the operation section 102, the controller 101 starts the projection operation. Then, the controller 101 executes steps S2642 to S2647. Note that the steps S2642 to S2647 are the same as the steps S2332 to S2337 in FIG. 28, respectively.

If the image data is RAW data (YES to the step S2647), the controller 101 transmits the corrections amounts for the trapezoidal correction, which are calculated by shooting the projection plane, to the camera 700 (step S2648). Then, the controller 101 executes steps S2649 and S2655. The steps S2649 and S2655 are the same as the steps S2338 to S2344 in FIG. 28, respectively.

If the image data is not RAW data (NO to the step S2647), the controller 101 receives image data from the camera 700 (step S2656). Then, the controller 101 executes steps S2657 to S2661. The steps S2657 to S2661 are the same as the steps S2521 to S2525 in FIG. 30B, respectively.

Note that steps S2662 to S2671 in FIG. 33B are the same as the steps S2526 to S2535 in FIG. 30B, respectively, and hence description thereof is omitted.

FIG. 34 is a sequence diagram useful in explaining a variation of communication performed between the projector according to the fourth embodiment, and the first and second cameras.

Referring to FIG. 34, steps S2700 to S2717 are the same as the steps S2400 to S2417 in FIG. 29, respectively. Further, steps S2720 to S2724 are the same as the steps S2420 to S2424 in FIG. 29, respectively.

In a step S2725, the projector 100 transmits the correction amounts for the trapezoidal correction to the camera 700. After that, steps S2726 to S2728 are executed. The steps S2726 to S2728 are the same as the steps S2425 to S2427 in FIG. 29, respectively.

In a step S2729, the camera 700 selects one image data from a plurality of image data items based on the correction amounts for the trapezoidal correction, and performs the development processing and the correction processing on the selected image data. After that, steps S2730 to S2734 are executed. The steps S2730 to S2734 are the same as the steps S2429 to S2433 in FIG. 29, respectively.

As described above, the external apparatus obtains a plurality of RAW data items obtained through image pickup by changing the shooting conditions. Then, the external apparatus selects one data item based on a projection plane image obtained by another external apparatus connected to the projector 100, and corrects the selected image data. This makes it possible to reduce image deformation which may cause deterioration of the image, and properly perform image correction.

Although in the above-described example, shooting of the projection plane and image correction are performed by the external apparatuses connected to the projector, one of shooting of the projection plane and image correction may be performed by the projector.

Further, in the above-described example, the description is given of the case where one RAW data image is selected from a plurality of RAW data images obtained through image pickup at the tilt angles which are different from each other, this is not limitative. For example, in a case where an image is darkened e.g. by the performing wall color correction or the environmental light correction, bright RAW data may be selected by comparing the image pickup information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, a control method based on the functions of the above-described embodiments may be caused to be executed by the projector. Further, a control program implementing the functions of the above-described embodiments may be caused to be executed by a computer provided in the projector.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

This application claims the benefit of Japanese Patent Application No. 2016-132533 filed Jul. 4, 2016, which is hereby incorporated by reference herein in its entirety.

What is claimed is:

1. A projector that projects a projected image on a projection plane, comprising:
a projection optical system configured to project the projected image on the projection plane;
an additional information analyzer configured to analyze additional information of the input image data to thereby determine whether the input image data is RAW data that is not-yet subjected to development processing or developed data that is already subjected to development processing;
an image processor configured to, in a case where the additional information analyzer determines that the input data is the RAW data, perform, on the RAW data, correction processing based on correction parameters and the development processing, to thereby generate output image data; and
a controller configured to project a projected image corresponding to the output image data on the projection plane.

2. The projector according to claim 1, wherein the correction parameters are parameters based on optical characteristics of the projection optical system.

3. The projector according to claim 2, wherein in a case where a change in the optical characteristics of the projection optical system is detected, the image processor performs the development processing based on correction parameters obtained after the optical characteristics have been changed.

4. The projector according to claim 3, wherein in a case where at least one of a change in a zoom magnification, a change in a focus position, a change in an optical shift amount, a change in an image inversion setting, and a change in registration adjustment of a liquid crystal display device, is detected, the image processor performs the development processing based on correction parameters obtained after the change.

5. The projector according to claim 1, comprising a camera configured to shoot a projected image projected on the projection plane, and a calculator configured to compare an image obtained by the camera with a predetermined reference image, and calculate the correction parameters based on a result of the comparison.

6. The projector according to claim 5, wherein the correction parameters include at least one of a parameter for performing color correction of a projection plane on which the projected image is projected, a parameter for correcting an influence of peripheral environmental light of the projection plane, and a parameter for correcting a shape of the projection plane.

7. The projector according to claim 2, wherein the optical characteristics are at least one of a light quantity change ratio indicative of a ratio of a change in an quantity of light output from the light source, which is caused by the projection optical system, and an aberration caused by the projection optical system.

8. The projector according to claim 1, wherein the image processor selects one RAW data item from a plurality of RAW data items based on at least one of respective settings of a zoom magnification, a focus position, an optical shift amount, an image height, and the liquid crystal display device, and performs the correction processing and the development processing on the selected RAW data item.

9. The projector according to claim 8, wherein the plurality of RAW data items are different in shooting conditions from each other.

10. The projector according to claim 1, wherein the image processor perform, on the developed data, only the correction processing out of the correction processing and the development processing, in a case where the additional information analyzer determines that the input image data is the developed data.

11. The projector according to claim 1, wherein the development processing includes white balance processing, color conversion processing, color space conversion processing, gradation conversion processing, and contour emphasis processing.

12. A method of controlling a projector that projects a projected image on a projection plane, the method comprising:
   a projection optical system configured to project the projected image on the projection plane;
   analyzing additional information of the input image data to thereby determine whether the input image data is RAW data that is not-yet subjected to development processing or developed data that is already subjected to development processing;
   in a case where the additional information analyzer determines that the input data is the RAW data, performing, on the RAW data, correction processing based on correction parameters and the development processing, to thereby generate output image data; and
   projecting a projected image corresponding to the output image data on the projection plane.

13. A non-transitory computer-readable medium having computer executable instructions embodied therein that, when executed, implement the method of claim 12.

* * * * *